US010724614B2

(12) United States Patent
Lundbäck et al.

(10) Patent No.: US 10,724,614 B2
(45) Date of Patent: Jul. 28, 2020

(54) GEAR ARRANGEMENT

(71) Applicant: Cascade Drives AB, Stockholm (SE)

(72) Inventors: Stig Lundbäck, Vaxholm (SE); Stefan Svensson, Bergshamra (SE); André Hellestig, Lidingö (SE); Patrik Möller, Stockholm (SE); Stefan Björklund, Åkersberga (SE)

(73) Assignee: Cascade Drives AB, Stockholm (SE)

( * ) Notice: Subject to any disclaimer, the term of this patent is extended or adjusted under 35 U.S.C. 154(b) by 608 days.

(21) Appl. No.: 15/126,474

(22) PCT Filed: Mar. 17, 2015

(86) PCT No.: PCT/EP2015/055550
§ 371 (c)(1),
(2) Date: Sep. 15, 2016

(87) PCT Pub. No.: WO2015/140163
PCT Pub. Date: Sep. 24, 2015

(65) Prior Publication Data
US 2017/0082179 A1 Mar. 23, 2017

(30) Foreign Application Priority Data

Mar. 18, 2014 (EP) .................................... 14160554

(51) Int. Cl.
*B62D 3/12* (2006.01)
*F16H 19/04* (2006.01)
*F03B 13/18* (2006.01)

(52) U.S. Cl.
CPC ......... *F16H 19/043* (2013.01); *F03B 13/186* (2013.01); *Y02E 10/38* (2013.01)

(58) Field of Classification Search
CPC ........ F16H 19/04; F16H 19/043; F16H 19/46; F03B 13/186; F01B 9/047; Y02E 10/38
See application file for complete search history.

(56) References Cited

U.S. PATENT DOCUMENTS 2,283,746 A    5/1942  Willy
4,184,336 A *  1/1980  Lamberti .............. F03B 13/186
                                                      60/507
(Continued)

FOREIGN PATENT DOCUMENTS

CN       1387616 A    12/2002
CN     202125319 U     1/2012
(Continued)

OTHER PUBLICATIONS

International Search Report and Written Opinion for International Application No. PCT/EP2015/055550 dated Jul. 14, 2015, 10 pages.

*Primary Examiner* — Victor L MacArthur
(74) *Attorney, Agent, or Firm* — RMCK Law Group, PLC

(57) ABSTRACT

A gear arrangement for transforming a linear force and/or motion into a rotational torque and/or motion and vice versa. The arrangement comprises; a rack (10, 110, 210, 510, 1010, 2010, 3010, 4010) exhibiting a longitudinal axis (A) and at least one toothed side extending parallel to the longitudinal axis of the rack, the rack being reciprocally movable along its longitudinal axis. At least two pinions (20, 120, 220, 520, 1020, 2020, 3020, 4020, 5020) are arranged such that each pinion is rotationally meshing with a toothed side of the rack. Each pinion is fixed to a respective first primary gear (30, 130, 230, 530, 1030, 2030, 3030, 4030, 5030) arranged at a first axial side of the pinion. At least two first primary gears are mechanically connected to a common out- or input shaft (60, 160, 560, 1060), such that the at least two first primary gears transmit torque to or from the first out- or input shaft. At least one pinion is fixed to the respective first primary gear by means of an elastically deformable fixation device (40, 41, 42, 140, 1042, 1400, 2400, 3400, 4400,

(Continued)

5400) which is arranged to allow a limited relative rotation between the respective first primary gear and pinion.

22 Claims, 30 Drawing Sheets

(56) References Cited

U.S. PATENT DOCUMENTS

| | | | | |
|---|---|---|---|---|
| 4,270,404 A * | 6/1981 | Murakoshi | ............ | F16H 25/02 |
| | | | | 248/913 |
| 4,282,739 A * | 8/1981 | Hallenbeck | ............ | B30B 1/24 |
| | | | | 100/270 |
| 4,941,396 A * | 7/1990 | McCabe | ............ | F01B 9/047 |
| | | | | 123/55.3 |
| 5,353,690 A * | 10/1994 | Shin | ............ | F01B 9/047 |
| | | | | 74/110 |
| 5,836,205 A | 11/1998 | Meyer | | |
| 6,216,394 B1 * | 4/2001 | Fenelon | ............ | E05F 15/689 |
| | | | | 49/349 |
| 6,820,369 B2 * | 11/2004 | Fenelon | ............ | E05F 11/385 |
| | | | | 464/93 |
| 7,768,143 B2 * | 8/2010 | McCague | ............ | F03B 13/186 |
| | | | | 290/42 |
| 10,197,048 B2 * | 2/2019 | Hilgers | ............ | E21B 43/127 |
| 10,240,575 B2 * | 3/2019 | Dragic | ............ | F03B 13/1855 |
| 2012/0291572 A1 * | 11/2012 | Baker | ............ | F01B 9/047 |
| | | | | 74/32 |
| 2013/0056988 A1 | 3/2013 | Hunt et al. | | |
| 2019/0093738 A1 * | 3/2019 | Almqvist | ............ | B25H 1/0064 |

FOREIGN PATENT DOCUMENTS

| | | |
|---|---|---|
| DE | 10009390 A1 | 9/2001 |
| FR | 2044469 A | 2/1971 |
| JP | S62103238 U | 7/1987 |
| JP | H02113154 A | 4/1990 |
| JP | 2003090407 A | 3/2003 |
| WO | 2011104561 A2 | 9/2011 |
| WO | 2012008896 A1 | 1/2012 |

* cited by examiner

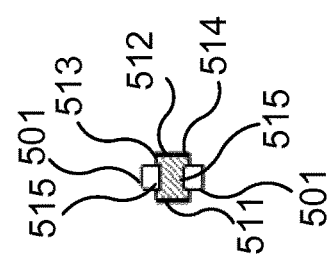
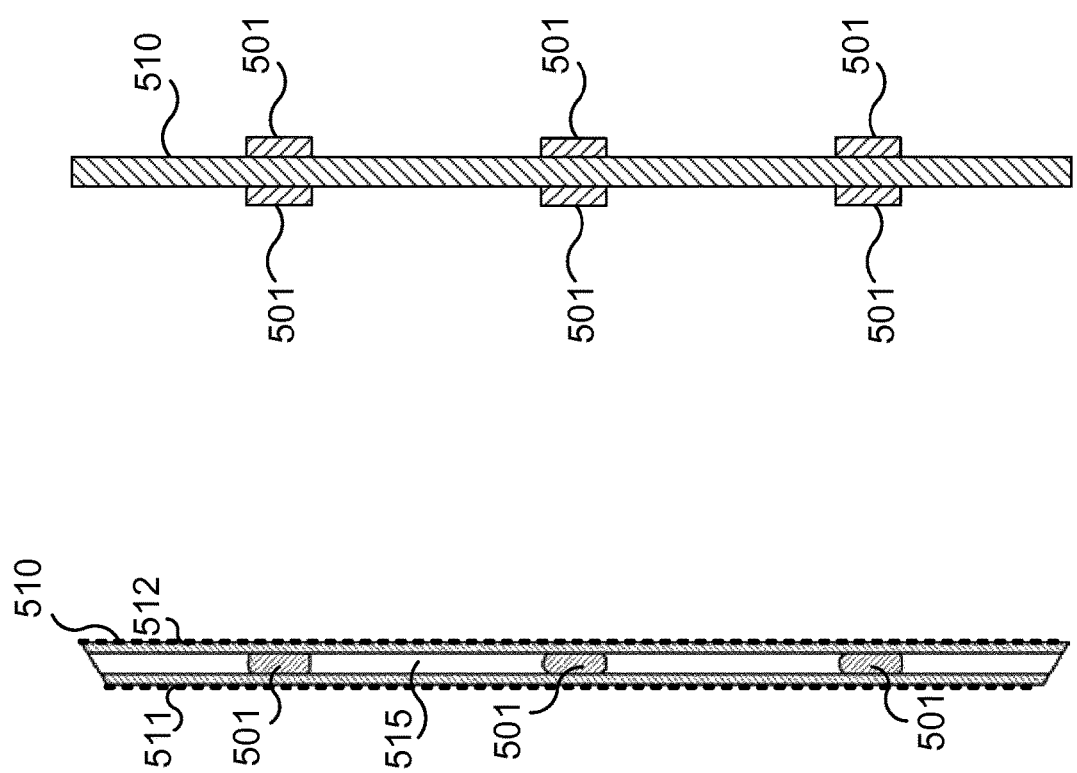
Fig. 11c
Fig. 11b
Fig. 11a

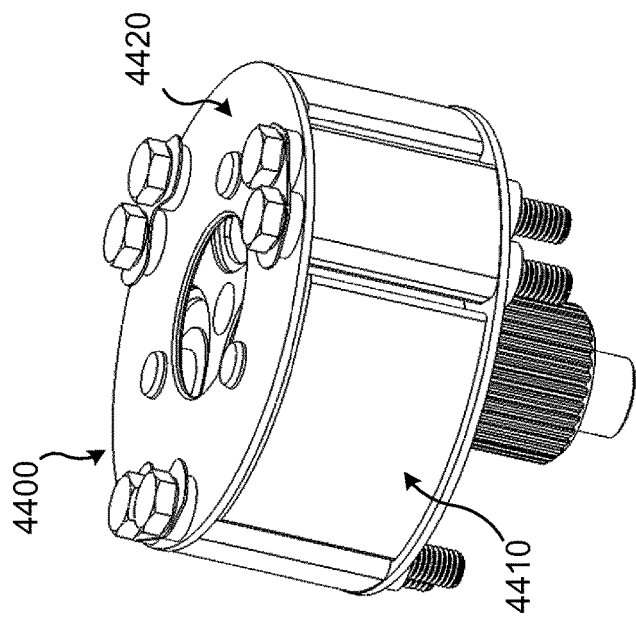
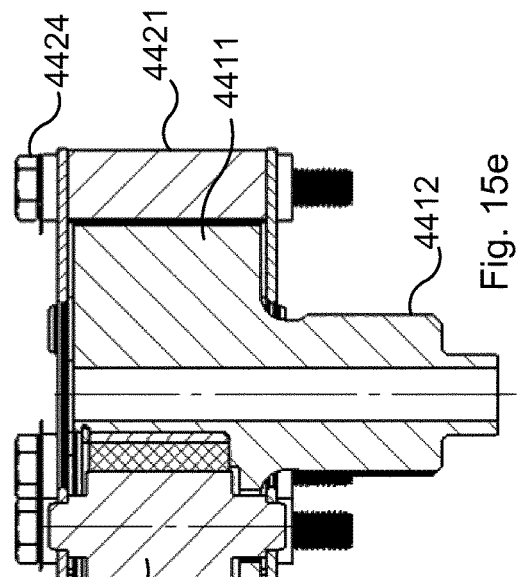
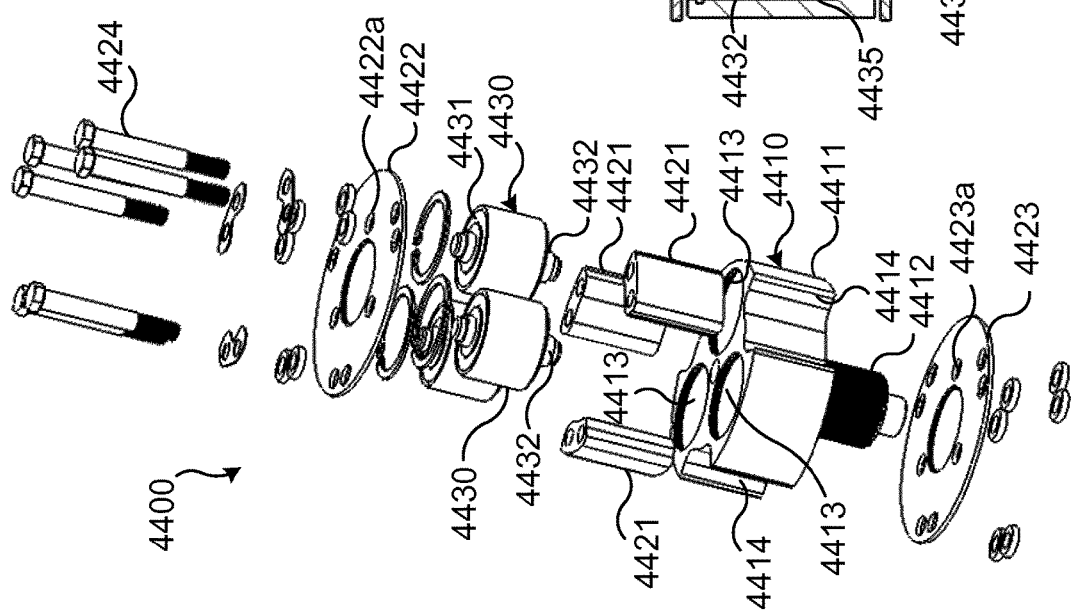

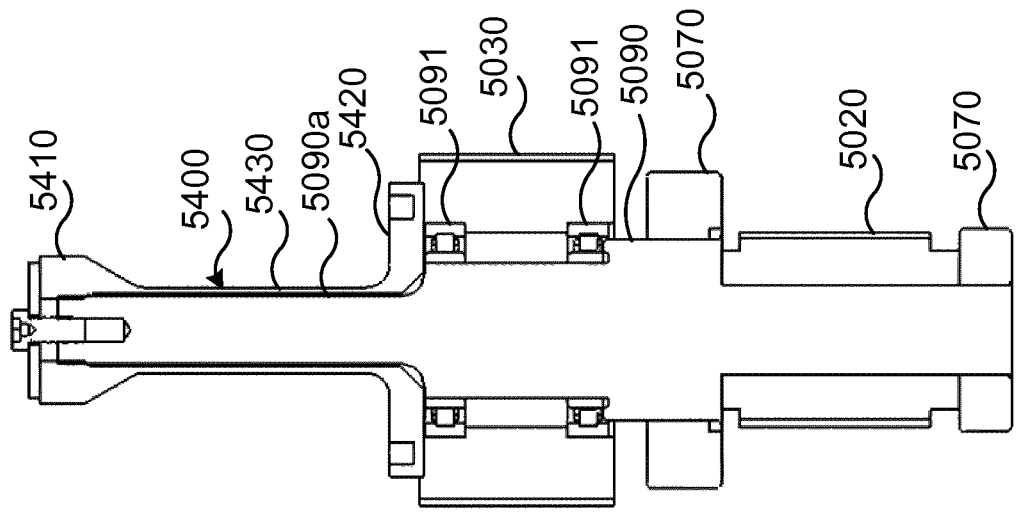
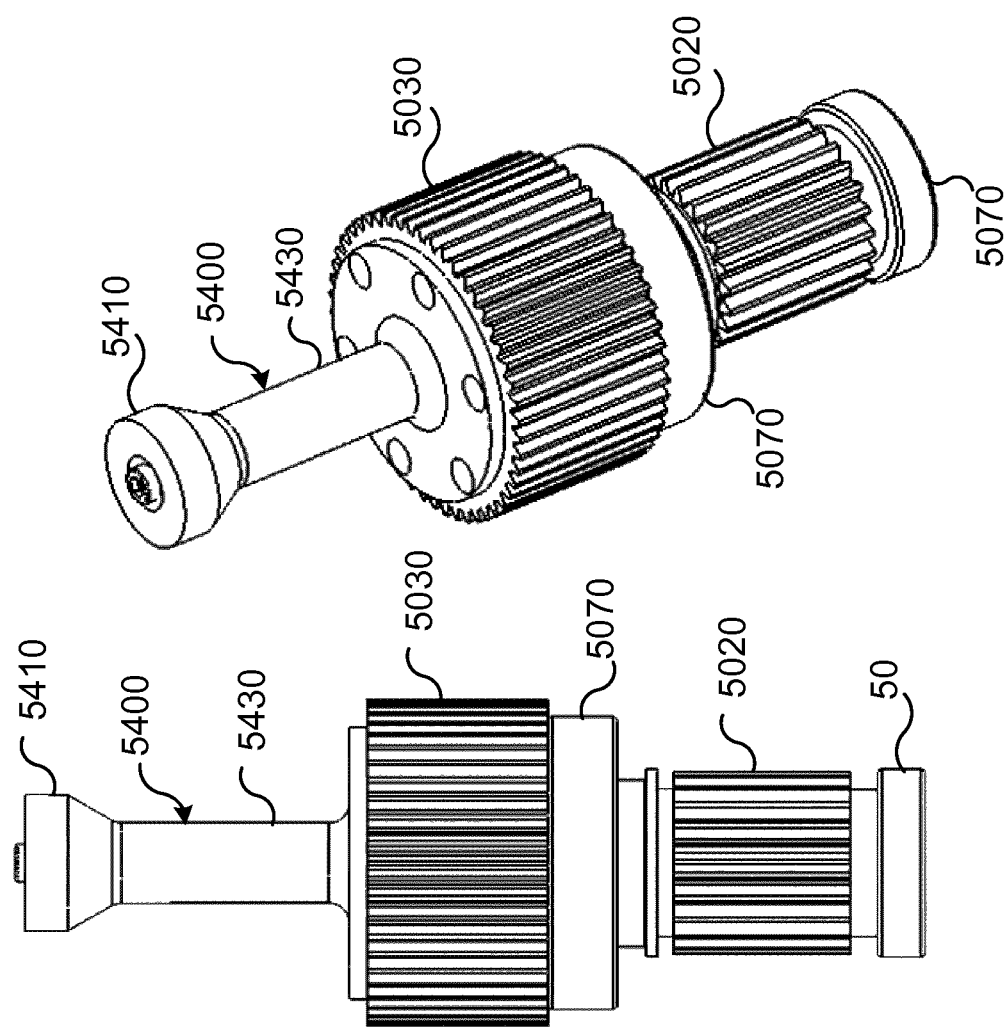
Fig. 16c
Fig. 16b
Fig. 16a

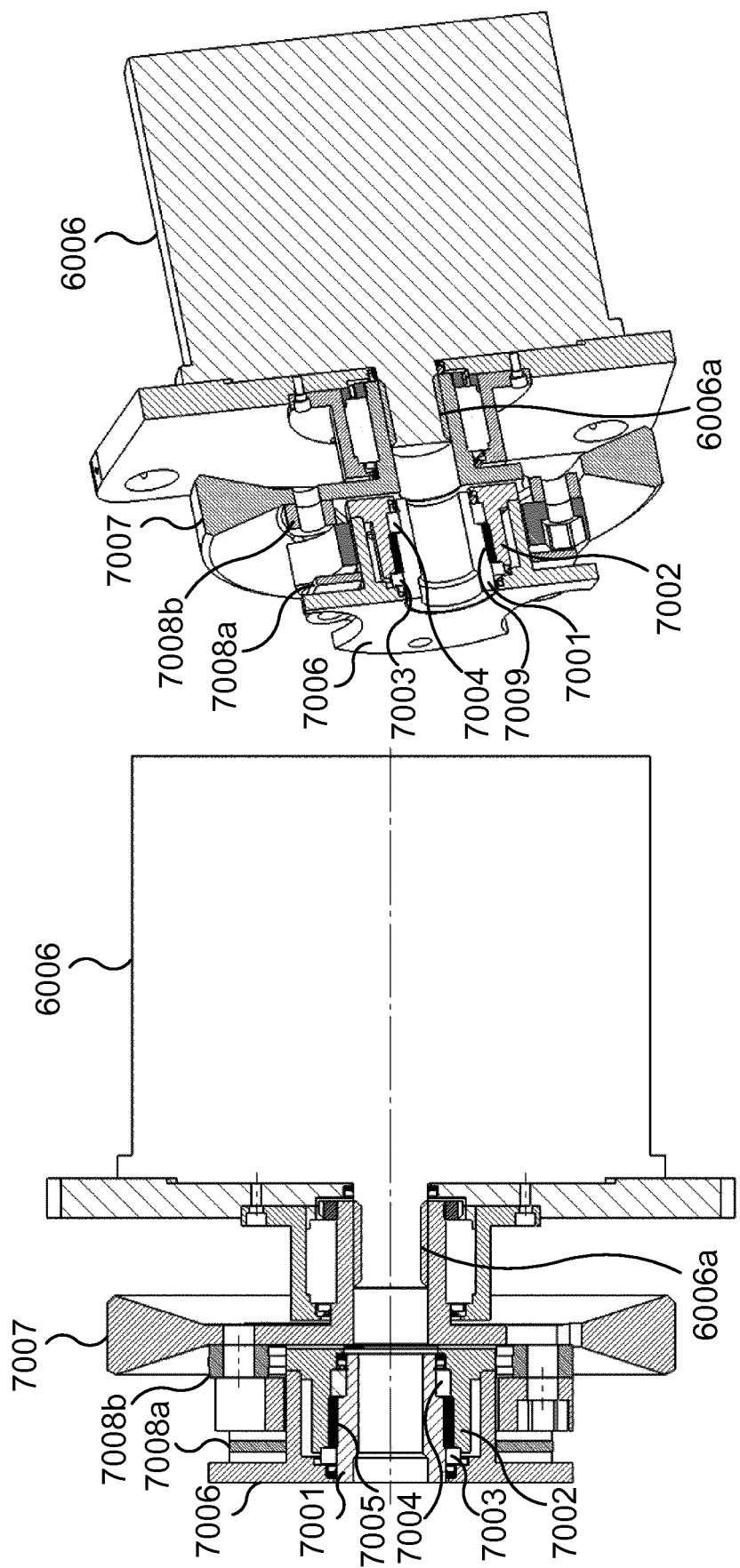

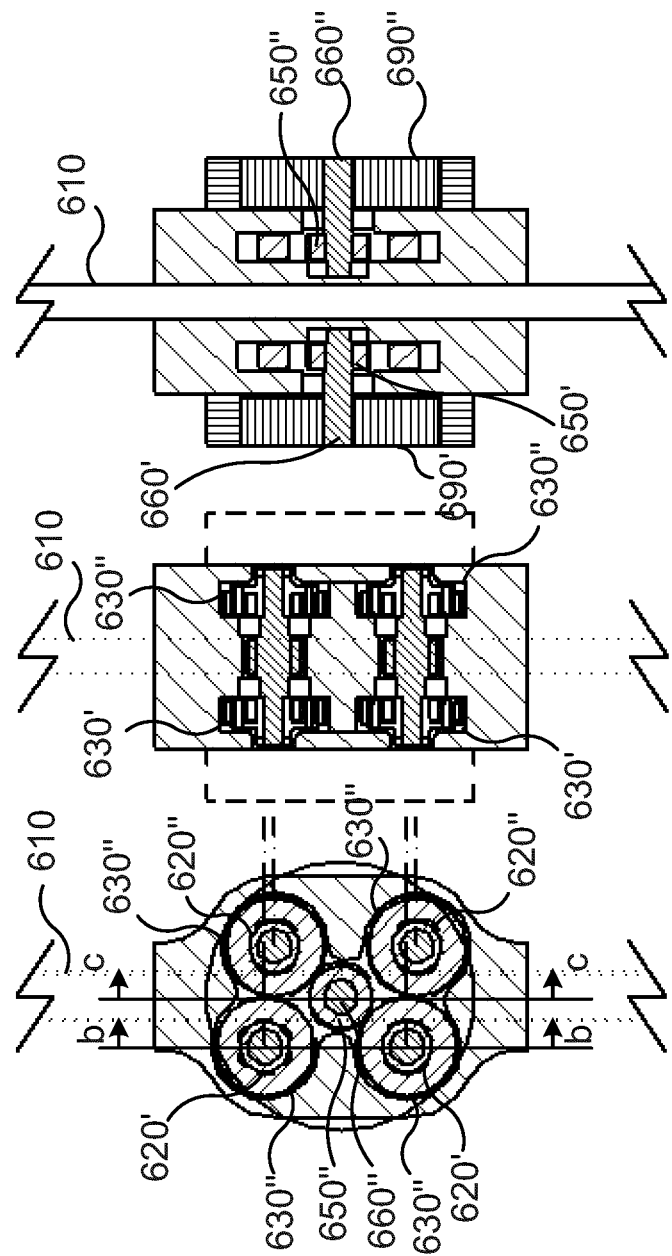

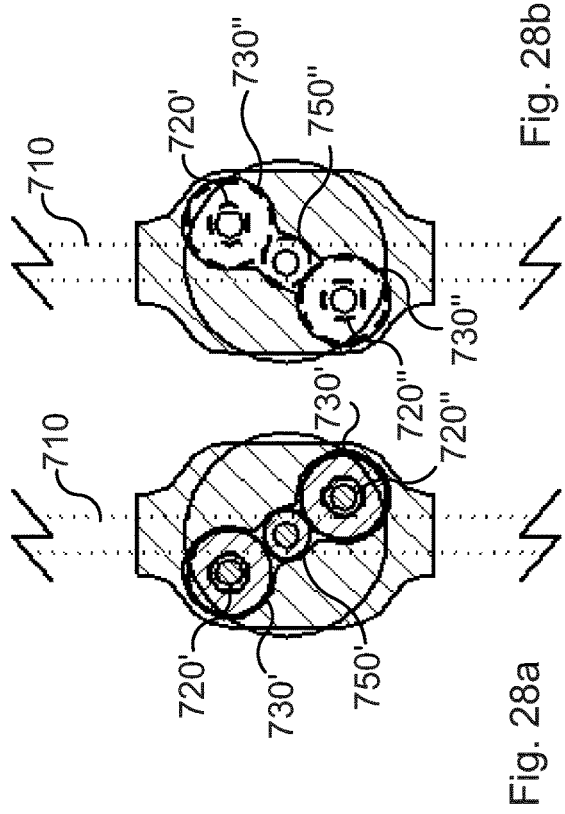
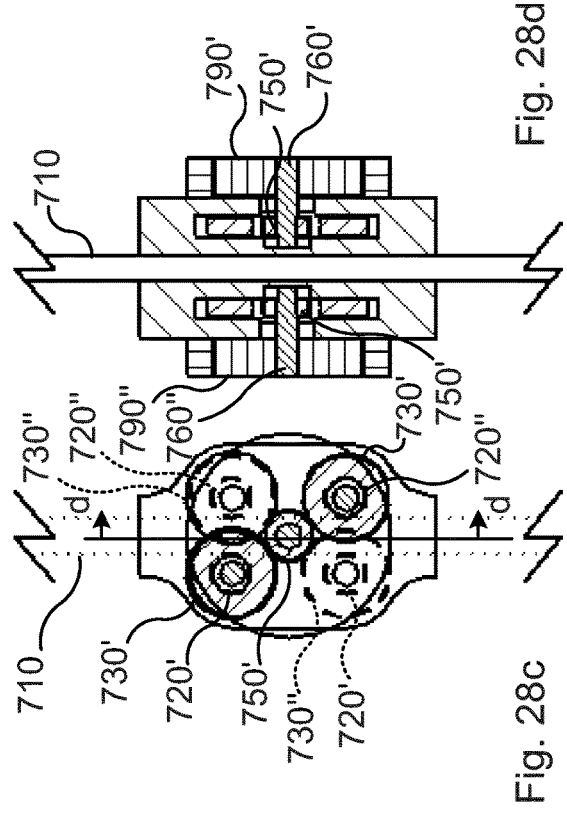

GEAR ARRANGEMENT

CROSS-REFERENCE TO RELATED APPLICATIONS

This application is a 371 U.S. National Stage of International Application No. PCT/EP2015/055550, filed Mar. 17, 2015, which claims priority to EP Application No. 14160554.3, filed on Mar. 18, 2014. The disclosure of each of the above applications is incorporated herein by reference in their entirety.

TECHNICAL FIELD

The invention relates to a gear arrangement for transforming a linear force/motion into a rotational torque/motion and vice versa. The invention also concerns the integration of such a gear arrangement into energy converters and linear actuators.

BACKGROUND

There are many applications where there exists a need for transforming a linear movement or force into a rotational movement or torque and/or vice versa. Examples of such applications are energy generation devices such as wave and wind power generators and different industrial lifting or actuation systems. For the purpose of transformation between linear and rotational motion in such systems, different types of gear arrangements may be utilized. The gear arrangements typically comprise a linearly movable, possibly reciprocal, member which, e.g. by means of meshing cogs, co-acts with a rotational member. Such arrangements are generally referred to as rack and pinion drives. When it is desirable to achieve a certain gear ratio between the input motion or force and the output motion or torque the gear arrangement may comprise additional cog wheels or gears meshing with the pinion and arranged between the rack and the output or input shaft.

The present invention may be used at various applications of the above mentioned type and also in others. An application of certain interest is the wave power generation industry. WO 2012/008896 A1 discloses an energy transforming system which may be utilized for converting ocean wave energy into electrical power. According to one embodiment, the system comprises an oscillator with two cylinder-piston arrangements arranged vertically face to face. The cylinders contain a fluid, and the two pistons are mechanically connected to each other by means of a rod. A buoy which is influenced by ocean waves is connected to the piston of one of the cylinders and causes a reciprocal oscillating movement of the rod when affected by the ocean waves.

For converting the kinetic energy of the rod into electrical power, a gear arrangement may be arranged between the reciprocal rod and rotating electrical generator or alternator.

At these types of gear arrangements it is of vital interest that the entire arrangement is durable and has a long and predictable service life. A further important aspect is that the inertia of the moving parts should be as low as possible, thus that the weight of e.g. the cog wheels and shafts should be as low as possible. Correspondingly, it is also most desirable that the dimensions of the gear arrangement and its constituent parts are kept as small as possible. On the other hand, it is also important that the entire arrangement should be able to sustain high and varying loads, since the loads from ocean waves and actuation loads in industrial machinery may vary largely. It is thus of great importance that the gear arrangement may be designed with a high load to volume-weight ratio.

PRIOR ART

WO 2011/104561 A2 discloses an apparatus for generating power from the movement of a body of water. According to one embodiment, the apparatus comprises a rack and rotatable means system comprising a rack member and two pawl and gear wheel assemblies. Each such assembly comprises two pawls which are arranged on a respective side of the rack. Each pawl is arranged to drive a respective wheel and both wheels mesh with a common gear wheel, which is fixed to an output shaft.

U.S. Pat. No. 5,836,205 discloses a linear actuator system which comprises a linear actuator provided with gear teeth on two exterior sides. A pinion drives two drive wheels which are connected to a respective gear by means of a respective shaft. The two gears engage the teeth on one side of the actuator. Each of the two drive wheels drives a respective further drive wheel which in turn is connected to a respective further gear by means of a respective shaft. The two further gears engage the teeth on the other side of the actuator.

DE 100 09 930 A1 discloses a rack and pinion mechanism which converts an electric motor rotational motion into a precision linear motion. The mechanism has four or more multistage gear wheels arranged in a matrix in two columns and two rows.

The device according to WO 2011/104561 A2 may thus be used for transforming a linear force and motion into a rotational torque and motion whereas the devices according to U.S. Pat. No. 5,836,205 and DE 100 09 930 A1 may be used for transforming a rotational torque and motion into a linear force and torque. However, there still exists a need of an improved gear arrangement.

SUMMARY

It is thus an object of the present invention to provide an enhanced gear arrangement which is capable of transforming a linear force and/or motion into a rotational torque and/or motion and vice versa.

It is a further object to provide such a gear arrangement which is durable and which exhibits a comparatively long and predictable service life.

A further object is to provide such a gear arrangement which presents a comparatively high load to weight and volume ratio.

An additional object is to provide such a gear arrangement which allows for an even distribution of the load between all cog flanks of the arrangement.

Another object is to provide such a gear arrangement by which oppositely directed reacting forces between a gear rack and pinions meshing with opposite sides of a double sided toothed rack are efficiently balanced.

Still a further object is to provide such a gear arrangement which exhibits an enhanced guiding of the linear movement of the rack.

Yet another object is to provide such a gear arrangement which allows for the utilization of one or several gear steps at limited space requirements and with an even distribution of the load to all gears and cog flanks.

A further object is to provide a rack pinion gear arrangement which allows a high primary rotational speed of said pinions with respect to the linear speed of said rack while being durable and capable of transmitting high loads.

A further object is to provide a gear arrangement which provides uniform distribution of a large linear load from a rack onto a plurality of pinions, and collects the distributed load from said pinions into a combined torque on at least one input/output shaft and vice versa.

A still further object is to provide such at gear arrangement which enables a continuous and comparatively even outgoing rotational movement when the arrangement is energized by an incoming reciprocal linear movement.

The invention thus concerns a gear arrangement for transforming a linear force and/or motion into a rotational torque and/or motion and vice versa. The arrangement comprises a rack exhibiting a longitudinal axis and at least one toothed side extending parallel to the longitudinal axis of the rack, the rack being reciprocally movable along its longitudinal axis. At least two pinions are rotationally meshing with a toothed side of the rack and fixed to a respective first primary gear arranged at a first axial side of the pinion. At least two of said first primary gears are mechanically connected to a common out- or input shaft, such that the at least two first primary gears transmit torque to or from the first out- or input shaft. At least one of said first primary gears is fixed to the respective pinion by means of an elastically deformable fixation device which is arranged to allow a limited relative rotation between the respective first primary gear and pinion.

The inventive gear arrangement thus provides for that the load to be transferred by the arrangement is uniformly distributed between all pinions and all primary gears respectively. Hereby, the dimensions of the pinions and gears, and thereby the entire gear arrangement may be kept comparatively small, while still allowing a large total load capacity in combination with any desired over all gear ratio. The load to be sustained by the engaging cog flanks of the pinions and the toothed rack is divided by the number of pinions meshing with the rack. This entails for that, for any given total torque capacity of the gear arrangement, the diameter of the first pinions may be kept comparatively small. This also enhances the possibility to choose the dimensions of the pinions such the service life of the pinions corresponds to the service life of the rack, thereby reducing any excessive use of material while keeping the total weight of the arrangement low. The reduced diameter of the pinions also allows for that the diameters of the gears may be kept correspondingly small, while allowing for any desirable total gear ratio of the gear arrangement to be achieved.

Just as in prior art gear arrangements where an in- or output shaft is coupled to a rack by means of more than one pinion meshing with the rack, the gear arrangement constitutes generally an over determined system. An inherent problem at such systems is to evenly distribute the load to all cog flanks of the pinions and the rack being in simultaneous engagement. If the load is unevenly distributed, some flanks will experience higher wear than others, whereby the service life of the system is reduced. Alternatively, the rack and all cog wheels need to be dimensioned with regard to the flanks experiencing the highest wear. Thereby, the load to volume and weight ratio of the gear arrangement is reduced.

According to the prior art, this problem is normally addressed by manufacturing the rack and the cog wheels with an as high precision as possible, i.e. by reducing the manufacturing tolerances. Additionally, such as in DE 100 09 930 A1, the prior art strives to solve the problems connected to over determination by rigidly locking the relative rotational position between the pinions and the first gears as precisely as possible. However, these known means for solving problems related to over determination lead to increased costs for manufacturing and assembly as well as an increased complexity of the arrangement. Additionally and especially in gear arrangements with long racks, long stroke length and many cooperating pinions, the prior art gear arrangements still require the load transferring components to be dimensioned with a considerable safety margin. Especially when the systems are to transfer high loads, such as at e.g. wave power generating plants or at linear actuators in heavy lifting and transporting equipment, this results in a severe reduction of the load to volume and weight ration.

Quite opposite to previously known measures to address the above mentioned problems, the inventors of the present invention, Mr. Stig Lundbäck et al, have realized that problems related to over determination of the gear arrangement may be greatly reduced by introducing a certain torsional resilient flexibility between rotating components that are normally fixed to each other. According to the invention, the first pinions are fixed to the respective primary gears by means of a fixation device, which allows some limited elastic relative rotation between the pinion and the primary gear.

Hereby, the flanks of all pinions meshing with the rack will individually engage the corresponding flanks of the rack. Since the pinions are elastically connected to each other by means of the elastic fixation device, the primary gears and common out- or input shaft, the flanks of each pinion will be rotationally adjusted relative to the corresponding flanks of the rack, such that the total load is evenly distributed to all flanks momentarily in engagement. The invention thus provides for a self adjusting arrangement by which the total load transmitted by the gear arrangement is evenly distributed to all engaging flanks. Hereby, the above mentioned problems related to over determined gear arrangements are significantly reduced. This in turn especially entails for reduced costs for material and manufacturing as well as an increased load to volume and weight ratio.

While being able to allow a certain relative rotation between the pinions and the primary gears, the elastically deformable fixation devices should be arranged rigid in radial and axial directions for achieving parallel alignment between the meshing cog wheels. The fixation device may further be arranged such that relative rotation occurs after a certain base load has been applied that provides a relative rotation between each pinion and respective primary gear corresponding to at least the total manufacturing and mounting tolerances of the gear arrangement.

According to one embodiment the at least two pinions are meshing with a common first toothed side of the rack. The rack is then provided with a single toothed side and all pinions are meshing with this single side. At such embodiments additional guiding means, such as rollers or sliding guides should preferably be arranged to prevent the rack from moving in the transverse direction away from the pinions.

According to an alternative and preferred embodiment, the rack exhibits a first toothed side and a second toothed side, arranged in parallel with and opposite to said first toothed side. The at least two pinions comprise at least one first pinion meshing with the first toothed side and at least one second pinion, meshing with the second toothed side of the rack, each first and second pinion being fixed to the respective first primary gear by means of an elastically deformable fixation device. By this means the total load may readily be evenly distributed to both sides of the rack. This embodiment also entails for that an increased number of pinions and primary gears may be, while still keeping the dimensions and especially the longitudinal length of the arrangement comparatively small. Additional advantages entailed by arranging pinions meshing with two opposite toothed sides of the rack relate to an improved guiding of the rack. These advantages are explained and described further in detail below. The gear arrangement may be arranged such that pinions meshing with opposite sides of the rack constitute the sole guidance of the rack in the transverse directions normal to the longitudinal axis of the rack. Alternatively, the gear arrangement may be provided with additional guiding means. Examples of such alternatives are also discussed below.

At an advantageous embodiment the gear arrangement comprises at least one set of gear parts, each set comprising; two first pinions and two second pinions, each first pinion being fixed to a first primary gear by means of an elastically deformable fixation device, which first primary gear meshes with a corresponding first primary gear fixed to a respective second pinion by means of an elastically deformable fixation device; and a secondary gear, which meshes with both primary gears of either the first or second pinions. The primary gears are thus arranged in pairs meshing above or beneath the rack, each pair comprising one primary gear which is fixed to a pinion meshing with one side of the rack and one primary gear, which is fixed to a pinion meshing with the other side of the rack. By this means a very space saving arrangement is achieved.

The secondary gear may the mesh with both primary gears of either the first or second pinions.

Alternatively, the secondary gear meshes with one primary gear of a first pinion and one secondary gear of a second pinion.

The gear arrangement may then comprise one such set of gear parts, wherein the secondary gear is fixed to a common out- or input shaft. At such an arrangement the movement and load is transferred between the rack and a single out- or input shaft, via all pinions and primary gears.

Alternatively, the gear arrangement may comprise two such sets of gear parts. This entails for that the total load may be increased even further and be evenly distributed to an increased number of pinions and primary gears.

When two sets of gear parts are used, the secondary gear of each set may be connected to a respective out- or input shaft. By this means it is possible to transfer the movement and or load between the rack and two out- or input shafts.

Alternatively, the secondary gear of both sets of gear parts may be arranged to mesh with a tertiary gear, which is connected to a common out- or input shaft. Hereby the movement and or load may be transferred between the rack and a single out- or input shaft. The inclusion of a tertiary gear also further enhances the possibility to freely choose the total gear ration of the gear arrangement.

The number of sets of gear parts may be increased even further, and for each number of sets, it is possible to freely choose the number of out- or input shafts included in the gear arrangement, by arranging corresponding number of intermediate gears, such as secondary gears, tertiary gears, quaternary gears and so on.

According to a further embodiment at least two and preferably all first and/or second pinions are fixed to a respective second primary gear arranged at a second axial side of the pinion, by means of an elastically deformable fixation device which is arranged to allow a limited relative rotation between the respective second primary gear and pinion. The at least two second primary gears are then mechanically connected to a common out- or input shaft, such that the at least two second primary gears transmit torque to said out- or input shaft. By this means the gear arrangement may be arranged symmetrically and such that the total load is evenly distributed to primary gears arranged at opposing sides of the rack.

In this case, the second primary gears may be connected to the same out- or input shaft as the first primary gears. Hereby, the total load transferred between the rack and the single out- or input shaft is evenly distributed over all pinions and primary gears respectively. The single out- or input shaft may exhibit one or two shaft ends which is/are connectable to a respective load or a drive means.

Alternatively, the first primary gears, being arranged at a first axial side of the first and second pinions may be connected to a first out- or input shaft, whereas the second primary gears, being arranged at the second axial side of the first and second pinions may be connected to a second out- or input shaft.

By arranging two shaft ends, either on a single common out- or input shaft or on a respective one of two separate out- or input shafts, it is possible e.g. to let the gear arrangement drive two different generators or be driven by two different motors, connected to one respectively of two out- or input shafts.

The elastically deformable fixation device, for accomplishing the torsional resilient flexibility may be arranged in different ways.

At least one elastically deformable fixation device may comprise a first part which is rotationally fixed to a pinion and a second part which is rotationally fixed to a primary gear, and the first and second parts may be mechanically connected by means of an elastically deformable material. This entails for a simple and space saving arrangement, wherein the torsional resiliency may readily be decided by choosing the properties and dimensions of the elastic material.

The at least one elastically deformable fixation device preferably comprises means for adjusting the nominal relative rotational position between the first part and the second part. By nominal relative rotational position is meant the relative rotational position between the pinion and primary gear when the elastically deformable fixation device is relaxed, i.e. when no torque is applied between the pinion and the primary gear. These means are used at assembly of the gear arrangement. By this means it is possible to readily achieve a precise relative nominal rotational positioning at each pair of pinion and primary gear such that equal load distribution is achieved between cooperating pairs of pinions and primary gears.

Said first part may be connected to the second part by means of a shaft portion which protrudes axially from an axial end of the primary gear to a free end of the shaft portion and an elastically deformable sleeve which extends concentrically about the shaft portion from the free end towards said axial end of the primary gear. By this means the resiliency of the fixation device may be precisely and readily decided by choosing a suitable axial length of the resilient sleeve. This embodiment also allows for that the fixation device is constructed with comparatively small radial dimensions.

Additionally, said shaft portion may be arranged elastically deformable in the circumferential direction. By this means the total resiliency of the fixation device results from the sum of the resiliencies of the shaft portion and the surrounding sleeve.

Alternatively, at least a portion of the elastically deformable material may form radially extending spokes. This entails for a construction of the fixation device with comparatively small axial dimensions.

The elastically deformable material may comprise a polymer material which is arranged to be compressed when the first part is rotated relative to the second part. The elastic material may e.g. comprise or be constituted by natural or synthetic rubber or any other synthetic polymer or elastomer material having suitable resilient properties. By arranging the fixation device such that the elastic material is compresses at relative rotation between the first and second part, the shearing stress of the material is reduced or eliminated, thereby minimizing the risk of material fatigue or failure of the device.

Irrespective of which type of elastically deformable fixation device that is used, the device should preferably be arranged such that it permits relative movement in the rotational direction only. I.e. the device should be arranged to be rigid in the other directions, such that relative movement between the pinion and the primary gear is prevented in the axial and axial directions.

The rack may further comprise two longitudinal rack halves that are mutually connected, with or without an intermediate space.

In order to achieve the desired advantages of the invention it is not necessary that all primary gears fixed to their respective pinions by means of an elastically deformable fixation device. Preferably however, at least all minus one of the first and/or second primary gears that are mechanically connected to a common out- or input shaft, are fixed to their respective pinion by means of a elastically deformable fixation device which is arranged to allow a limited relative rotation between the respective first primary gear and pinion.

The invention also relates to a wave energy transforming device comprising a gear arrangement as described above and arranged to transform a linear reciprocal movement applied to the rack into an outgoing rotational movement of at least one output shaft.

Further the invention concerns a linear actuator comprising a gear arrangement as described above and arranged to transform a rotational movement applied to at least one input shaft into an outgoing linear movement of the rack. Such a linear actuator may e.g. be utilized in lifting or pushing devices.

The inventors have further realized that the torsional resilient flexibility described above may be utilized for an enhanced guidance of the longitudinal movement of the rack. The pinions being in engagement with one side of the rack may be used as the only guidance of the rack in the direction towards said pinions. In such a case, the ability of the pinion flanks to adjust its engagement with the rack, allows for that irregularities in the shape of the rack as well as in the shape and centering of any additional guiding means or side supporting members arranged at the opposite side of the rack absorbed by the resilient rotational adjustment of said pinions. Hereby, the longitudinal movement of the rack will be floatingly guided in the transverse directions.

By this means, such over determination of the transverse guiding that occurs at rigidly fixed guiding members may be eliminated. Additionally, the transverse supporting forces are evenly distributed between the supporting pinions, which entails for a smooth reciprocal running as well as a reduced wear of the pinions, the side supporting members and the rack.

Thus, the gear arrangement may be arranged such that the longitudinal movement of the rack is guided in the directions normal to the first and second sides solely by contact between said sides and the first pinions and side supporting members respectively.

In cases where pinions that are fixed to primary gears by means of elastically deformable fixation devices are arranged meshing with both sides of a rack exhibiting two oppositely arranged toothed sides, the longitudinal movement of the rack may, at some applications, be guided in the directions normal to the toothed sides solely by the pinions. Hence, at such instances, any additional guiding means for guidance of the rack in the transverse directions normal to the toothed sides may be eliminated. Such arrangements may primarily be used at applications where the loads are comparatively low and the rack is comparatively short and/or not exposed to high transverse forces.

However, the longitudinal guiding of the rack by the normal forces of the meshing pinions may be also combined with different types of conventional linear guides, including guides that have a certain tolerance/play before engaging the rack. Hence, such additional guiding means may either be arranged with a certain limited play to the rack, with a close fit or being preloaded in order to accomplish strict guidance in the transverse directions of the rack. When the guiding means are arranged with a play to the rack, it will act as end-stops if the rack reach a certain excursion in lateral direction. When the guiding means are arranged with a close fit or being preloaded, the rack is forced to the centre position with a tight tolerance, thus providing a rigid guiding of the rack position independent of the normal forces from meshing pinions. Examples of such additional guiding means that may be utilized comprise sliding guides, roller guides, reciprocating ball or roller guides.

The transverse guiding achieved by the pinions' torsional resilient flexibility described above and its even distribution of power to the cog flanks greatly reduces the load on the additional longitudinal guiding means that might be needed to absorb internal and external side forces acting on the rack, such as e.g. gravity forces and misalign force vectors to the longitudinal guidance means. This can be done by arranging a homogenous double sided toothed rack or two single toothed racks that directly or indirectly through e.g. a H-beam are supporting each other servicing at least two opposite running pinions with at least two flexible meshing primary gears and longitudinal guidance means. This arrangement will through the rack, neutralise most of the side forces generated by the gears and thus make almost no load to the longitudinal guidance means. These guiding means can thus be dimensioned just to take care of straightening the rack and external side forces in its way through the gearbox. The forces to create this function are comparatively.

This might be of importance especially when a large number of pinions are used such that the length of the gearbox increases. Furthermore, in certain applications, the longitudinal guiding does not need to be very tight, since the self adjustments through the mesh of the flexible primary gears will see to that a little gap in the longitudinal guiding as well as irregularities in the shape of the rack, will be compensated for.

The heavily reduced side forces on the longitudinal guidance means, will reduce friction losses, costs for material and manufacturing and will increase the load to volume and weight ratio as well as the service life of the guiding arrangement.

Additionally, at least one and preferably all output shafts or output shaft ends of the gear arrangement may be connected to a load such as e.g. an electrical generator, a motor or a high pressure pump for e.g. fresh water generation, a freewheel, a flywheel or combinations thereof. By this means the gear arrangement may be efficiently used in different electrical power generation installations and other power take off applications such as for instance in wave power generating installations. A freewheel may be connected to at least one output shaft. By arranging a freewheel between each output shaft end and e.g. a generator and possibly but not necessarily a flywheel, it is possible to drive each set of flywheel/generator to rotate in a single rotational direction during the reciprocal movement of the rack. Such an arrangement of a first and second freewheel which are arranged to transfer torque to the respective load only during movement of the rack in one respective direction also entails for other advantages. By this arrangement, generators or other rotational loads connected to the first and second output shafts may continue to rotate in a respective single rotational direction during reciprocal movement of the rack in both directions. One of the loads is thus energized during movement of the rack in a first direction and the other load is energized during movement of the rack in the other direction. Both loads may however continue to rotate in its single rotational direction during the entire rack cycle. This entails for that the inertia of the entire system is substantially reduced whereby the wear of the gear components with reciprocating motion is decreased and the efficiency of the system is increased. Additionally, when an electrical generator or alternator is connected to an output shaft of the respective freewheel, the freewheel arrangement entails for that a more uniform electrical power is generated.

The freewheel arrangement results in that the load resistance from each output shaft is substantially higher during movement of the rack in one direction than in the other. This could result in that one flank of the cogs of the pinions and the rack would be subject to a substantially higher load and wear than the opposite flank. However, since all pinions and all toothed sides of the rack may be arranged to be active in transferring torque in both reciprocal movements of the rack and to both output shafts of the freewheels, all cog flanks of the pinions and all toothed sides of the rack will be evenly worn. This further entails for an increased and predictable service life of the arrangement.

When an electrical generator is connected to an output shaft via a flywheel, the flywheel may form part of a rotor of the generator. Hereby a uniform generation of electrical power is facilitated in a space saving and reliable manner.

The same combinations of freewheels and flywheels may be combined with said shaft ends and driving motors to form different configurations of linear drive units.

The rotational axes of the out- or input shaft or shafts may be arranged centrally at the longitudinal centre line of the rack. In cases where the out- or input shaft exhibits two shaft ends being connectable to a load or drive means, this requires that the rack either exhibits a longitudinal slot or is divided into two longitudinally extending rack halves for allowing the output shaft to extend trough the rack during its reciprocal movement.

Alternatively, the rotational axes of the out- or input shaft or shafts may be arranged off-centre with regard to the rack. In such case the rotational axes of the out- or input shaft or shafts may be arranged within a geometrical line defined by the rotational axes of the primary gears. This entails for a further reduction of the total space requirements of the gear arrangement.

One of the first and second parts of the elastically deformable fixation device may comprise a number of protruding pins which are received in corresponding recesses arranged in the other of the first and second parts and wherein an elastically compressible material is arranged between the pins and a wall of the respective cavity. Hereby the torque is effectively transmitted between the two parts by any desired number of pins, which entails for that the torque capacity of the cog wheel arrangement may be readily adapted to any desired value.

The pins and recesses may extend in parallel to the rotational axis of the pinion and primary gear. This arrangement facilitates manufacture and mounting of the two parts.

With regard to the elastically deformable fixation device, the first part may comprise a hub portion arranged to be fixed to a shaft and a flange portion extending radially outwards from said hub portion, said pins extending from said flange portion in a direction perpendicular to the radial plane of said flange portion and wherein the second part comprises an annular portion presenting a number of axially extending openings, each opening receiving a respective pin and a cylindrical sleeve of an elastically compressible material, each sleeve being arranged on a respective pin. This arrangement entails for a comparatively simple and reliable construction which may be manufactured and mounted at a comparatively low cost.

The annular portion may present a central axial opening in which the hub portion is received. Hereby radial guidance of the second part is readily achieved.

The annular portion of the second part may present a peripheral, axially extending annular edge portion which receives the flange portion of the first part. This entails for additional guidance in the radial direction while still allowing for a simple mounting of the constituent parts of the cog wheel arrangement.

The gear arrangement may comprise a housing defining an interior space, wherein the rack is linearly movable through the interior space and the pinions are arranged in said interior space, journalled in bearings which are fixed to the housing. By this means a comparatively simple and reliable design of the arrangement may be achieved. Alternatively, the housing may be formed in a single piece. For both alternatives the housing may preferably be formed of casted, moulded or machined material, such as iron, aluminium, steel alloys, composites and in some low load applications, moulded polymer material. The accuracy of machining or moulding process as well as the rigidity and stability of the finished housing may be a critical parameter to maintain the desired spatial orientation of the gear components that that contribute to the load sharing between the gear wheels.

Each pinion may be fixed to its first and, where applicable, second primary gears by means of a first pinion shaft, which first pinion shaft, at each axial side of the first pinion extends through a respective wall of the housing, and wherein said first and possibly second primary gears are arranged in a respective recess formed in the outside of a respective one of said opposed walls. Hereby a rigid and reliable fixation of the pinions and the primary gears may be accomplished in a reliable manner. This embodiment also entails for an efficient manufacturing and maintenance of the gear arrangement.

Each out- or input shaft may at least partly be arranged in a recess formed in the outside of a respective one of said walls and a cover plate may be fixed to the housing and arranged to sealingly cover said recesses accommodating the gears and the out- or input shafts. This entails e.g. for that lubrication of the moving parts of the gear arrangement may be accomplished in a simple and efficient manner The interior space and the recesses may be filled with lubrication media, such as oil. However, at applications with higher rotational speeds, the interior space may be partially filled. So called drip lubrication may also be favourable at some applications. The housing may comprise one monolithic part or two housing halves, each housing half forming one of said opposed walls. This also entails for a comparatively simple, reliable and cost efficient manufacturing of the gear arrangement and facilitates maintenance thereof.

By adding any desirable number of first and second pinions and a corresponding number of first and possible second primary gears, the total load may be distributed to a corresponding number of pinions and primary gears. Thereby, the load and wear of each pinion and primary gear is reduced further while keeping the same total torque capacity of the gear arrangement. Alternatively the toque capacity may be increased while maintaining the load on the pinions and the primary gears.

Preferably such addition of pinions should be made with pairs comprising a first pinion arranged at one side of the rack and a second pinion arranged at the opposing side of the rack, for maintaining an equal load on all toothed sides of the rack.

When the gear arrangement is used for transforming an incoming reciprocating movement into a rotational movement and torque of at least one output shaft, different types of loads may be connected to the output shaft. Examples of such loads are electrical generators and pumps, e.g. pumps for producing fresh water.

When the gear arrangement is used for transferring an incoming rotational motion and torque into an outgoing linear movement and force, one or several input shafts may be connected to many different types of rotational drive means. Examples of such drive means are electrical, pneumatic or hydraulic motors.

Further objects and advantages of the invention will appear from the following detailed description of embodiments and from the appending claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. Any configuration or feature of the gear arrangement described for the use at applications for linear-to-rotational transfer may also be used at applications for rotational-to-linear transfer and vice versa. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which:

FIGS. 2b and 2d are a side elevation views and FIG. 2c a top elevation view respectively of the gear arrangement shown in FIG. 2a.

FIGS. 4a and 4b to 10a and 10b are schematic illustrations of different exemplifying configurations of the gear arrangement. For each pair of a and b figures, FIG. a is a top elevation schematic view and b is a schematic longitudinal section.

FIGS. 11a-c illustrates a rack of a gear arrangement according to an embodiment, wherein FIG. 11a is a top elevation view, FIG. 11b is a longitudinal section and FIG. 11c is a cross section.

FIGS. 13a-c illustrates a second elastically deformable fixation device, wherein FIG. 13a is a side elevation view, FIG. 13b a perspective view and FIG. 13c a longitudinal section thereof.

FIGS. 15a-f illustrates a fourth elastically deformable fixation device, wherein FIG. 15a is a side elevation view, FIG. 15b a perspective view and FIG. 15c a longitudinal section thereof. FIG. 15d is an exploded view of a detail of the fourth fixation device, FIG. 15e is a longitudinal section and FIG. 15f a perspective view thereof.

FIGS. 16a-c illustrates a fifth elastically deformable fixation device, wherein FIG. 16a is a side elevation view, FIG. 16b a perspective view and FIG. 16c a longitudinal section thereof.

FIGS. 26a and 26b are a longitudinal section in perspective view and a longitudinal section respectively of a detail of the wave energy converter shown in FIG. 24.

FIGS. 27a-c illustrate schematically a further embodiment of the gear arrangement, wherein FIG. 27a is a top elevation view, FIG. 27b is a section along line b-b and FIG. 27c is a section along line c-c in FIG. 27a.

FIGS. 28a-d illustrate schematically another embodiment of the gear arrangement, wherein FIG. 27aa is a top elevation view, FIG. 2bb a bottom elevation view, FIG. 28c is a view corresponding to 28a, wherein some hidden components are indicated by dashed lines and FIG. 28e is a central longitudinal section through the gear arrangement shown in FIG. 28a.

DETAILED DESCRIPTION OF EXEMPLIFYING EMBODIMENTS

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

In this document the following definition of terms and expressions are used if not stated otherwise: A pinion means a cog wheel which meshes with a toothed side of a reciprocally movable rack. A primary gear is a cog wheel which is connected to a pinion by means of a shaft. A secondary gear is a cog wheel which meshes with a primary gear. A tertiary gear is a cog wheel which is connected to a secondary gear by means of a shaft. A quaternary gear is a cog wheel which meshes with a tertiary gear. A quinary gear is a cog wheel which is connected to a quaternary gear by means of a shaft. A senary gear is a cog wheel which meshes with a quinary gear and so on.

Figure 1A:
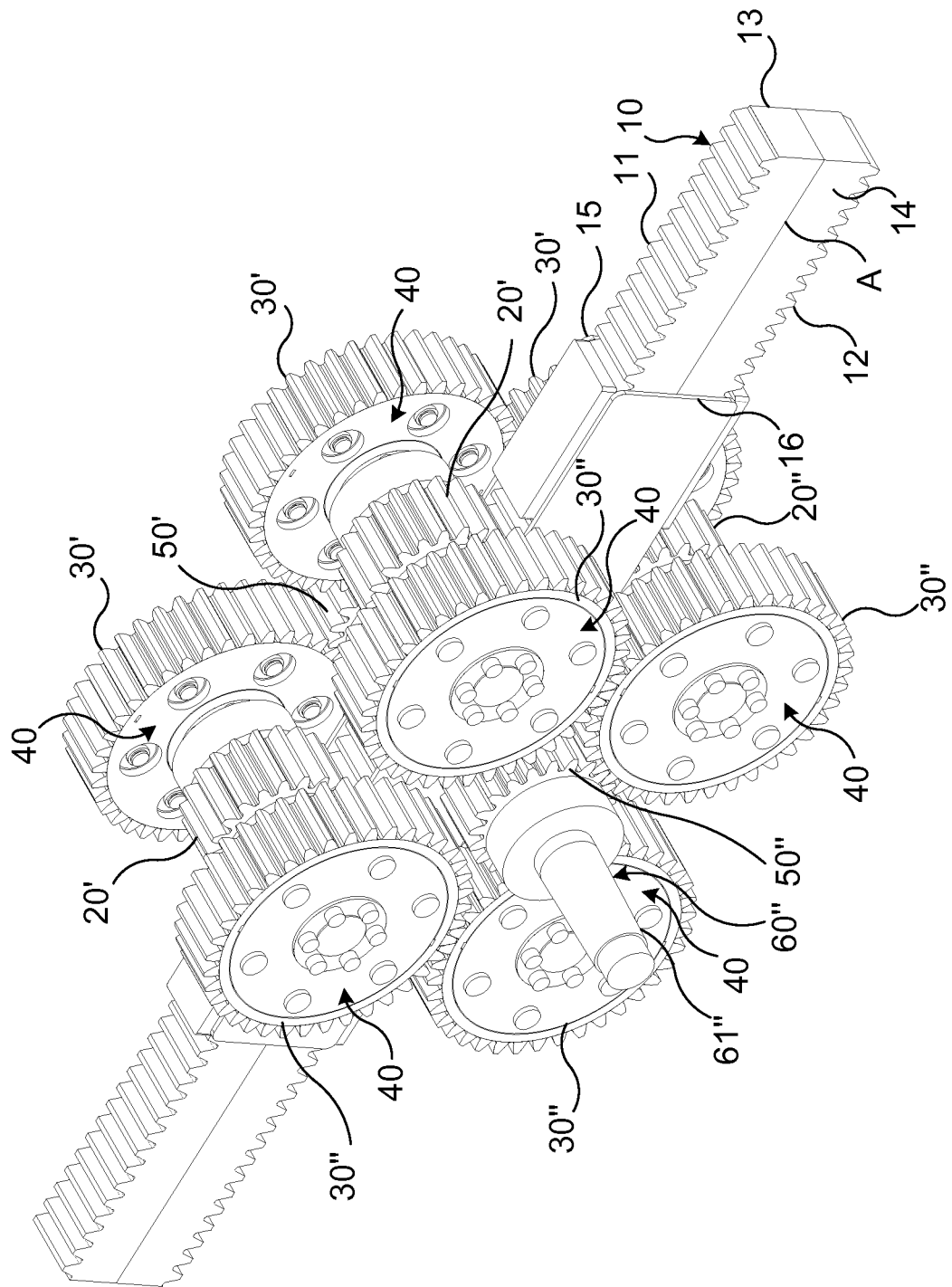
FIG. 1a is a perspective view of a gear arrangement according to a first embodiment of the invention.
Figure 1B:
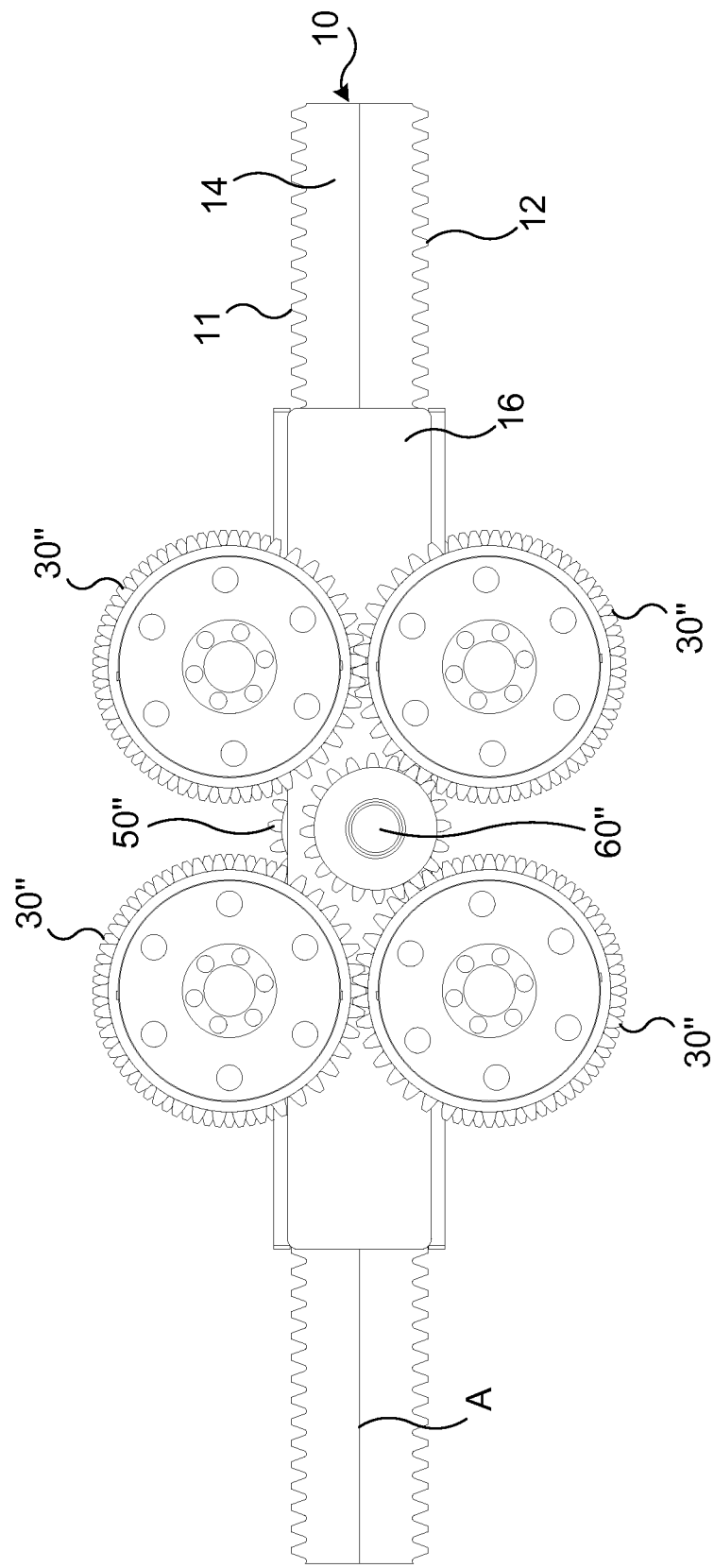
FIGS. 1b and 1c are a side elevation and a top elevation view respectively of the gear arrangement shown in FIG. 1a FIG. 2a is a perspective schematic view of a gear arrangement according to a second embodiment of the invention.
Figure 1C:
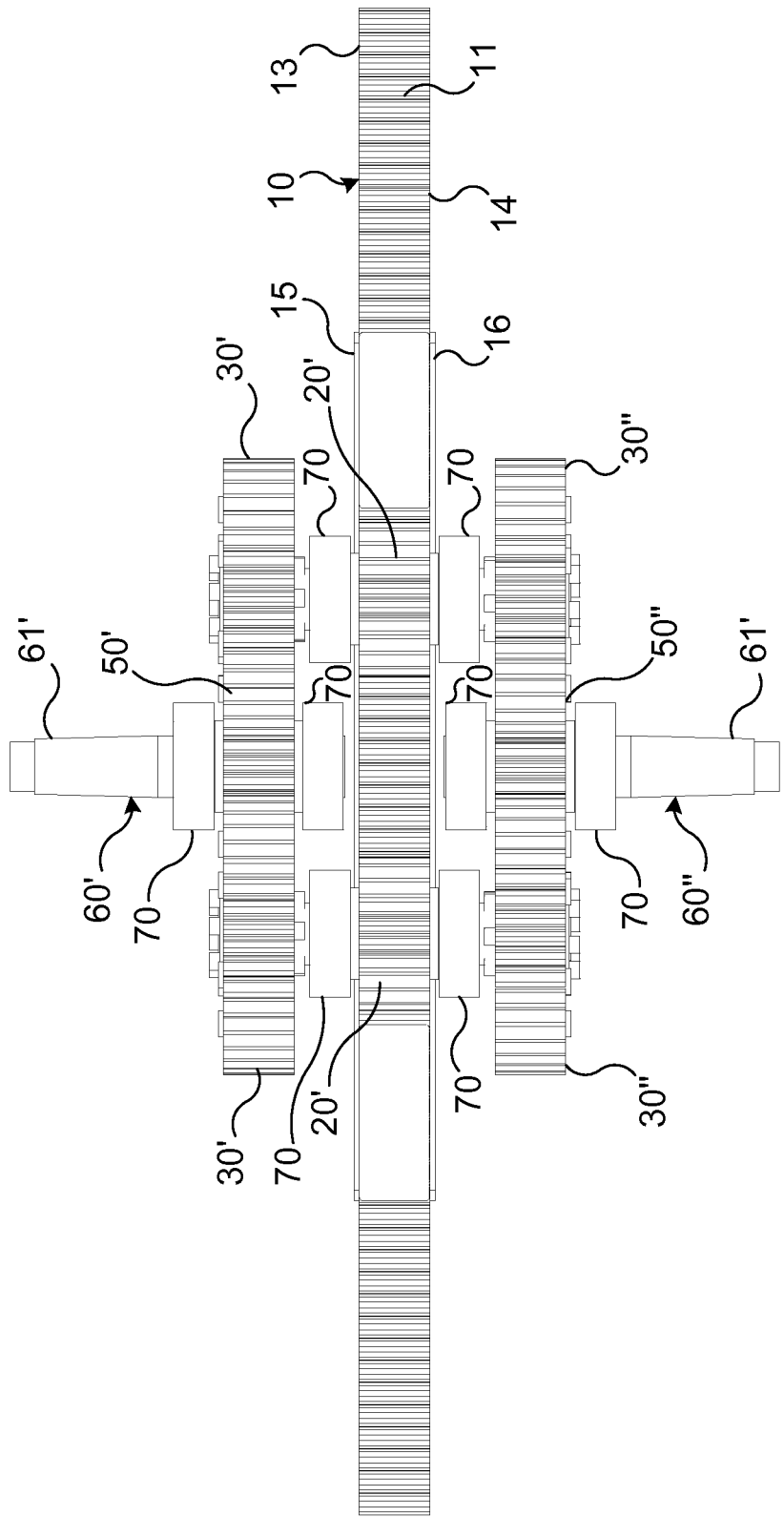
Figure 2A:
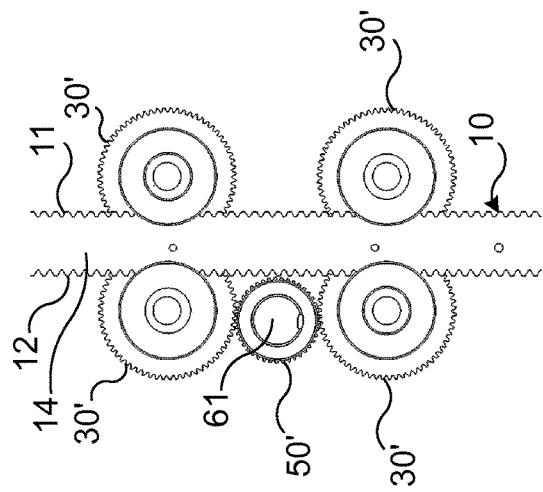
Figure 2B:
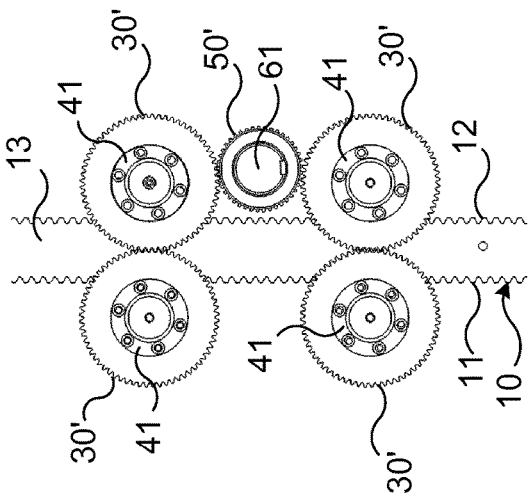
Figure 2C:
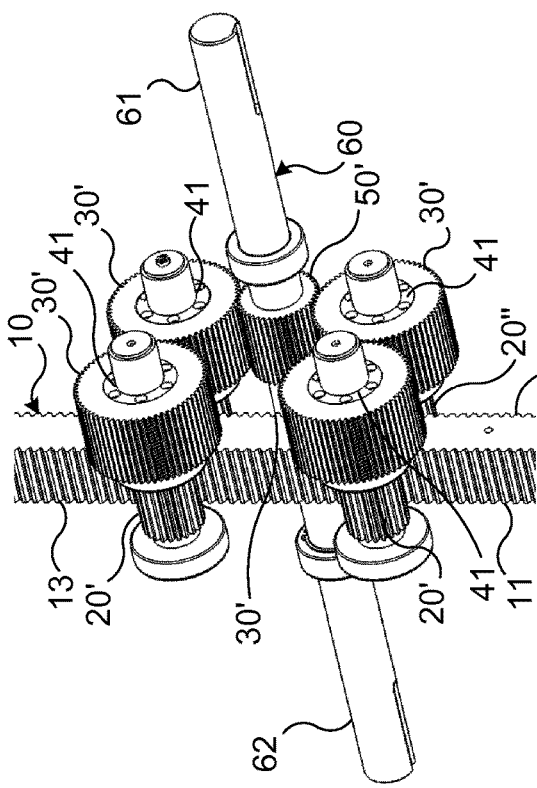
Figure 2D:
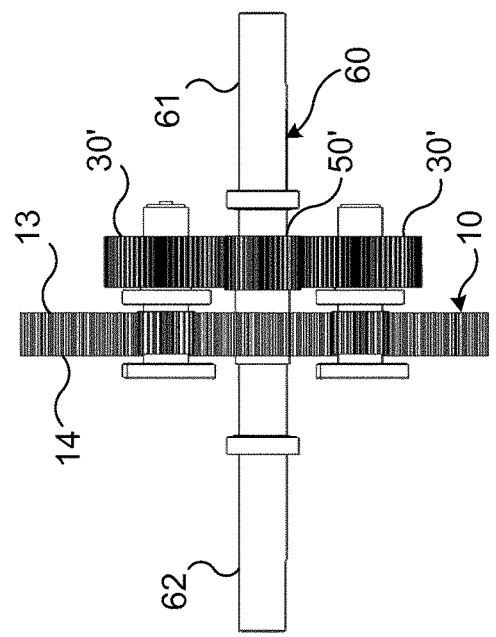
Figure 3B:
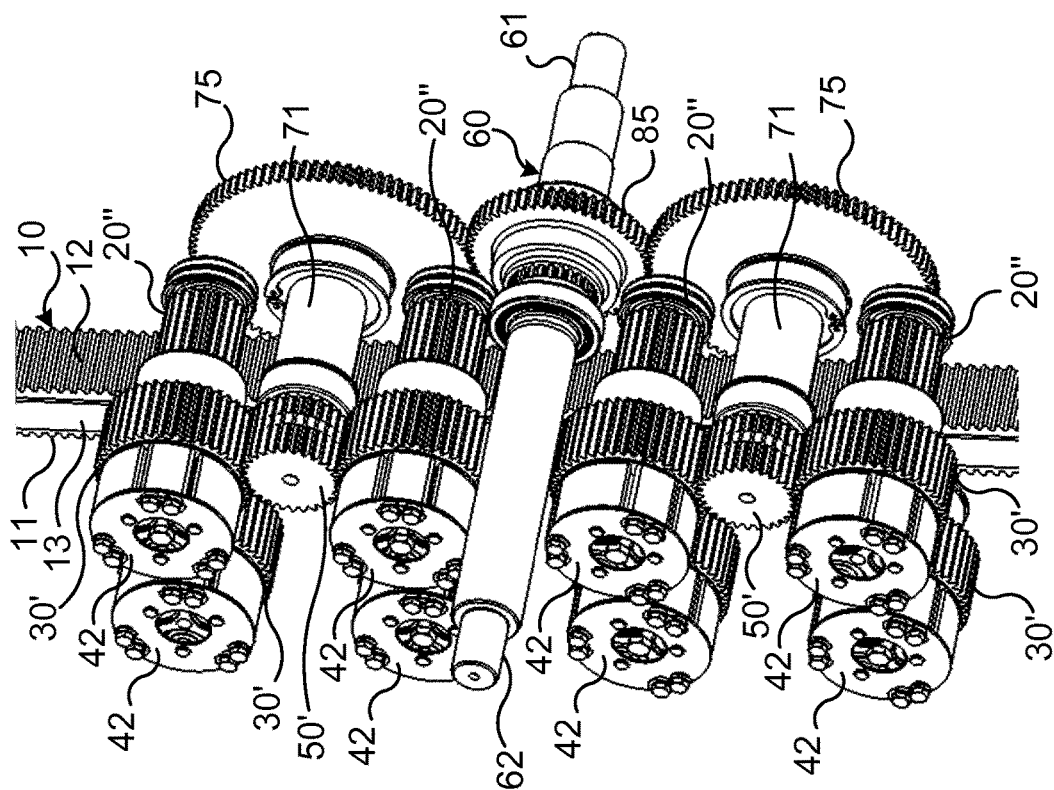
FIGS. 3a and 3b are perspective schematic views of a gear arrangement according to a third embodiment of the invention.
Figure 3A:
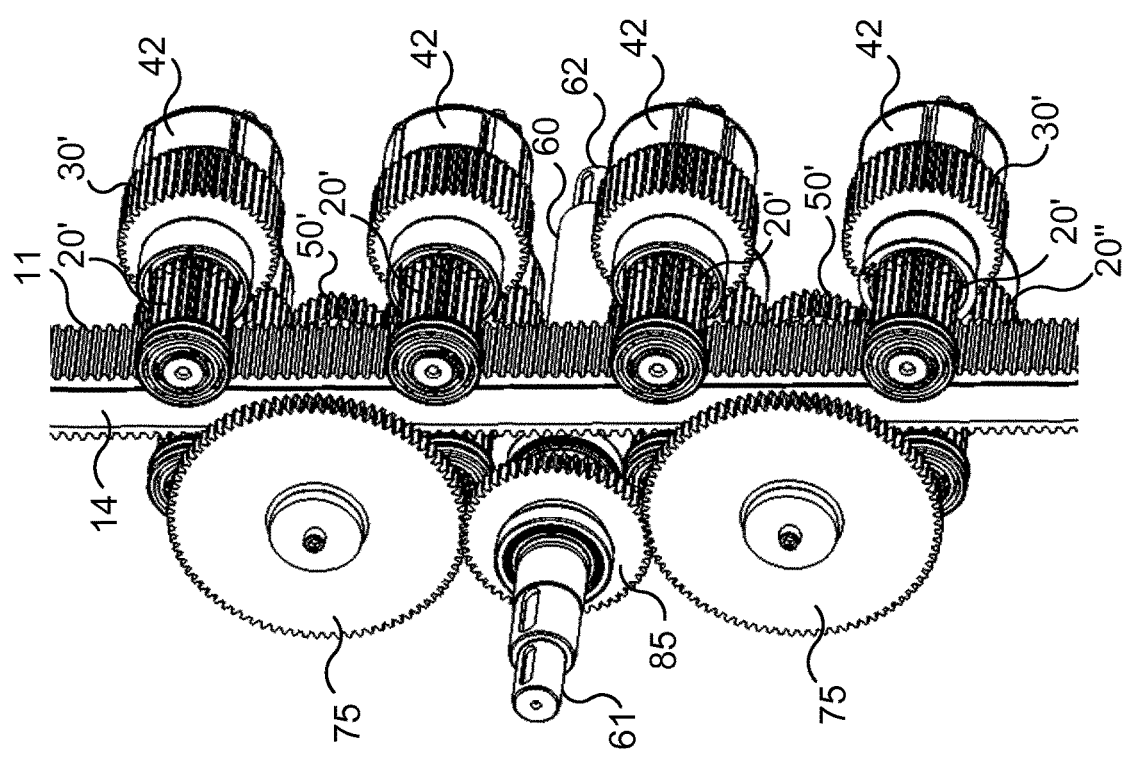
Figure 3E:
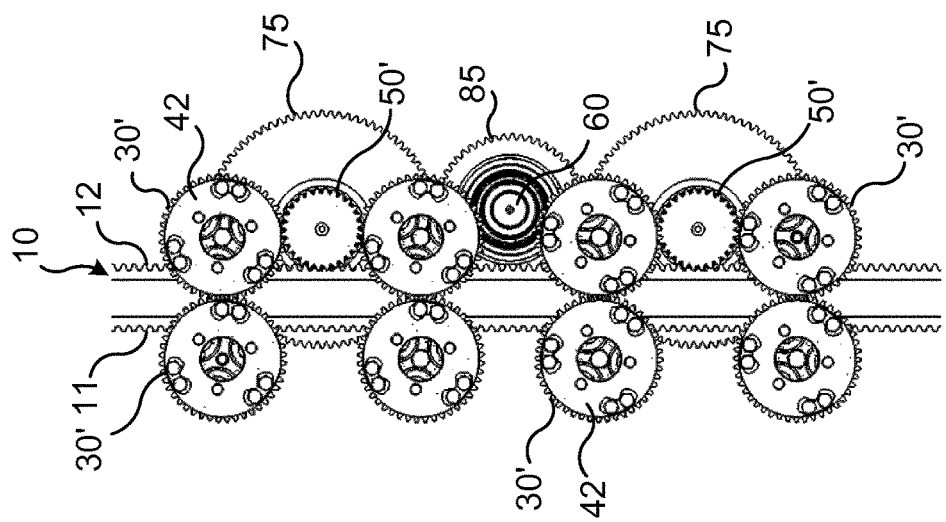
FIGS. 3c and 3e are a side elevation views and FIG. 3d a top elevation view respectively of the gear arrangement shown in FIGS. 3a and 3b.
Figure 3D:
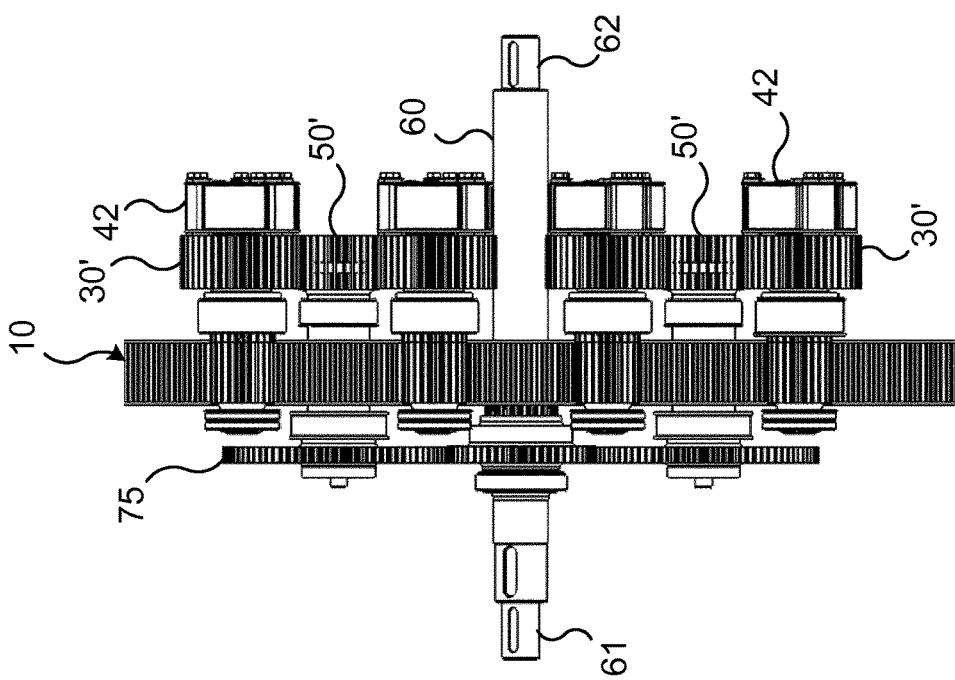
Figure 3C:
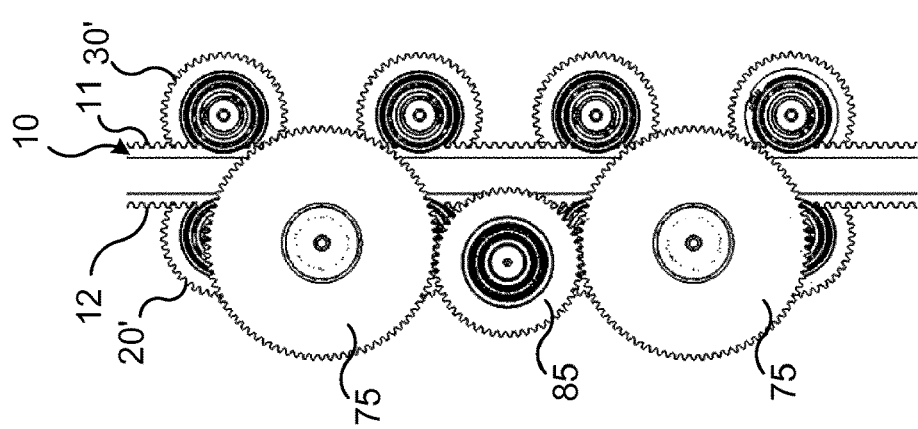

FIGS. 1a-c illustrates a gear arrangement according to a first embodiment of the invention. This gear arrangement comprises a rack 10 which exhibits a longitudinal axis A and which is reciprocally displaceable along its longitudinal axis A. The rack exhibits a first toothed side 11 and a second toothed side 12. The toothed sides 11, 12 extend essentially in parallel with the longitudinal axis A and are arranged mutually opposite to each other. In the illustrated example, the teeth are straight, i.e. extend perpendicular to the longitudinal axis A. The rack may however also be provided with one or more obliquely toothed sides.

The rack 10 also exhibits a third 13 and a fourth 14 side that extend in parallel with the longitudinal axis A. The third 13 and fourth sides are arranged mutually opposite to each other perpendicular to the first 11 and second 12 sides. The rack 10 thus exhibits a generally rectangular cross section.

Two guiding plates 15, 16 are arranged in parallel with the third 13 and fourth 14 side of the rack 10 for guiding the movement of the rack in the directions normal to the third 13 and fourth 14 sides.

Two first pinions 20' are arranged at the first side 11 of the rack. The rotational axes of the first pinions are perpendicular to the longitudinal axis A of the rack 10. The first pinions 20' are meshing with the first toothed side 11 of the rack 10. Each first pinion 20' is connected with a first primary gear 30', which is arranged at a first axial side of the respective first pinion 20'. The first pinions 20' are fixed to the respective first primary gear 30' by means of fixation device 40, which allow a limited relative resilient rotation between the respective first pinions 20' and first primary gears 30'. The fixation device 40 will be explained more in detail below.

At a second axial side of the first pinions 20', each first pinion 20' is connected to a second primary gear 30". Also this connection is accomplished by means of a fixation device 40, which allows a limited relative rotation between the first pinions 20' and the respective second primary gear 30".

Two second pinions 20" (only one visible in FIGS. 1a-c) are arranged at the second toothed side 12 of the rack 10. The rotational axes of the second pinions 20" are perpendicular to the longitudinal axis A of the rack 10. The second pinions 20" are meshing with the second toothed side 12 of the rack 10. Each second pinion 20" is connected to a first primary gear 30', which is arranged at a first axial side of the respective second pinion 20". Also the second pinions 20" are fixed to the respective first primary gear 30' by means of fixation device 40, which allows a limited relative resilient rotation between the respective second pinion 20" and first primary gears 30'.

At the second axial side of the second pinions 20", each second pinion 20" is connected to a second primary gear 30". Also this connection is accomplished by means of a fixation device 40, which allows a limited relative rotation between the second pinions 20" and the respective second primary gear 30". The first 20' and second 20" pinions are arranged in pairs, such that one first pinion 20' and a corresponding second pinion 20" are aligned in the normal direction of the toothed first 11 and second 12 side of the rack 10. All first 20' and second 20" pinions have the same diameter and module. Also, all first 30' and second 30" primary gears have the same diameter and module. The diameter of the primary gears 30', 30" is larger than the diameter of the pinions 20', 20". The diameters of the pinions and the gears are chosen, in relation to the width between the first 11 and second toothed sides of the rack 10, such that, for each pair of first 20' and second 20" pinions, the first primary gears 30' mesh with each other outside the first side 11 of the rack 10. Correspondingly, the second primary gears 30" of each pair of first 20' and second 20" pinions mesh with each other outside the second side 12 of the rack 11.

The two first primary gears 30' connected to a respective first pinion 20' are further meshing with one and the same first secondary gear 50'.

Correspondingly, the two second primary gears 30" connected to a respective second pinion 20" are meshing with one and the same second secondary gear 50". The first secondary gear 50' is fixed to a first out- or input shaft 60' having a first shaft end 61', which is arranged distal to the rack 10 outside the first side 11 of the rack 10. The second secondary gear 50" is fixed to a second out- or input shaft 60", having a first shaft end 61" arranged distal to the rack 10, outside the second side 12 of the rack 10.

The gear arrangement also comprises a number of bearings 70, by which the pinions 20', 20", the primary gears 30', 30, the secondary gears 50', 50" and the out- or input shafts 60', 60" are journalled to a gear housing (not shown).

At the gear arrangement according to this first embodiment, all first 20' and second 20" pinions are mechanically connected to the first out- or input shaft 60', via the first primary gears 30' and the first tertiary gear 50'. All first 20' and second 20" pinions are also mechanically connected to the second out- or input shaft 60" via the second primary gears 30" and the second tertiary gear 50". All first primary gears 30' are thus also mechanically connected to the first out- or input shaft 60' and all second primary gears 60" are mechanically connected to the second out- or input shaft 60".

In cases where the gear arrangement is used for transforming a linear motion or force applied to the rack 10, into a rotational motion or torque, the first 60' and second 60" out- or input shafts each form an output shaft. When a rotational motion or torque is to be transformed into a linear motion or force, the first 60' and second 60" out- or input shafts, each form an input shaft.

Since all first 20' and second 20" pinions are mechanically connected to the same out- or input shafts 60', 60", the gear arrangement generally constitutes an over determined system. However, the problems which, as described above, are related to such over determined systems are eliminated or at least reduced by the elastically deformable fixation devices 40 which allow a limited elastic relative rotation between the pinions 20', 20" and the primary gears 30', 30". These fixation devices 40 allows each pinion 20', 20" to individually adjust its engagement with the toothed sides 11, 12 of the rack 10, such that the load transferred by the gear arrangement is evenly distributed to all flanks of the pinions 20', 20" and toothed sides 11, 12 which are simultaneously in engagement. By this means, the wear of all flanks will be essentially the same whereby the pinions 20', 20" may be dimensioned with a reduced safety margin. This in turn results in that the pinions 20' 20" and there by also the primary 30', 30" and tertiary 50', 50 gears may be given smaller dimensions than what would otherwise be required, such that the over all load to weight and volume ratio may be significantly reduced.

The torsional resiliency achieved by the fixation devices 40 also contributes to reduce lateral forces produced by the gears in the gearbox to a minimum by being neutralized through the rack 10, during its longitudinal reciprocal movement. Due to any irregularities in the form of the rack 10, the forces that the rack 10 exerts to the pinions in the general directions normal to the respective toothed sides 11, 12 may vary very little, during longitudinal movement of the rack. Such variations in the exerted forces are however absorbed by the pinions' 20' 20" ability to individually adjust their engagement with the rack 10. By this means it is possible to utilize the first 20' and second 20" pinions as the sole means for guiding the rack 10 in the transverse directions, normal to the first 11 and second 12 toothed sides.

However, if the rack exhibits comparatively large irregularities in shape along its longitudinal extension or if the rack is heavily bent, there exists a risk that some or all pinions 20' 20" occasionally will reach their maximum rotation relative to their respective primary gear 30', 30". The torsional flexibility may then be said to bottom out. If this occurs, the elastically deformable fixation devices 40 will not be able to compensate for the over determination of the gear system such that the wear of the flanks may increase. At such applications it may be appropriate to arrange additional guiding means (not shown) for the rack, which means limits bending and transverse movement of the rack in the direction normal to the toothed sides 11, 12 of the rack 10.

FIGS. 2a-d illustrate a gear arrangement according to a second embodiment of the invention. At this embodiment, the gear arrangement comprises a rack 10, having a first 11 and a second toothed side. The rack 10 has a generally rectangular cross section and further exhibits opposing third 13 and fourth 14 sides.

Two first pinions' 20' are meshing with the first toothed side 11 and two second pinions 20" are meshing with the second toothed side 12. Each first 20' and second 20" pinion is, at a first axial end, fixed to a first primary gear 30'. Each primary gear is fixed to the respective pinion 20', 20" by means of a elastically deformable fixation device 41, which allows a limited elastic relative rotation between the primary gear 30' and the respective pinion 20', 20". The pinions 20', 20" and primary gears 30' are arranged in pairs, such that each pair comprises a first 20' and a second 20" pinion aligned on a common normal to the first 11 and second 12 toothed sides and their respective primary gear 30' and such that the primary gear 30' in each pair mesh with each other.

A secondary gear 50' is rotatably arranged between the two primary gears 30' that are fixed to a respective second pinion 20' and meshes with these two primary gears 30'. The secondary gear 50' is fixed to an out- or input shaft 60. The out- or input shaft 60 exhibit a first shaft end 61 arranged generally outside the third side 13 of the rack 10 and a second shaft end 62 arranged generally outside the fourth 14 side of the rack 10.

By this gear arrangement, the total load to be transferred by the gear arrangement is distributed between all first 20' and second 20" pinions. The elastically deformable fixation devices 41, enhances the distribution of the load to all flanks of the pinions 20', 20" and the toothed sides 11, 12 of the rack that are in simultaneous engagement.

In cases where the gear arrangement is to be used for transforming an incoming reciprocal movement of the rack into a rotational movement of the out- or input shaft 60, this shaft 60 forms an output shaft. A load such as an electrical generator (not shown) may be connected to each shaft end 61, 62. Preferably, the generators are connected to the respective shaft end 61, 62 by means of a respective freewheel (not shown) arranged between the respective shaft end 61, 62 and generator. A first freewheel is arranged to transmit rotational movement of the shaft 60 in a first rotational direction of the shaft 60 and to spin freely during rotation of the axe in a second opposite rotational direction. The second freewheel is arranged such that it transfers rotational movement in the second rotational direction and spins freely in the first rotational direction. By this means, all pinions 20', 20" and primary gears 30' evenly participate in transferring load from the rack 10 to the generators during movement in both reciprocal movements of the rack 10.

This entails the advantage that all pinions 20', 20" and primary gears 30' participate in all load transferring, whereby the dimensions of these components may be reduced. Additionally, by such an arrangement all engaging flanks will be evenly worn.

The first and second embodiments of the gear arrangement described above and illustrated in FIGS. 1a-c and 2a-d respectively may be said to constitute a one step gear arrangement.

FIGS. 3a-e illustrates a gear arrangement according to a third embodiment of the invention. This gear arrangement may be said to constitute a two step gear arrangement.

The two step gear arrangement shown in FIGS. 3a-e comprises a rack 10 with a generally rectangular cross section. The rack 10 exhibits opposing first 11 and second 12 toothed sides as well as opposing third 13 and fourth 14 non-toothed sides. The gear arrangement may be said basically to comprise two gear arrangements of the type illustrated in FIGS. 2a-d. It comprises four first pinions 20' meshing with the first toothed side 11 and four second pinions 20" meshing with the second toothed side 12. Each pinion 20', 20" is at corresponding axial ends connected to a primary gear 30' by mans of an elastically deformable fixation device 42, which allows a limited elastic relative rotation between the primary gears 30' and the respective pinion 20', 20". The pinions 20', 20" are arranged in pairs, such that each pair comprises a first 20' and a second 20" pinion aligned along a respective line, which is normal to the toothed sides 11, 12 of the rack 10. The primary gears 30' connected to a respective first 20' or second 20" pinion of each pair meshes with each other. The gear arrangement thus comprises four pairs of pinion and primary gear assemblies, wherein the primary gears 30' of each pair meshes with each other.

The gear arrangement further comprises two secondary gears 50'. The secondary gears 50' are arranged such that each secondary gear 50' meshes with two primary gears 30' connected to a respective second pinion 20", by means of the fixation device 42. Each secondary gear 50' is connected to a tertiary gear 75 by means of a secondary gear shaft 71. The gear shafts 71 extend across the rack 10, such that the secondary gears 50' are arranged generally outside the third side of the rack, whereas the tertiary gears 75 are arranged generally outside the fourth side 14 of the rack 10. By this means it is possible to achieve an increased symmetry of the gear arrangement with regard to the longitudinal axis of the rack.

A quaternary gear 85 is arranged generally between the two tertiary gears 75 and meshes with both tertiary gears 75. The quaternary gear 85 is fixed to an out- or input shaft 60, exhibiting a first 61 and a second 62 shaft end. The shaft ends 61, 62 are arranged generally outside opposing non-toothed sides of the rack 10 and may be connected to a respective load or drive means (not shown).

This gear arrangement thus constitutes a two step gear arrangement wherein the load to be transferred by the arrangement is evenly distributed between all eight pinions 20', 20" and all eight primary gears 30'. This embodiment may thus be used when heavy loads are to be transferred and it is desirable to keep the dimensions of the pinions 20', 30" and the primary gears 30' small. The difference in diameters between the primary gears 30' and the secondary gears 50' constitute a first gear step and the difference in diameters between the tertiary gears 75 and the quaternary gear 85 constitutes a second gear step. By varying these differences in diameters, various gear ratios can be achieved.

In the embodiment shown in FIGS. 3a-e all eight primary gears are connected to the respective first or second pinion by means of an elastically deformable fixation device. However, it is sufficient that six of the primary gears are arranged torsionally flexible in relation to its pinion. In such case, three of the four primary gears transferring torque to each secondary gear should be fixed to its pinion by means of an elastically deformable fixation device.

It is also possible that the embodiments shown in FIGS. 1a-c and 3a-e are combined. In an embodiment which is not shown in the drawings, the gear arrangement comprises eight pinions divided into four first pinions meshing with a first toothed side of a rack, and four second pinions meshing with a second toothed side of the rack. Each first and second pinion is fixed to a first primary gear arranged at a first axial side of the first and second pinions.

Each first and second pinion is also fixed to a second primary gear arranged and a second axial side of the first and second pinions. Just as in FIGS. 3a-e, the pinions are arranged in pairs such that each pair comprises a first and a second pinion which are aligned along a normal to the toothed sides of the rack. This gear arrangement further comprises two first secondary gears each of which are meshing with two first primary gears being fixed to a respective first pinion. Two second secondary gears are arranged such that each secondary gear meshes with two second primary gears being fixed to a respective second pinion. Each first secondary gear is connected to a respective first tertiary gear via a shaft and each second secondary gear is connected to a second tertiary gear via a shaft. Both first tertiary gears meshes with a first quaternary gear and both second tertiary gears meshes with a second quaternary gear. In this way the gear arrangement forms a symmetrical gear arrangement comprising eight pinions sixteen primary gears, four secondary gears, four tertiary gears and two quaternary gears, wherein the load is distributed between eight pinions, four of which are meshing with one side of the rack and one of which are meshing with another side of the rack.

All primary gears may be fixed to its respective pinion by means of a elastically deformable fixation device. However, even if only twelve of the primary gears are connected to their respective pinions by means of an elastically deformable fixation device the advantages of the invention may be achieved satisfactory. In such case, three of the four primary gears transferring torque to each secondary gear should be fixed to its pinion by means of an elastically deformable fixation device.

According to a first variation this gear arrangement, both quaternary gears are connected to one and the same out- or input shaft. The out- or input shaft may comprise either one or two shaft ends that is/are connected to a rotational load or a rotational drive means, such as a motor. According to a second variation, each quaternary gear may be connected to a respective rotational load or rotational drive means. FIG. 4a-b to 10a-b are schematic drawings illustrating the basic principles of some further embodiments of the inventive gear arrangement. For each figure number, FIG. a is a schematic side elevation view corresponding to FIG. 1b and FIG. b is a cross section at line b-b of the respective FIG. a.

Figure 4B:
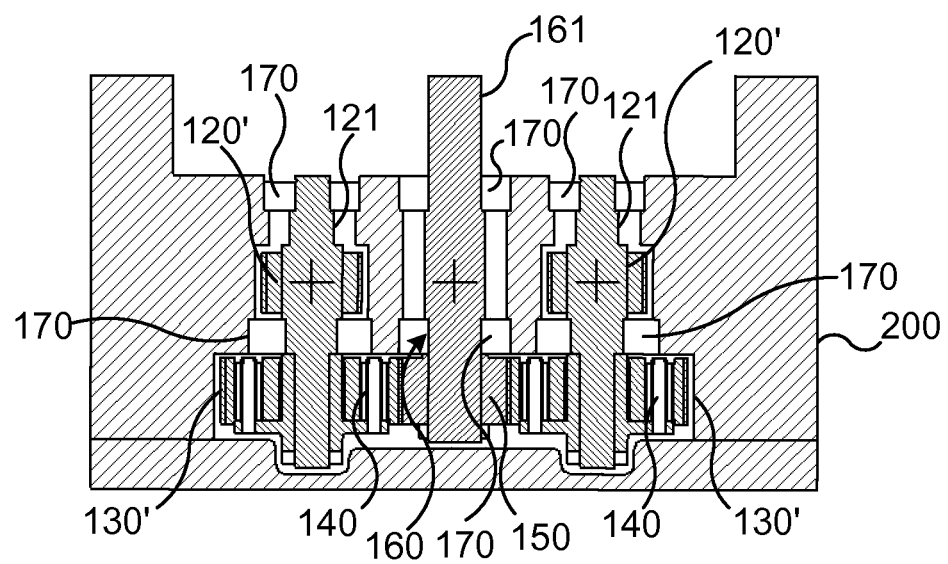
Figure 4A:
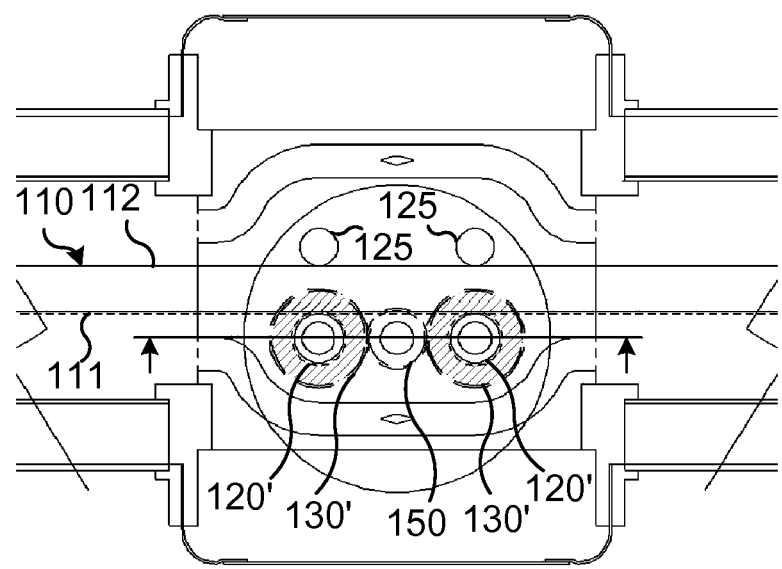

FIGS. 4a and 4b schematically illustrates an embodiment which is very simple and comprises comparatively few components. The gear arrangement comprises a rack 110, which is reciprocally movable along its longitudinal axis. The rack 110 exhibits a first side which is a toothed side 111 and a second side 112 which is not toothed. Two first pinions 120' are arranged such that they mesh with the first toothed side 111. Each first pinion is connected to a respective primary gear 130' by means of a elastically deformable fixation device 140 which allows limited relative rotation between the first pinions 120' and the respective primary gear 130'. Each first pinion 120' is rotationally fixed to a respective first shaft 121 and each primary gear 130' is fixed to the respective first shaft 121 by means of the fixation device 140.

A secondary gear 150 is arranged between the primary gears 130' and meshes with both primary gears 130'. The primary gears 130' and the secondary gear 150 are arranged below the rack as seen in FIG. 4b. The secondary gear 150 is fixed to an out- or input shaft 160. The out- or input shaft 160 extends past the rack 110 and exhibits a first shaft end which is arranged above the rack 110 as seen in FIG. 4b. The gear arrangement is accommodated in a gear housing 200. The first shafts 121 and the out- or input shaft 160 are journalled in bearings 170 to the gear housing 200.

Contrary to the previously described embodiments this embodiment does not comprise any second pinions being arranged at a second side of the rack. Instead at this embodiment, a pair of side supporting members 125 is arranged at and in supporting contact with the non toothed second side 112 of the rack 110. Each side supporting member 125 is aligned with a corresponding first pinion 120' along a line that is normal to the first toothed side 111 and the second non toothed side 112. During reciprocal movement of the rack 110, the side supporting members 125 are supportingly guiding the rack 110 in the normal direction away from the second non-toothed side 112. As in the previous embodiments the first pinions 120' function as guiding means for the rack in the normal direction away from the first toothed side 111 of the rack 110. Grace to the torsional flexibility achieved by means of the fixation device 140, some certain movements of the rack 110 and shape irregularities towards the first pinions 120' may be absorbed by the torsional flexibility to thereby promote a smooth reciprocal running of the rack 110. The side supporting members 125 of this embodiment will be exposed to considerably higher forces than any additional guiding means used in two-sided applications, where first and second pinions meshing with opposite sides of the rack absorb an important portion of transverse forces.

Figure 5B:
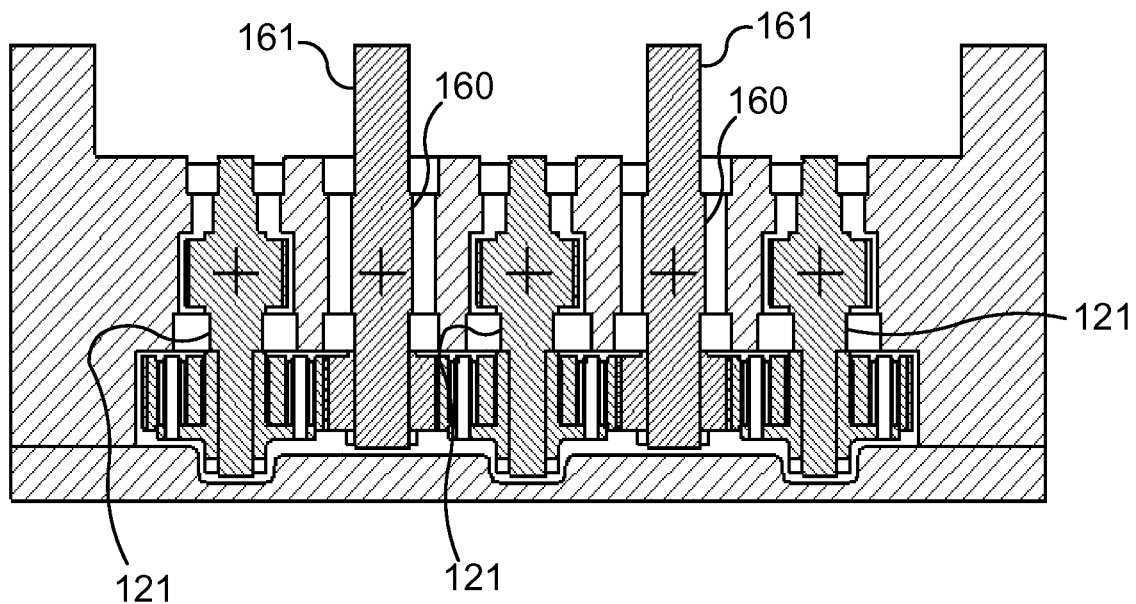
Figure 5A:
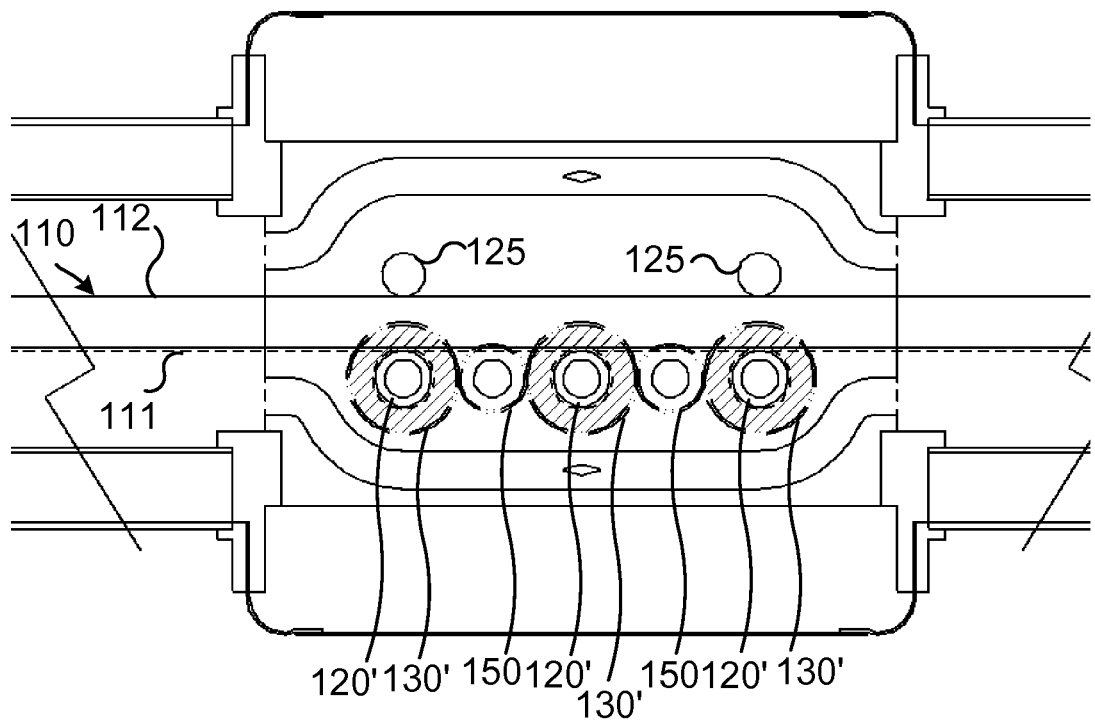

At the embodiment illustrated in FIGS. 5*a-b* the rack 110 exhibits a first toothed side 111 and a second non toothed side 112 which is arranged opposite to the first toothed side 111. Three first pinions 120' are arranged in meshing contact with the first toothed side 111. The two outmost first pinions 120' cooperate with a respective rotational side supporting member 125 to guide and support the rack in the transverse directions in a corresponding manner to what is described above with reference to FIGS. 4*a* and *b*.

Each first pinion 120 is connected to a respective primary gear 130' by means of a respective first shaft 121 and a respective elastically deformable fixation device 140, which allows a limited relative rotation between the first pinions 120' and the respective primary gear 130'. A secondary gear 150 is arranged between each primary gear 130' such that each secondary gear meshes with two adjacent primary gears 130'. Each secondary gear 150 is fixed to an out- or input shaft 160. Both out- or input shafts 160 extend past the rack 110 and exhibits a respective shaft end 161, arranged above the rack 110 as seen in FIG. 5*a*. This gear arrangement thus comprises two out- or input shafts 160 which may be connected to a respective or a common load or drive means (not shown).

Figure 6B:
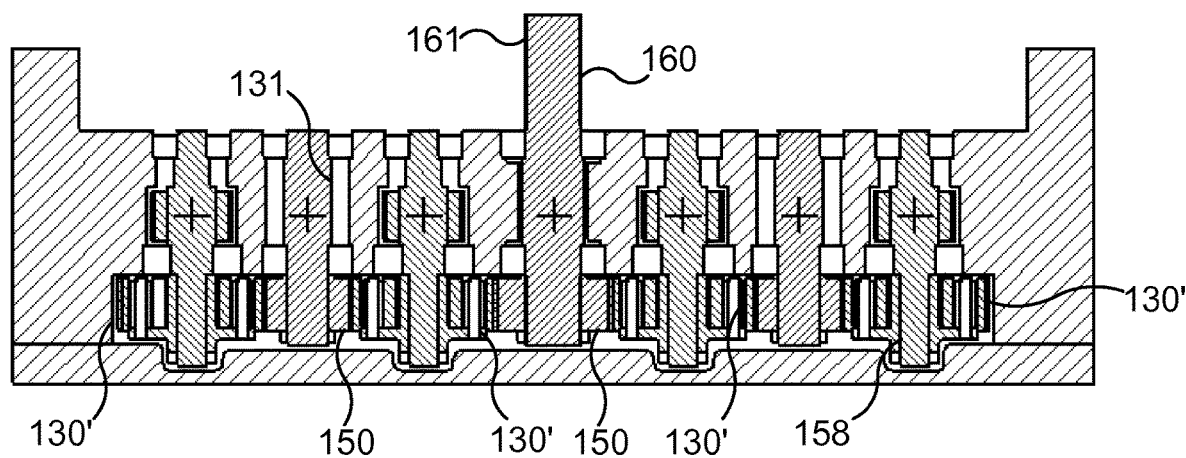
Figure 6A:
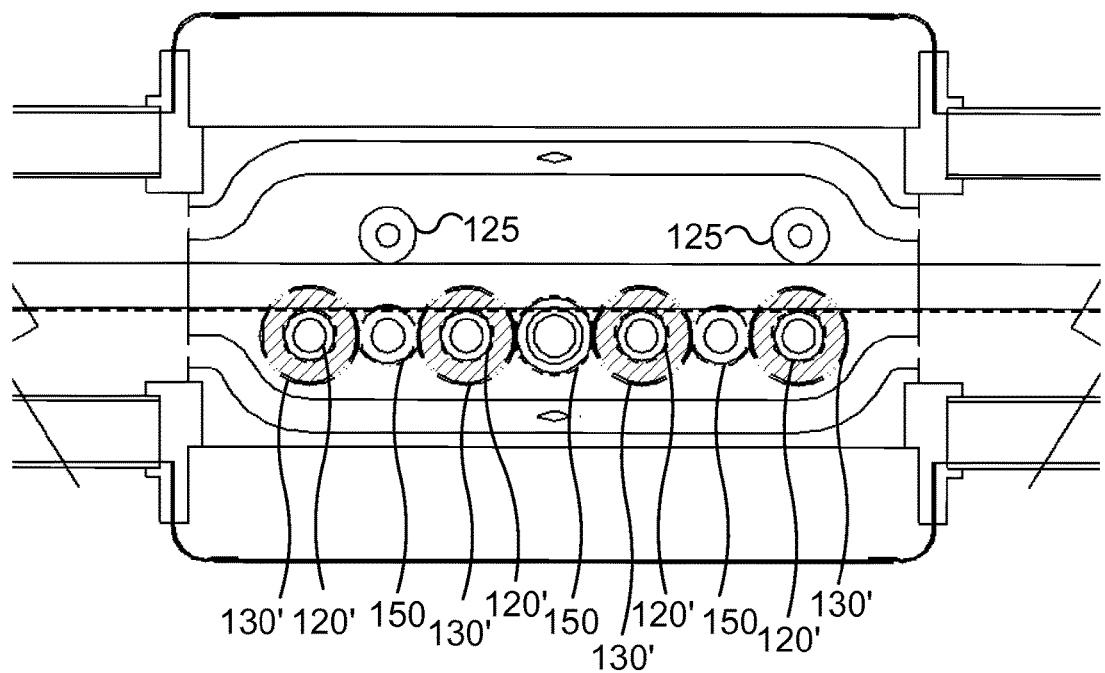

At the embodiment illustrated in FIGS. 6*a-b* the rack 110 exhibits a first toothed side 111 and a second non-toothed side. Just as described above with reference to FIGS. 4*a-b* and 5*a-b*, the rack 110 is guided and supported in the transverse directions by means of two first pinions 120' and two rotational side supporting members 125.

The gear arrangement comprises four first pinions 120' meshing with the toothed side 111 of the rack 110. Each first pinion 120 is connected to a respective primary gear 130' by means of a respective first shaft 121 and a respective elastically deformable fixation device 140, which allows a limited relative rotation between the first pinions 120' and the respective primary gear 130'. The secondary gears are arranged below the rack 110, as seen in FIG. 6*b*. A secondary gear 150 is arranged between each primary gear 130', such that each secondary gear meshes with two adjacent primary gears 130'. The two outmost secondary gears 150 are fixed to a respective gear shaft 131, which is journalled in bearings to a housing 200. The centrally arranged second gear is rotationally fixed to an out- or input shaft 160, which extends from the central secondary gear 130' past the rack and which, above the rack 110 exhibits a shaft end that might be connected to a load or a drive means (not shown). In this embodiment, the secondary gears 130' that are fixed to a gear shaft 131 functions as drivers, which transfer the torque and rotational movement from the outmost primary gears 130' to a respective one of the innermost primary gears 130' or vice versa. The innermost primary gears 130' in turn transfer the torque and rotational movement to or from the output- or input shaft 160. Thus at this embodiment, the load is divided between four pinions 120' meshing with a single toothed side 111 of the rack and the gear arrangement may be used to transfer a force or torque and motion between a single rack 110 and a single out or input shaft 160.

Figure 7B:
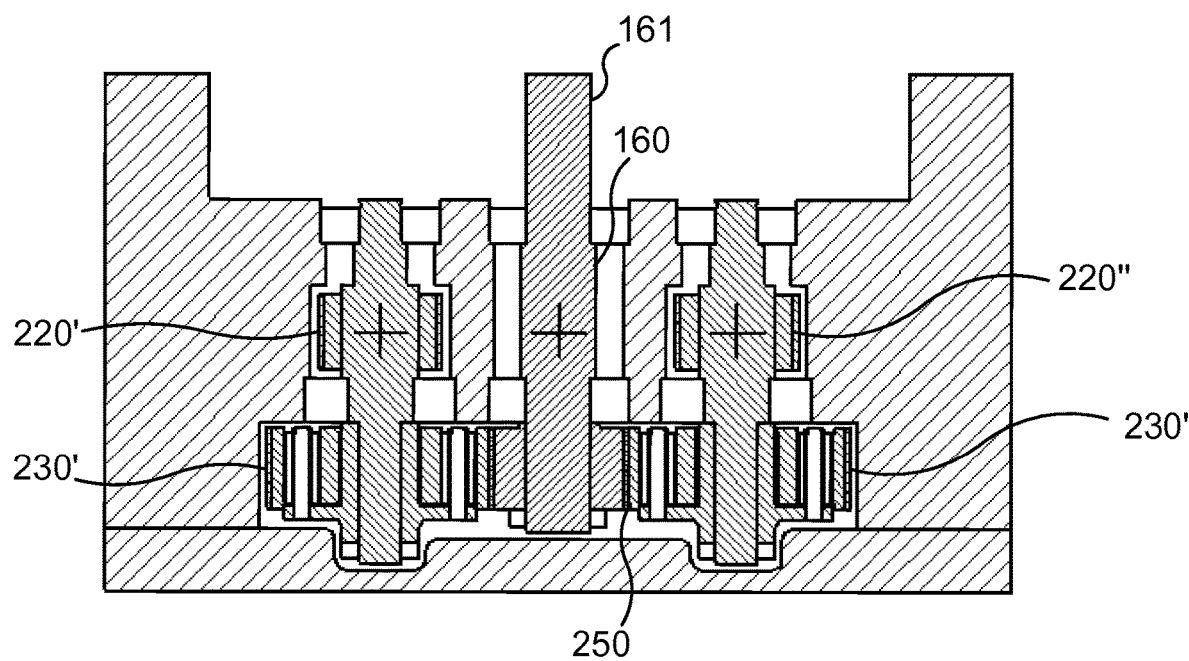
Figure 7A:
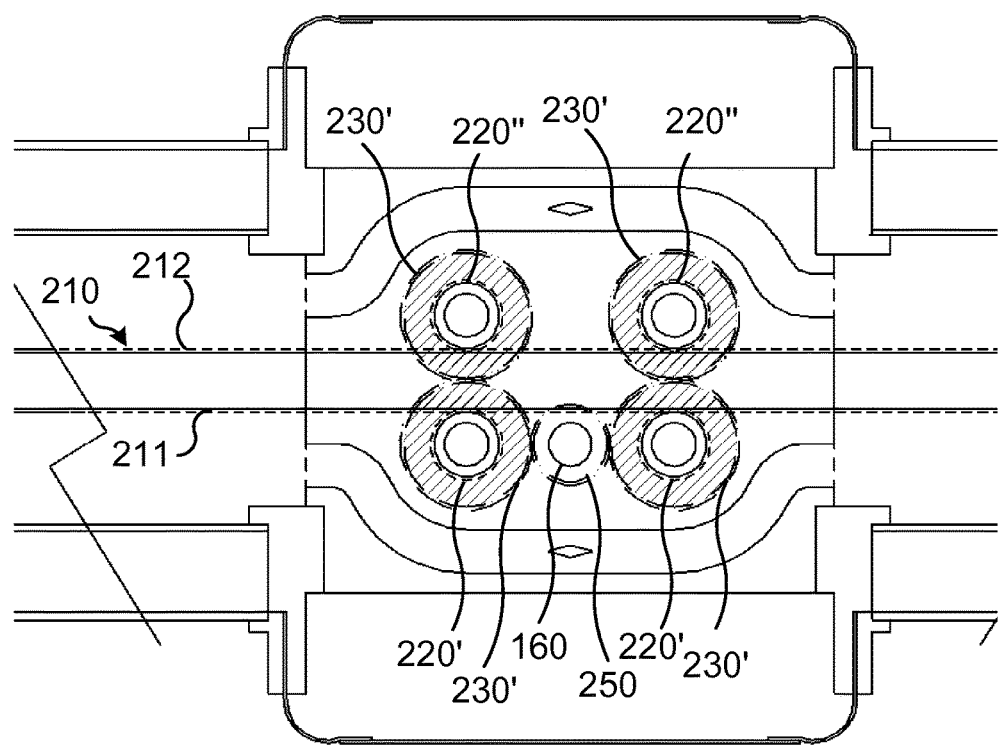

At the embodiment illustrated in FIGS. 7*a-b* the gear arrangement comprises a rack 210 exhibiting a first toothed side 211 and a second toothed side 212 which is arranged opposite to the first toothed side 211. Two first pinions 220' are meshing with the first toothed side 211 and two second pinions 220" are meshing with the second toothed side 212. The first pinions 220' and the second pinions 220" are arranged to guide the rack as described above with reference to the embodiment illustrated in FIGS. 2*a-d*. The functioning and operational principle of embodiment illustrated in FIGS. 7*a-b* also corresponds to that of the embodiment shown in FIGS. 2*a-d* except that the out- or input shaft of the embodiment illustrated in FIGS. 7*a-b* has only one shaft end which may be connected to a load or drive means. This embodiment is therefore not described in more detail here.

Figure 8B:
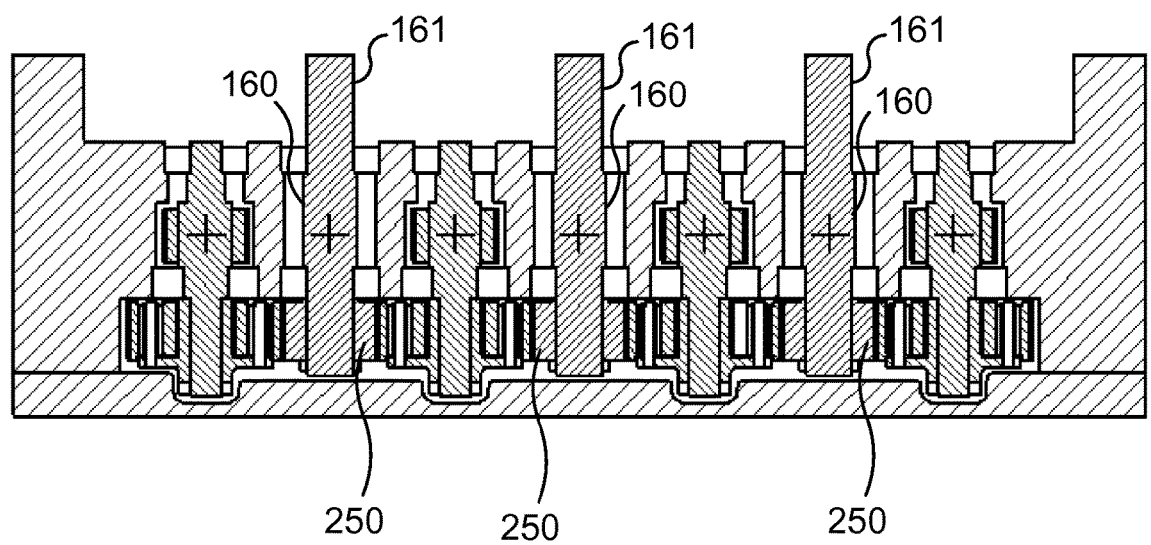
Figure 8A:
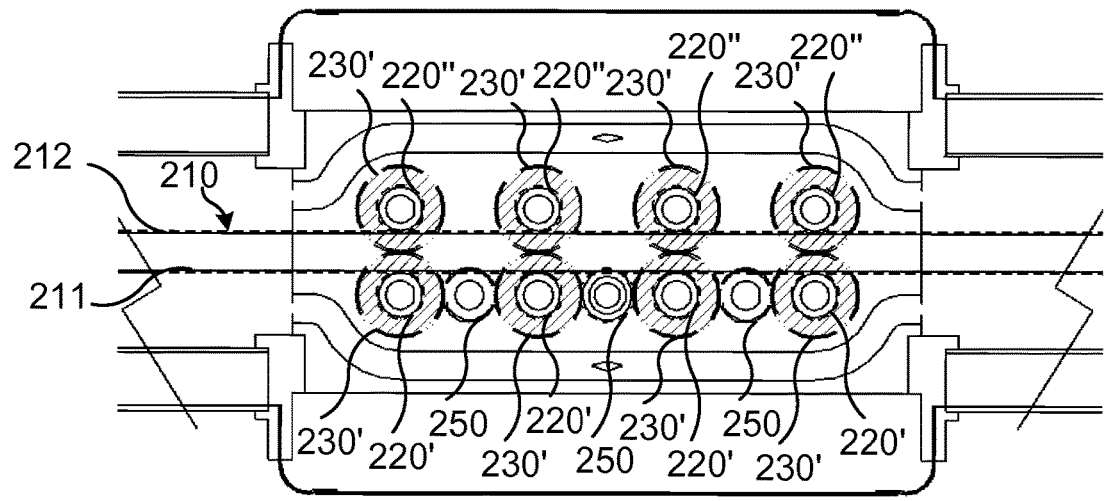

At the embodiment illustrated in FIGS. 8*a-b*, the rack 210 exhibits a first 211 and a second toothed side 212. Four first pinions 220' are meshing with the first toothed side 211 and four second pinions 220" are meshing with the second toothed side 212. The first 220' and second pinions 220" are arranged in pairs, such that the first and second pinion in each pair are aligned along a normal to the first and second toothed sides. Each first 220' and second 220" pinion is fixed to a respective primary gear 230', by means of an elastically deformable fixation device 240. All primary gears 230' are arranged at corresponding axial sides of the respective first and second pinion, such that all primary gears are arranged below the rack 210 as seen in FIG. 8*b*. The primary gears 230' of each pair of first 220' and second 220" pinions meshes with each other. A secondary gear 250 is arranged between each primary gear 230' which is connected to a first pinion 220' by means of a fixation device 240. Each secondary gear 250 meshes with the two adjacent primary gears 230' between which it is arranged. Each secondary gear is rotationally fixed to a respective out- or input shaft 160. All out- or input shafts 160 extend past the rack 210 and exhibit a respective free shaft end 161 which may be connected to a load or a drive means. Hence, at this embodiment the load to be transferred is divided by all eight pinions 220', 220" and the gear arrangement may be used for transferring movements and torque or forces between a single rack and three out- or input shafts 160. All pinions 220', 220" and all primary gears 230' contribute to transfer the motion and force or torque to or from all three out- or input shafts 160.

Figure 9B:
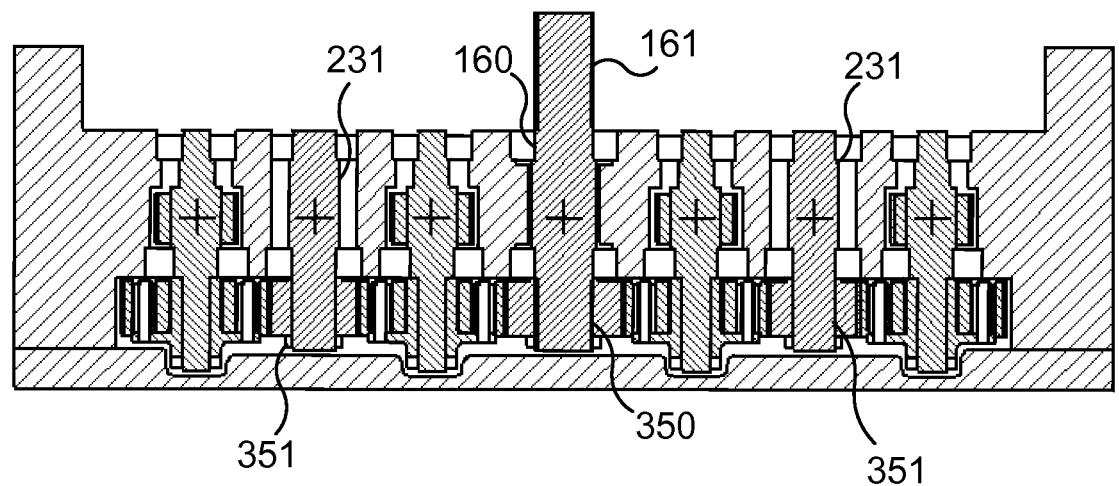
Figure 9A:
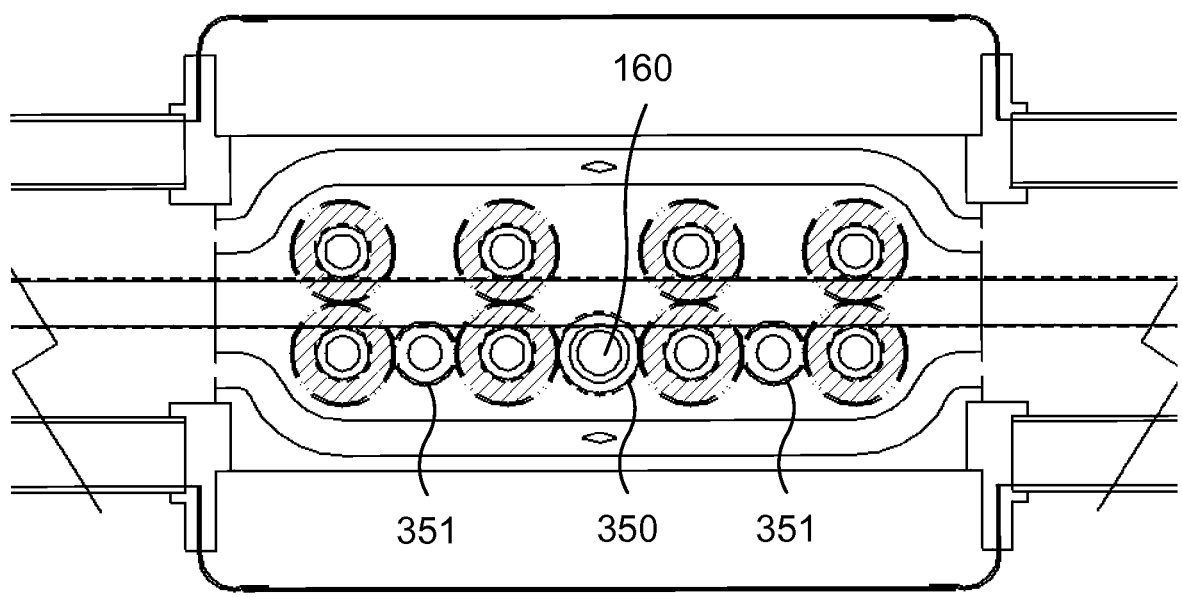

The embodiment illustrated in FIGS. 9*a-b* corresponds to a large extent to the embodiment illustrated of FIGS. 8*a-b*. The only difference being that the outmost secondary gears 351 are not rotationally fixed to an out- or input shaft. Instead these two outmost secondary gears 351 are fixed to a respective gear shaft 231 and functions as drivers in correspondence with what is described with reference to FIGS. 6*a-b*. At the embodiment illustrated in FIGS. 9*a-b* all motion and torque or force is thus transferred to or from a single out- or input shaft 160 and this out- or input shaft is for this reason illustrated with a larger diameter than the out- or input shafts illustrated in FIGS. 8*a-b*.

Figure 10B:
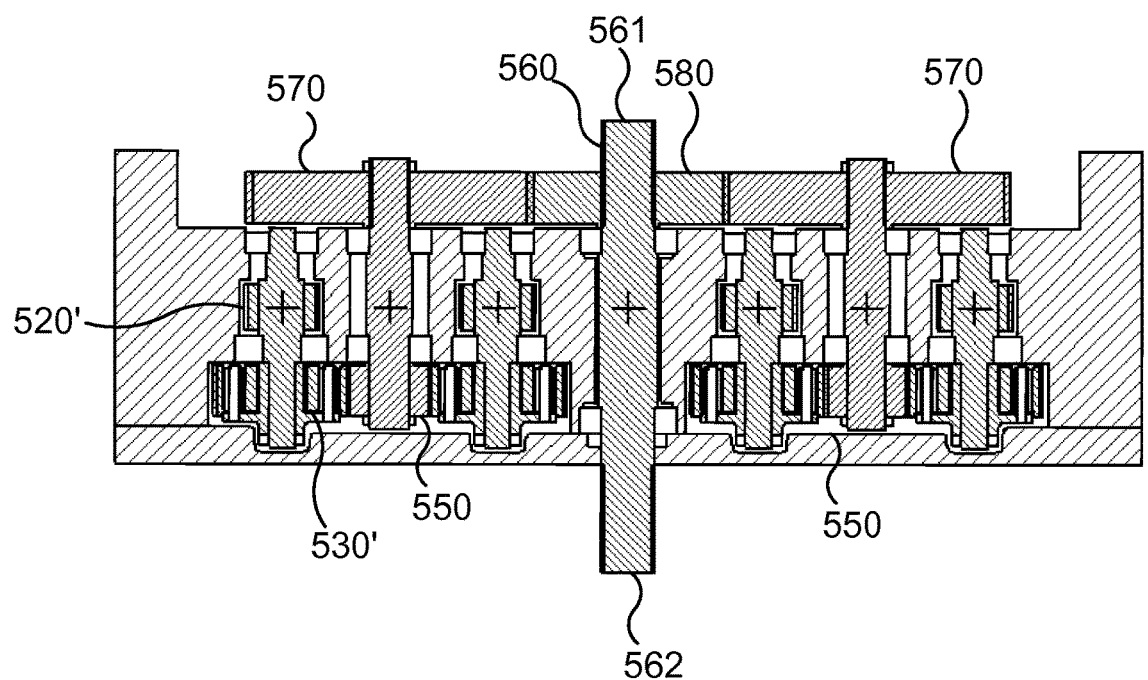
Figure 10A:
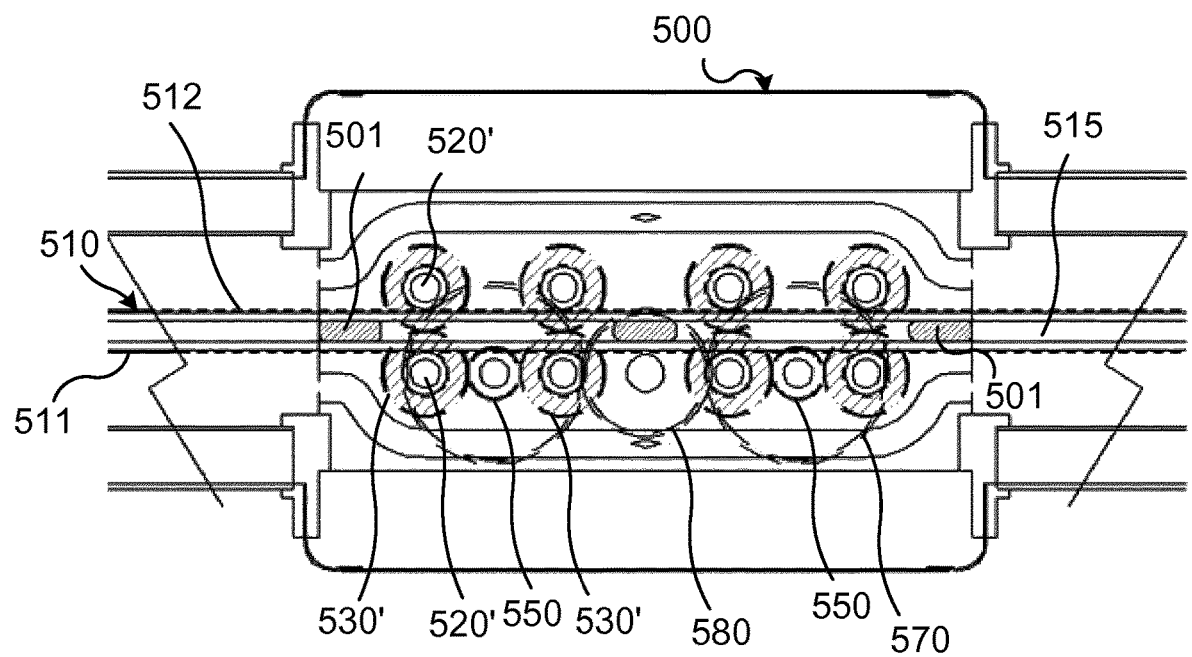

The embodiment illustrated in FIGS. 10*a-b* in turn, correspond greatly with the embodiment illustrated in FIGS. 3*a-e*. At this embodiment the gear arrangement comprises a rack 510 having a first toothed side 511 and a second toothed side 512. The arrangement further comprises four first pinions 520' and four second pinions 520", eight primary gears 530', two secondary gears 550, two tertiary gears 570 and one quanternary gear 580, which is rotationally fixed to an out- or input shaft 560 exhibiting a first 561 and a second 562 shaft end. The principal arrangement and functioning corresponds to what is described with reference to FIGS. 3*a-e* and is not described further in detail here.

The embodiment illustrated in FIGS. 10*a-b* differs however in that it comprises an additional means for limiting transverse movement of the rack. These means are illustrated further in detail in FIGS. 11a-c. The rack 510 exhibits two longitudinal grooves 515, one arranged in each of the upper 513 and lower 514 sides of the rack. Upper 513 and lower 524 sides of the rack refers to the sides being mutually parallel and orthogonal to the transverse first 511 and second 512 sides as shown in FIG. 11c. However, depending on the orientation of the gear arrangement the rack may in use be oriented differently such that the sides 513 and 514 do not in reality form an upper end lower side. The gear housing 500 is provided with three pairs of linear guiding means in the form of protruding studs 501. Each stud 501 is fixed to the gear housing and extends into a respective groove 515. Three of the studs 501 are thus received in the groove 515 arranged in the upper side 513 and three studs 501 are received in the groove 515 arranged in the lower side 514. By contact between the side surfaces of the studs 501 and corresponding walls of the grooves 515, the rack is guided in the transverse directions, normal to the first 511 and second 512 sides of the rack. In the embodiment shown in FIGS. 10a and 11a-c, the studs 501 are received with a close fit in the grooves 515, such that a precise guidance is achieved. It is however also possible to arrange the studs with a certain play in the grooves. By this means, the linear guiding means will form a sort of end stops which allows a certain limited transverse motion of the rack. In both alternatives the transverse guidance of the rack achieved by the torsional flexibility of the pinions as described above, will substantially reduce the transverse forces that need to be absorbed by the linear guiding means, i.e. by the studs 501 and the walls of the grooves 501.

FIGS. 27a-c illustrates schematically a further embodiment of the gear arrangement. Here, the gear arrangement comprises a double sided rack 610. Two first pinion 620' are meshing with a first toothed side of the rack 610 and two second pinions 620" are meshing with a second toothed side being opposite to the first toothed side. At this embodiment the first pinions 620' are not aligned along the normal with a respective second pinion 620". Instead, the first pinions 620' are somewhat displaced along the longitudinal direction of the rack 610 with regard to the second pinions 620". Each first and second pinion is fixed to a first primary gear 630' arranged at a first axial side of the pinion and to a second primary gear 630" arranged at a second axial side of the pinion. Each first primary gear 630' being fixed to a first pinion meshes with a first primary gear being fixed to a second pinion and each second primary gear being fixed to a first pinion meshes with a second primary gear being fixed to a second pinion.

A first secondary gear 650' is arranged such that it meshes with first primary gear 630' being fixed to a first pinion 620' and with a first primary gear being 630' fixed to a second pinion. A second secondary gear 650" is correspondingly arranged such that it meshes with a second primary gear 630" being fixed to a first pinion 620' and with a second primary gear 630" being fixed to a second pinion 620". Each secondary gear 650', 650" is fixed to a respective out- or input shaft 660', 660" which may be connected to a respective rotational load or drive means 690', 690".

At least three of the first primary gears and three of the second primary gears are fixed to the respective pinion by means of an elastically deformable fixation device.

As best seen in FIG. 27a, this arrangement results in Z-formed meshing configuration, wherein as seen in FIG. 27a, the upper left secondary gear meshes with the upper right secondary gear, which in turn meshes with the second secondary gear over the rack. The second secondary gear further meshes with the lower left secondary gear, which in turn also meshes with the lower right secondary gear. A corresponding Z-formed meshing configuration is also formed by the first primary gears and the first secondary gears.

By this means the load from each out- or input shafts is evenly distributed to all four pinions. Additionally, grace to the relative longitudinal displacement between the first and second pinions, the diameter of the primary gears may be increased without interfering with adjacent primary gears. The greater said relative displacement is made the more it is possible to increase the diameter of the primary gears. This in turn affords for the advantage that a greater total gear ration of the gear arrangement may be accomplished with limited number of gear steps. Further more, an increased diameter of the primary gears facilitates arranging a reliable elastically flexible fixation device at or integrated with the respective primary gears. It also enhances the possibilities to provide great torsional flexibility and allow a greater relative rotation at high accuracy.

A further embodiment of the gear arrangement is schematically illustrated in FIGS. 28a-d. At this embodiment the rack 710 is provided with a first and a second toothed side. Two first pinions 720' are meshing with the first toothed side and two second pinions 720" are meshing with the second toothed side.

One first pinion is fixed to a first primary gear arranged at a first axial side of said pinion, above the rack 610 as seen in FIGS. 28a and 28c. The other first pinion is fixed to a second primary gear at an axial side of the pinion (which corresponds to a second axial side with regard to the pinion being provided with a first primary gear) such that the second primary gear is arranged below the rack 610. In a corresponding manner, one second pinion 720" is fixed to a first primary gear 730' arranged above the rack and one second pinion 720" is fixed to a second primary gear 730" arranged below the rack 710. A first secondary gear 705' is arranged above the rack 710, such that it meshes with both first primary gears 730' and a second secondary gear 750" is arranged below the rack, such that it meshes with both second primary gears 730".

The first secondary gear 750' is fixed to a first out- or input shaft 760' which may be connected to a rotational load or drive means 790'. The second secondary gear 750" is fixed to a second out- or input shaft 760" which may be connected to a second rotational load or drive means 790".

At least one of the first primary gears and one of the second primary gears are connected to their respective pinion by means of a elastically deformable fixation device as described above.

This embodiment thus provides for a space saving gear arrangement comprising a comparatively low number of constituent components.

Figure 17:
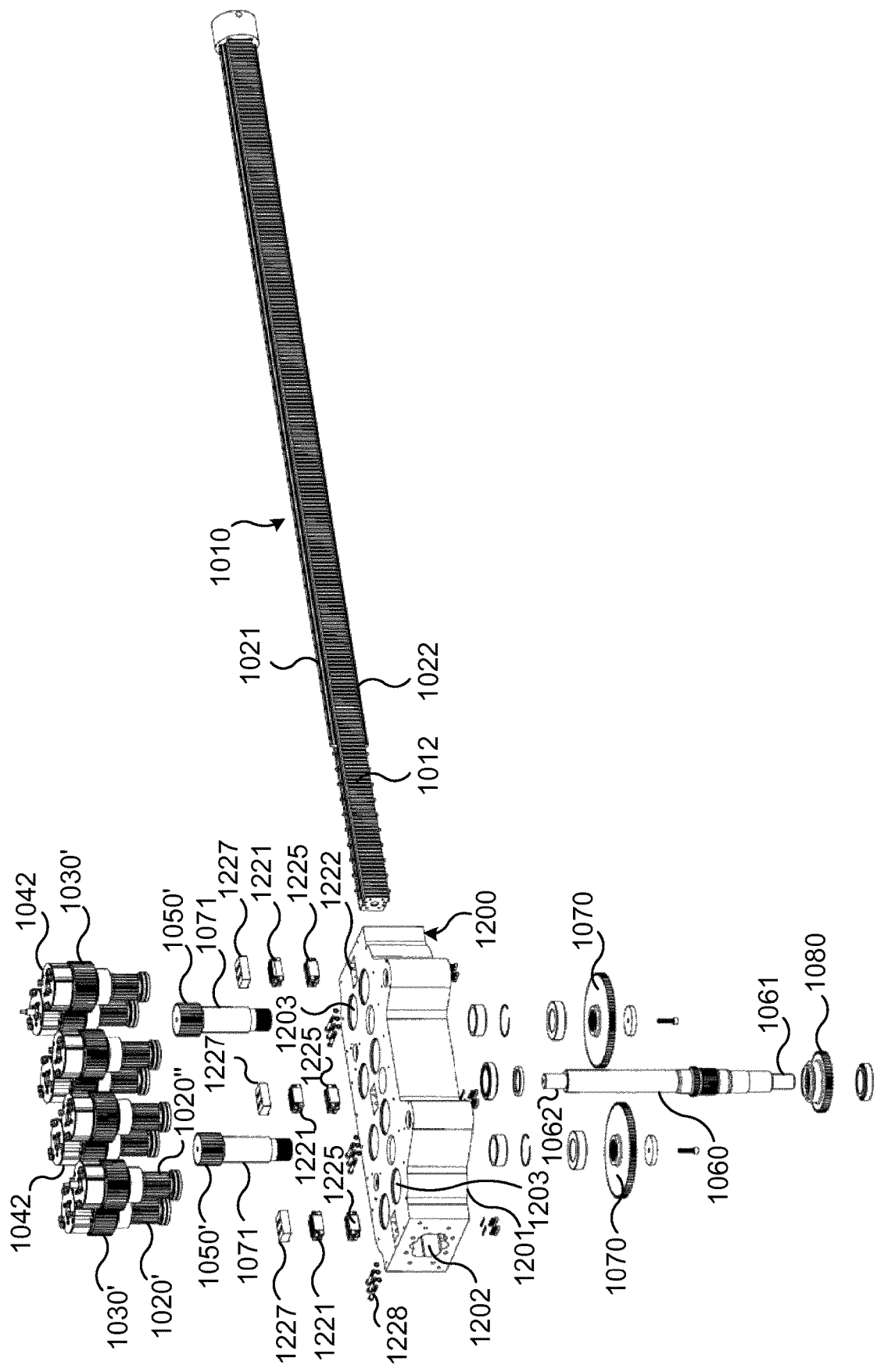
FIG. 17 is an exploded view of a gear arrangement according to a further embodiment of the invention.
Figure 19:
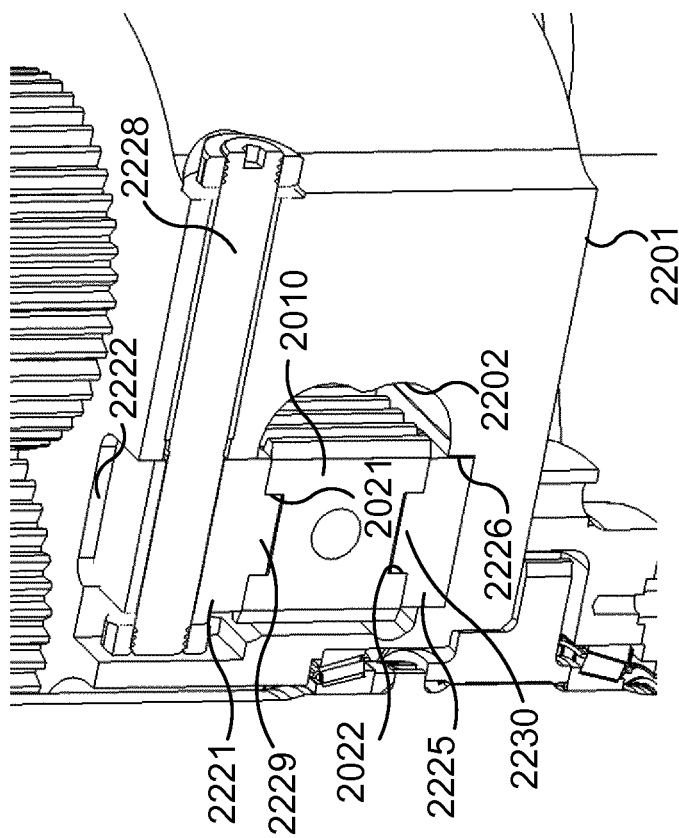
FIG. 19 is a perspective view corresponding to the detail shown in FIG. 18 and illustrates an alternative configuration.
Figure 18:
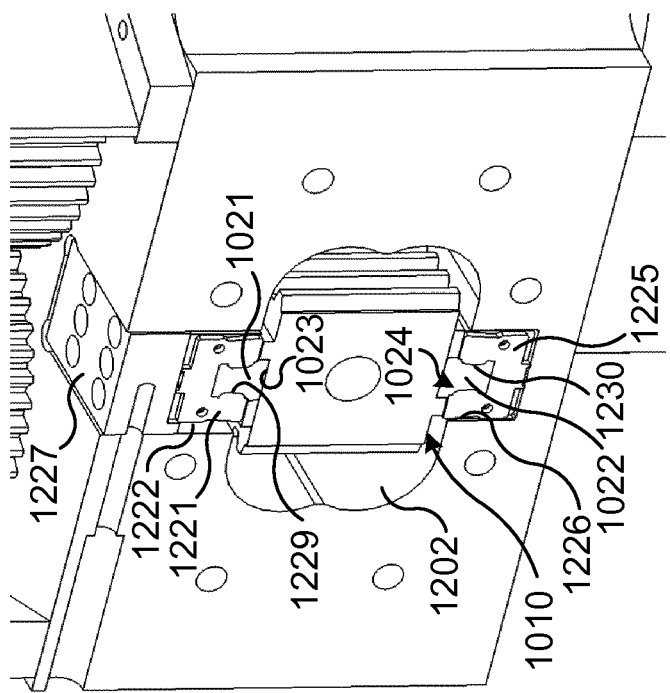
FIG. 18 is a perspective view of a detail of the gear arrangement shown in FIG. 17.
Figure 21:
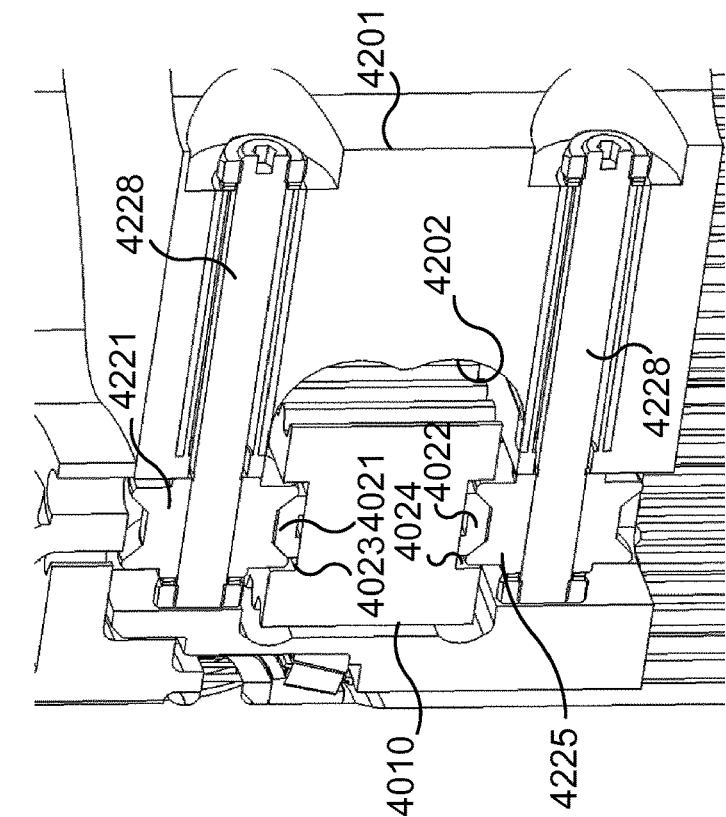
FIG. 21 is a perspective view corresponding to the detail shown in FIG. 18 and illustrates another alternative configuration.
Figure 20:
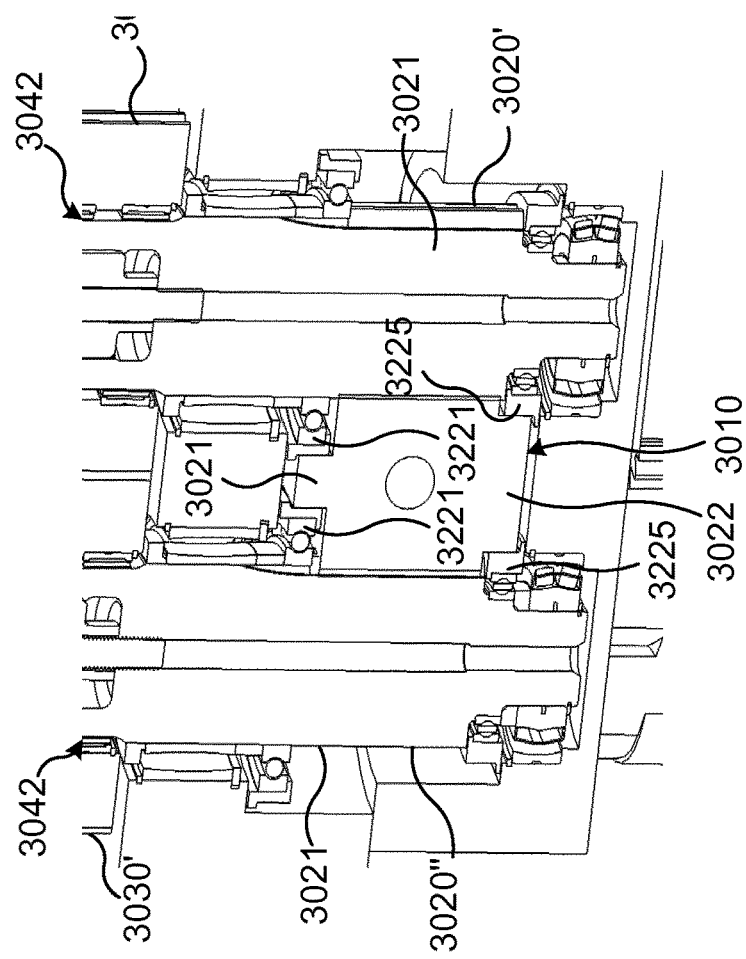
FIG. 20 is a perspective view corresponding to the detail shown in FIG. 18 and illustrates a further alternative configuration.

FIGS. 17-21b illustrate alternative ways of arranging the linear guiding means. FIG. 17 is an exploded view if a gear arrangement generally corresponding to the gear arrangement shown in FIGS. 3a-b. In FIG. 17 however also the gear housing and the linear guiding means are illustrated. This gear arrangement thus comprises a gear housing 1200, which comprises a mono-block body 12001 formed in cast iron. The gear housing also comprises upper end lower cover plates (not shown) which are fastened to the body 1201. A longitudinally extending central rack channel 1202 is arranged in the body 1201. A rack 1010 exhibiting a first (hidden) and a second 10012 toothed side is linearly reciprocally received in the rack channel 1202. The body 1201 is provided with a number of recesses 1203 for receiving the pinions and the shafts provided with secondary and tertiary gears. More specifically, the gear arrangement comprises four primary gears 1020' meshing with the first toothed side of the rack 1010 and four second pinions 1020" meshing with the second toothed side 1012 of the rack 1010. Each pinion 1020', 1020" is fixed to a respective primary gear 1030' by means of a respective elastically deformable fixation device 1042. The primary gears 1030' meshes in pairs over the rack 1010. Two secondary gears 1050' are meshing, each with two different of the primary gears 1030' being fixed to a respective second pinion 1020". Each secondary gear 1050' is rotationally fixed to a respective tertiary gear 1070 by means of a respective secondary gear shaft 1071. Both tertiary gears 1070 meshes with a quaternary gear 1080 which is rotationally fixed to an out- or input shaft 1060, exhibiting a first 1061 and a second 1062 shaft end. As seen in FIG. 17 the quaternary gear 1080 is, according to this embodiment, fixed to the out- or input shaft 1060 by means of splines.

With reference to FIGS. 17 and 18*a-b*, the linear guiding means according to this embodiment comprises an upper 1021 and a lower 1022 guiding rod. Each guiding rod extends longitudinally along the entire active length of the rack 1010 and is fixed to the rack by being received in a groove 1023, 1034 being arranged in the upper and lower side surface of the rack 1010 respectively. The upper rod 1021 is received in three upper guiding members 1221 that are longitudinally aligned and received in corresponding upper recesses 1222 arranged in the body 1201, above the rack channel 1202. Correspondingly, the lower rod 1022 is received in three lower guiding members 1225 that are longitudinally aligned and received in corresponding lower recesses 1226 arranged in the body 1201, below the rack channel 1202. For each pair of upper 1222 and lower 1226 recesses, the recess walls are machined with high precision in a single machining operation, such that the upper 1121 and lower 1225 guiding members are accurately aligned when received in the respective recess. The upper guiding members 1221 are further maintained in the upper recesses 1222 by means of a respective blocking member 1227 which is fastened to the body 1201 by means of bolts 1228.

The upper guide members 1221 are provided with longitudinally extending guiding recesses 1229. The cross sections of the guiding recesses 1229 accurately correspond to the cross section of the upper guiding rod 1021 and the upper guiding rod is longitudinally slidably received in the upper guiding recesses 1229. Correspondingly, the lower guide members 1225 are provided with longitudinally extending guiding recesses 12230. The cross sections of these guiding recesses 1230 accurately correspond to the cross section of the lower guiding rod 1022 and the lower guiding rod 1022 is longitudinally slidably received in the lower guiding recesses 1230.

By this means, the rack 1010 may be linearly reciprocally moved in the rack channel 1202. The sliding engagement of the upper 1021 and lower 1022 guiding rods with the guiding recesses of the corresponding guiding member 1221, 1225 ensures an accurate guidance of the rack in all directions being orthogonal to the longitudinal axis of the rack 1010. In this configuration, the guiding members also ensure rotational guiding. Additionally, the sideways guidance accomplished by the torsionally flexible pinions as described above, ensures that the lateral forces acting on the guide rods and guide members is limited, whereby the service life of the entire arrangement is enhanced. By arranging a certain play between the guiding rods 1021, 1022 and the guiding members 1221, 1225, i.e. by making the cross sectional widths of the guiding rods somewhat smaller than the cross sectional widths of the guiding recesses 1229, 1230 it is possible to allow a certain play in the sideways directions. By this means the guiding members 1221, 1225 will function as stops allowing only some limited sideways movement of the rack 1010.

FIGS. 19*a-b* illustrate and alternative way of arranging the linear guiding means. The sections shown in FIGS. 19*a-b* correspond to those shown in FIGS. 18*a-b*. At this embodiment, the rack 2010 is provided with an upper 2021 and a lower 2022 guiding recess. Both guiding recesses 2021, 2022 extend along the entire active length of the rack 2010. The rack 2010 is linearly movable in a rack channel 2202 arranged in the body 2201 of the gear housing 2200. Three upper guide members 2221 (only one shown) are arranged in respective upper recesses 2222 arranged in the body 2201. Correspondingly, three lower guide members 2225 (only one shown) are arranged in respective lower recesses 2226 arranged in the body 2201. The upper 2221 and lower 2225 guide members are provided with longitudinal flanges 229, 2230 that project into the respective recess 2021, 2022 of the rack 2010. The upper guide members 2221 are fixed in the respective recess 2222 and to the body 2201 by means of fixation bolt and nut arrangements 2228. At this embodiment transverse guiding is achieved by the sliding engagement between the flanges 2229, 2230 and the guiding recesses 2021, 2022. As in the embodiment described above, with reference to FIGS. 18*a-b*, the cross sections of the guiding recesses 2021, 2022 and of the flanges 229, 2230 may be chosen either to accomplish a rigid guidance or to allow some transverse play.

FIGS. 20*a-b* illustrate an embodiment comprising rotational guiding means. At this embodiment, pinion shafts 3021 connecting the first 3020' and second 3020" pinions with a respective elastically deformable fixation device 3042 and primary gear 3030' are provided with upper 3221 and lower 3225 guiding roller bearings. The rack 3010 is provided an upper longitudinal flange 3021 and a lower longitudinal flange 2022. The flanges extend over the entire active length of the rack 2010. Each flange 3021, 3022 exhibits two opposed guide surface that faces sideways, away from each other. Each guiding roller bearing 3221, 3225 is arranged in rolling contact with a respective guiding surface of the flanges 3021, 3025. At this embodiment transverse guiding of the rack is thus provide by rolling contact between the guiding roller bearings 3221, 3225 and a respective guiding surface of the rack 3010. This embodiment entails for the advantage of reducing the guiding friction during reciprocal movement of the rack 3010.

FIGS. 21*a-b* illustrate an alternative rotational guiding means. At this embodiment the rack 4010 is reciprocally movable in a rack channel 4202 arranged in the body 4201 of the gear housing. The rack 4010 exhibits longitudinally extending upper 4023 and lower 4024 recesses. An upper longitudinal guide rod 4021 is arranged in the upper recess 4023 and a lower guide rod 4022 is arranged in the lower recess 4024. Each guide rod 4021, 4022 exhibits a cross section which taper in the direction away from the rack 4010. By this means, each guide rod 4021, 4022 exhibits two inclined guide surfaces. The arrangement further comprises three upper 4221 and three lower 4225 guide wheels (only one of each is shown in the drawings). The guide wheels 4221, 4225 are rotationally arranged on a respective bolt and nut arrangement 4228, which is fastened to the body 4201 of the gear housing. The wheels are further received in corresponding recesses arranged in the body 4201, above and below the rack channel 4202.

The circumferential surface of each guide wheel 4221, 4025 exhibits a groove with inclined side walls, such that the cross sections of the wheels 4021, 4025, in the region of the groves, exhibit a shape which corresponds to the cross section of the guide rods 4021, 4022. As seen in the drawings, the upper 4021 and lower 4022 guide rods are received in the circumferential groove of a respective guide wheel 4221, 4225, such that the inclined surfaces of the rods and wheels are arranged in guiding contact with each other. By this means a precise and accurate guiding of the rack 4010 in all directions being orthogonal to the longitudinal axis of the rack 4010 is achieved. As in the embodiment described immediately above, this rotational guidance reduces the friction during linear movement of the rack 4010.

As described above all embodiments of the invention comprises a elastically deformable fixation device by which a pinion is fixed to a primary gear. The elastically deformable fixation device is arranged to allow a limited elastic relative rotation between the pinion and the primary gear. In the following different embodiments of such fixation devices will be described.

The elastically deformable fixation device comprises a first part or portion which may be rotationally fixed in relation to a pinion and a second part or portion that may be rotationally fixed in relation to a primary gear. The first part or portion is mechanically connected to the second part or portion by means of an elastically deformable material.

Figure 12:
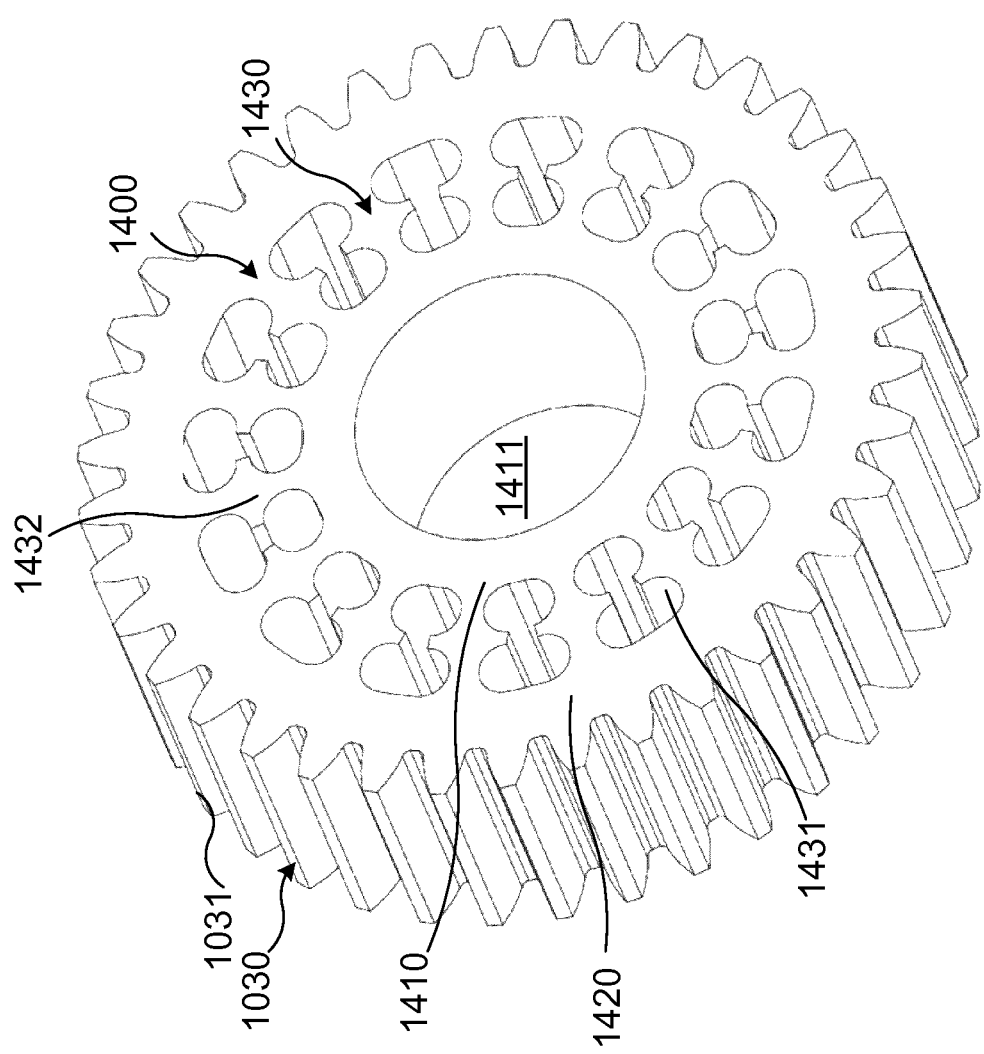
FIG. 12 is a perspective view illustrating a first elastically deformable fixation device which may be used in the a gear arrangement according to the invention.

FIG. 12 illustrates such a fixation device according to a first embodiment. At this embodiment the fixation device 1400 is integrally formed with a primary gear 1030, which exhibits a toothed outer circumferential portion 1031. The fixation device 1400 comprises an inner annular portion 1410 which is provided with a central axially extending cylindrical through hole 1411. The through hole 1411 may receive a shaft (not shown) to which shaft a pinion (not shown) is rotationally fixed. The inner annular portion 1410 which forms a first portion of the fixation device may thus be rotationally fixed in relation to the pinion by rotational fixation of the inner annular portion 1410 to the shaft. Such fixation may be accomplished by e.g. shrink fitting, force fitting, splines or any other fixation means. The fixation device 1400 further comprises an intermediate portion 1430 which is arranged concentrically outside the inner annular portion 1410. The intermediate portion 1430 is penetrated by a number of axially extending through openings 1431 which are distributed with an essentially fixed pitch around the intermediate portion 1430. An outer annular portion 1420 is arranged concentrically outside the intermediate portion 1430. The outer annular portion 1420 is formed integral with the toothed circumferential portion 1031 of the primary gear. The outer annular portion 1420 is thus rotationally fixed relative to the toothed circumferential portion of the primary gear 1030 and forms a second portion of the fixation device.

The through openings 1431 further define a corresponding number of radially extending spokes 1432. In the example shown in FIG. 12, the fixation device comprises 15 generally cross-shaped spokes 1432 which are evenly distributed around the intermediate portion 1430. The entire primary gear 1030 and, thus, the fixation device 1400 are made of steel, exhibiting a suitable tensile modulus. As readily understood, the reduction of material caused by the through openings 1431, renders the intermediate portion 1430 disposed to deform elastically at a lower torque than the first 1410 and second 1420 portion. A torque applied between the first 1410 and second 1420 portion will thus cause the spokes 436 to elastically bend in the circumferential direction, whereby a relative rotation between the first 1410 and second 1420 portion is effected.

Figure 13C:
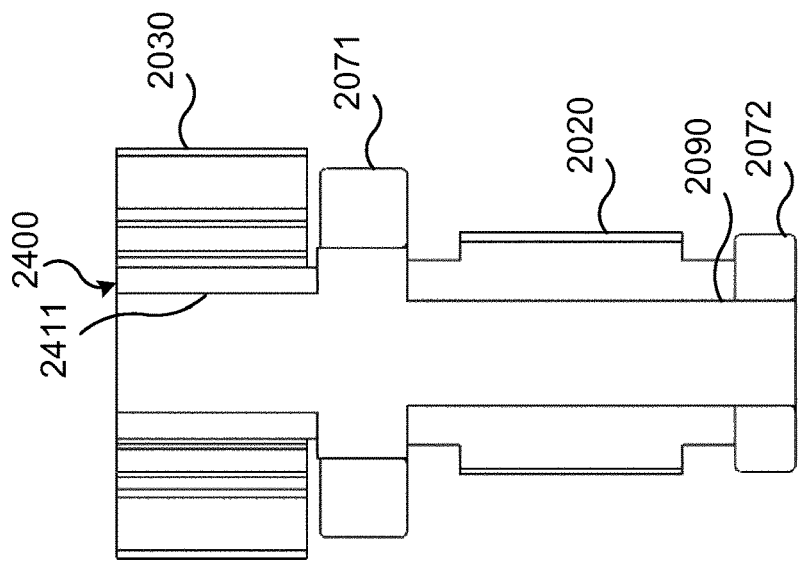
Figure 13B:
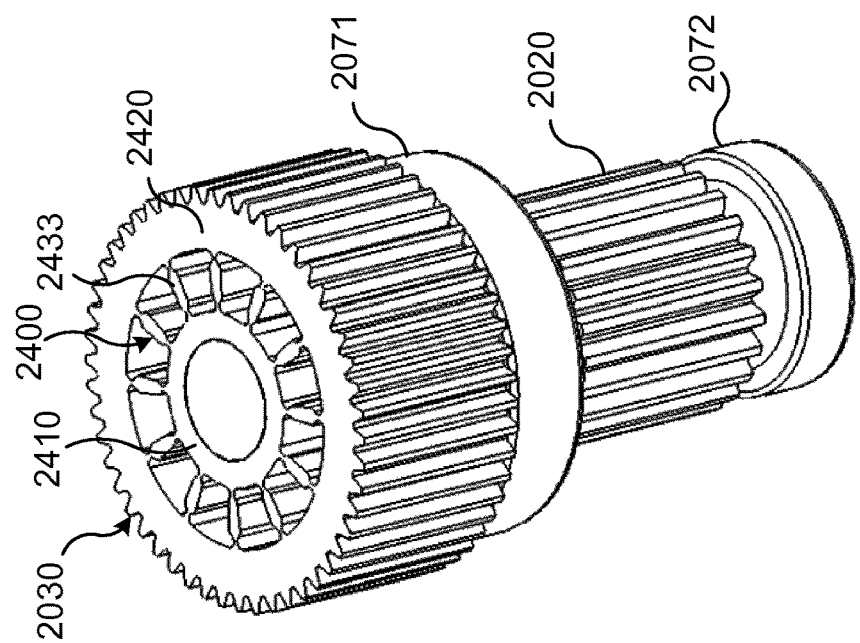
Figure 13A:
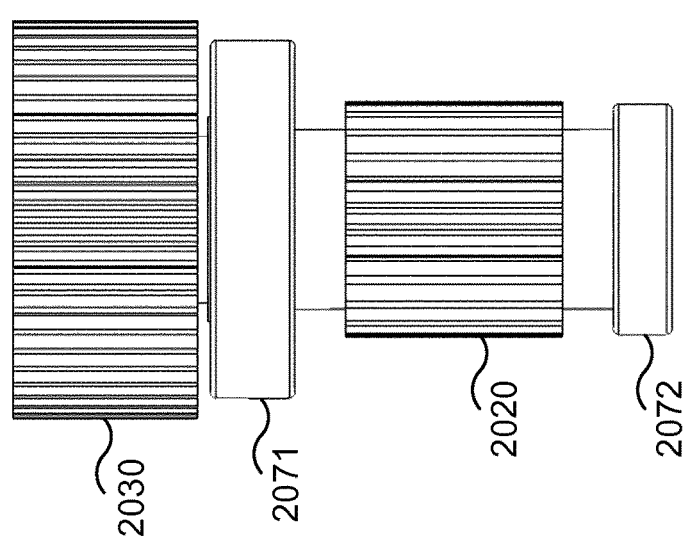

FIGS. 13a-c illustrate an elastically deformable fixation device 2400 which functions principally in the same manner as the device 1400 illustrated in FIG. 12 but which has a somewhat different geometrical configuration. FIGS. 13a-c show a pinion 2020, which may be a first or a second pinion. I.e. the pinion 2020 may be arranged to mesh with a first or a second toothed side of the rack in the gear arrangement. The pinion 2020 is rotationally fixed to a pinion shaft 2090. This fixation may be accomplished e.g. by shrink fitting, press fitting or any other suitable means. The pinion shaft 2090 extends axially past both axial ends of the pinion 2020. A first roller bearing 2071 is attached to the pinion shaft 2090 at a first axial side (above the pinion as seen in the figures) of the pinion 2020. A second roller bearing 2072 is fixed to the pinion shaft 2090 at the second axial side (below the pinion as seen in the figures) of the pinion. The elastically deformable fixation device 2400 is fixed to the pinion shaft 2090 at the side of the first roller bearing 2071 which is opposite to the pinion 2020. The fixation device 2400 is thus arranged at a first axial side of the pinion 20.

The fixation device 2400 comprises an annular inner portion 2410 which constitutes a first portion of the fixation device. The first portion 2410 exhibits an axially extending through hole 2411 which receives the pinion shaft 2090. The first portion 2410 is rotationally fixed to the pinion shaft 2090 by being shrink or press fitted onto the pinion shaft 2090. Just as in the embodiment shown in FIG. 12, an intermediate portion of the fixation device comprises a number of radially extending spokes 2433 which connects the first portion 2410 with an annular outer portion 2420 which is arranged concentrically outside the first portion 2410 and which constitutes a second portion 2420. The second portion 2420 is made integral with a primary gear 2030 and exhibits at its outer barrel surface axially extending teeth which form primary gear teeth. Since the primary gear 2030 is arranged at the first axial side of the pinion 2020, the primary gear 2030 shown in FIGS. 13a-c and since there is no primary gear arranged at the other axial side of the pinion this primary gear constitutes a first primary gear.

The arrangement shown in FIGS. 13a-c comprising a pinion 2020, a pinion shaft 2090, a primary gear 2030 and a fixation device 2400 functions basically in correspondence with what is described above with reference to FIG. 12. However, the spokes 2433 illustrated in FIGS. 13a-c are somewhat weaker than those shown in FIG. 12 and the fixation device shown in FIGS. 12a-c exhibit thereby a higher relative rotation to torque ratio.

Figure 14A:
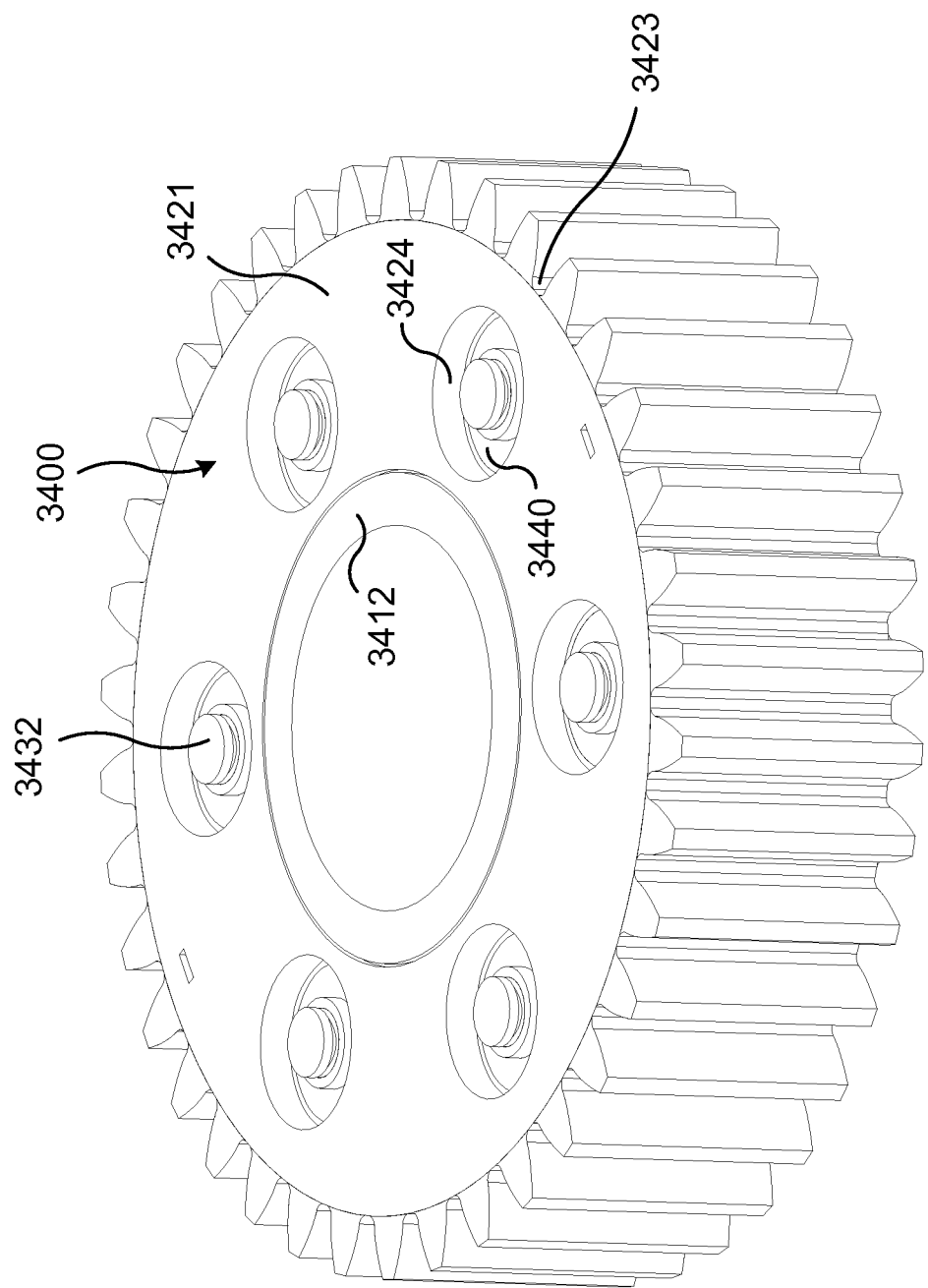
FIG. 14a is a perspective view of a third elastically deformable fixation device and FIG. 14b a cross section in perspective view thereof.
Figure 14B:
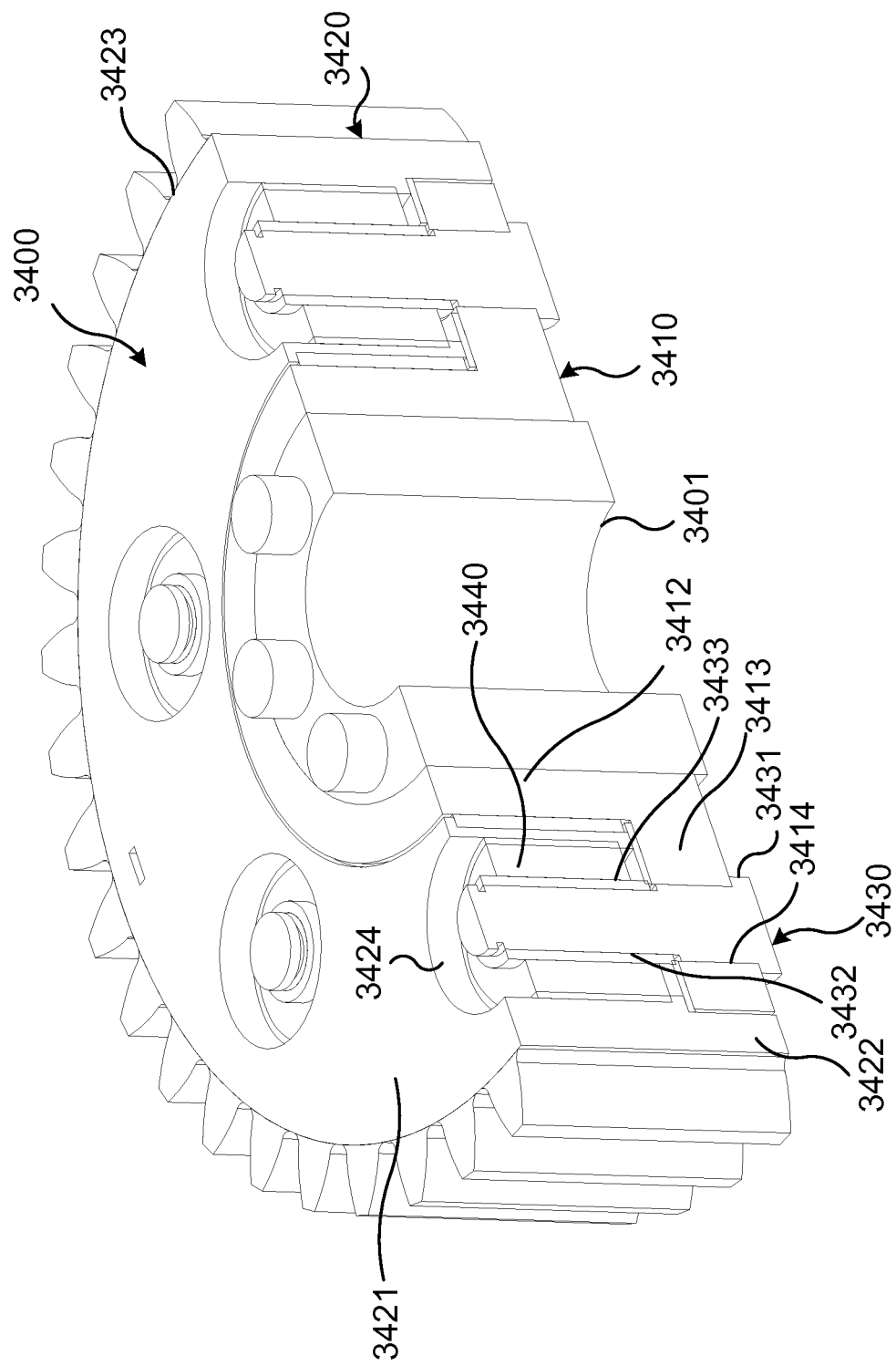

FIGS. 14a-b illustrate a further variation of the elastically deformable fixation device 3400. This fixation device 3400 comprises an inner annular hub 3401 which is arranged to be rotationally fixed to a pinion shaft (not shown). An annular first part 3410 is rotationally fixed to the hub 3401. The first part 3410 comprises a central cylindrical sleeve portion 3412 which receives the hub 3401 and a radially outwardly extending disc portion 3413. A number of axially extending through openings 3414 are arranged in the disc portion 3413.

The fixation device further comprises a second part 3420 which comprises an annular disk 3421 provided with an outer axially extending annular flange 3422. The circumferential surface 3423 of the disc 3421 is provided with axially extending primary gear teeth. The second part 3420 of the fixation device is thus integrally formed with a primary gear. The disc portion 3413 of the first part 3410 is concentrically received by the annular flange 3422 of the second part 3420. The disc portion 3421 of the second part 3420 is provided with axially extending cylindrical through openings 3424. Each opening 3424 is axially aligned with a respective opening 3414 of the first part 3410.

A fixation member 3430 exhibiting a head portion 3431 and a rod portion 3432 is inserted through each opening 3414. The head portion 3431 rests against the lower side (as seen in the figures) of the disc portion 3414 and the rod portion 3432 extends into and essentially all the way through a respective opening 3424 of the annular disc 3421. A cylindrical intermediate sleeve 3433 is concentrically arranged on the outside of the rod portion 3432. An elastic member 3440 in the form of a sleeve is arranged concentrically between each intermediate sleeve 3433 and the interior wall of the respective cylindrical opening 3424 of the second part's 3420 disc portion 3421. In the exemplifying example shown, the elastic members 3440 are constituted of cylindrical rubber sleeves. Each elastic member 3440 is arranged with a close fit in the respective opening 3424 and on the respective intermediate sleeve 3433.

When a torque is applied between the pinion and the primary gear, i.e. between the first part 3410 and the second part 3420 of the fixation device, the tangential forces acting between the fixation members 3430 with sleeves 3433 and the respective interior walls of the second part's 3420 through openings 3424 will cause the elastic members 3440 to be elastically compressed radially. Thereby, a limited relative rotation between the first 3410 and second 3420 part is allowed. In correspondence with what is said above, the number and dimensions of elastic members 470 as well as their elastic properties are chosen with regard to the total load to be transmitted such that the maximum torque to be applied to the elastic fixation devices causes a suitable relative rotation between the first and second parts and thereby, between the pinion and primary gear being rotationally fixed thereto. This embodiment of the fixation device entails for certain advantages in that the elastic members will be subjected mainly to compressive forces. Thereby, the risk of material rupture caused by shearing the elastic material is kept at a minimum.

FIGS. 15a-f illustrate a further variation of the elastically deformable fixation device 4400. This variant exhibits basically the same operational principle as the fixation device shown in FIGS. 14a-b incorporating compressible elastic sleeves. At this variant however, the fixation device is non-integrated with and arranged axially separated from the primary gear.

Figure 15C:
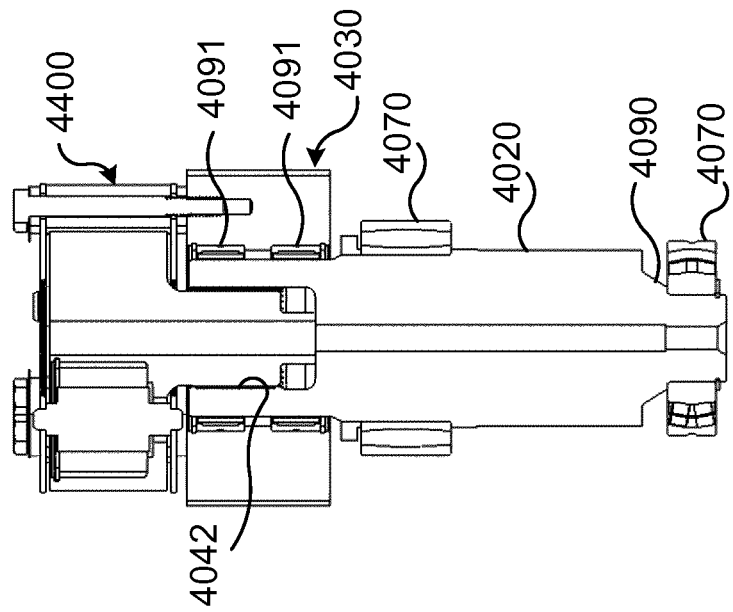
Figure 15B:
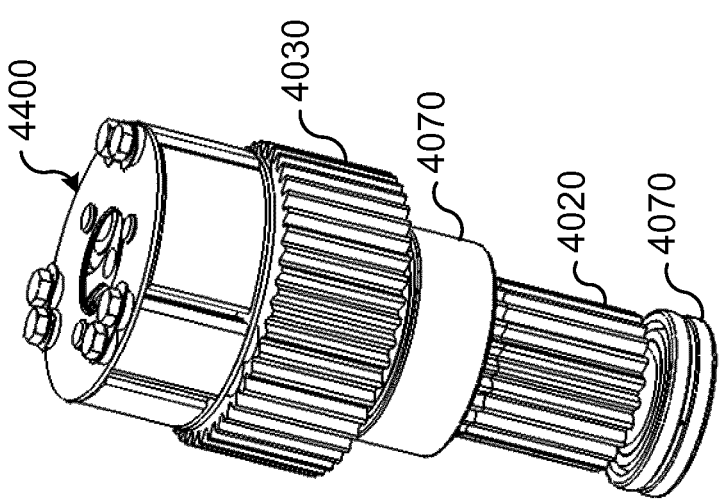
Figure 15A:
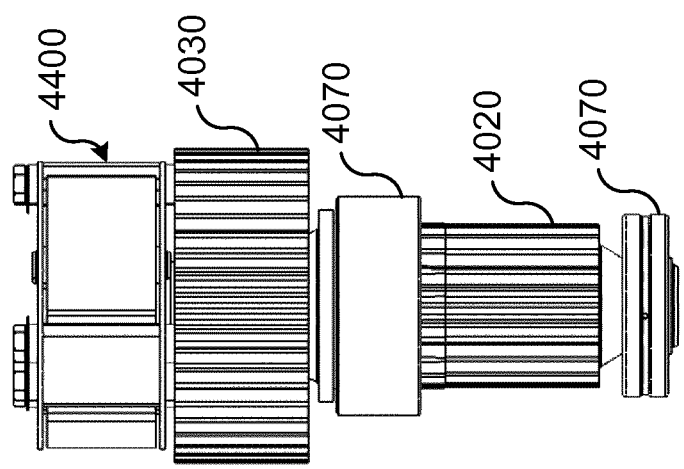

As shown in FIGS. 15a-c, a pinion 4020 is rotationally fixed to a pinion shaft 4090. At a first axial side of the pinion 4020, a primary gear 4030 is fixed to the pinion shaft 4090 by means of roller bearings 4091, such that the primary gear 4030 may rotated relative to the pinion shaft 4090 and the pinion 4020. The pinion shaft is also provided with roller bearings 4070, by means of which the pinion shaft 4090 is journal fixed to a gear housing (not shown). The pinion shaft end arranged concentrically inside the primary gear 4030 is provided with an axially extending recess 92 provided with interior splines. The elastically deformable fixation device 4400 comprises a first part 4410 formed as a hub 4411 with and axially extending shaft 4412. The shaft 4412 is provided with exterior splines. The shaft 4412 is received in the recess 92 such that the first part is rotationally fixed relative to the pinion shaft 90 by means of the cooperating interior and exterior splines. The hub 4411 exhibits three axially extending, cylindrical through holes 4413. Three axially extending recesses 4414 are arranged in the circumferential surface of the hub.

The fixation device also comprises a number of components which form a second part 4420. These components comprise three distance members 4421, a first annular disc 4422, a second annular disc 4423, six fixations bolts 4424 and a number of washers. Each distance member 4421 is received in a respective recess 4414 and provided with two axially extending through holes. The distance members 4421 are received in the recesses 4414 with a certain play in the circumferential direction of the hub 4411. The discs 4423, 4424 are arranged at a respective axial end of the hub 4411. The second part 4420 is rotationally fixed to the primary gear 30 by means of the fixation bolts 4424. Each bolt 4424 extends through respective holes in the first disc 4422, a distance member 4421, the second disc 4423 and is threadedly engaged in a respective axially extending hole provided with interior threads in the primary gear 30 (FIG. 15a-c).

The fixation device 4400 further comprises three elastically deformable members 4430 formed as cylindrical sleeves 4431. Each deformable member 4430 is press fitted onto a respective fixation rod 4432. Each fixation rod 4432 comprises two engagement ends and an intermediate portion with a larger diameter than the ends. Each deformable member 4430 is press fitted in a respective through hole 4413 of the hub. A first end of each fixation rod 4432 is engaged in a respective fixation hole 4422a arranged in the first disc 4422. A second end of each fixation rod 4432 is engaged in a respective fixation hole 4423a of the second disc 4423.

In correspondence with the embodiment shown in FIGS. 14a-b, the second part 4420 is limitedly rotational relative to the first part 4410, under compression of the elastically deformable members 4430. At this embodiment, the relative rotation is further limited by the play in the circumferential direction between the distance members 4421 and the respective recess 4414 arranged in the first part's 4410 hub 4411.

FIGS. 16a-c illustrate a further variation of the elastically deformable fixation device 5400. A pinion 5020 is rotationally fixed to a pinion shaft 5090. At a first axial side of the pinion 5020, a primary gear 5030 is fixed to the pinion shaft 5090 by means of roller bearings 5091, such that the primary gear 5030 may rotated relative to the pinion shaft 5090 and the pinion 5020. The pinion shaft 5090 is also provided with roller bearings 5070, by means of which the pinion shaft 5090 is journal fixed to a gear housing (not shown). An end portion 5090a of the pinion shaft extends from the primary gear 30 in the direction away from the pinion. The end portion 5090a exhibits a smaller diameter than the other axial portions of the pinion shaft 5090. The primary gear 5030 is connected to the end portion 5090a of the pinion shaft 5090 by means of the elastically deformable fixation device 5400. The fixation device 5400 is formed as hollow member which is arranged concentrically outside the protruding end portion 90a of the pinion shaft 5090. The fixation device 5400 comprises a first portion 5410 which surrounds the free end of the end portion 90a and which is rotationally fixed thereto. A second part 5420 of the fixation device is formed as an annular flange which is rotationally fixed to the primary gear 5030 by means of axially extending bolts (not shown). The second part 5420 is connected to the first portion 5410 by means of an elastically deformable portion 5430 of the fixation device 5400. The elastically deformable portion 5430 is formed as a cylindrical sleeve is formed in one piece with the first 5410 and the second 5420 portion. The elastically deformable portion extends concentrically about the end portion 90a and exhibits a comparatively thin material forming a sleeve wall. In the shown embodiment, the entire fixation device 5400

When a torque is applied between the first 5410 and second 5420 portion of the fixation device 5400, is the intermediate elastically deformable portion 5430 torsionally stretched. The second portion 5420 and thereby the primary gear 5030 is thereby allowed to rotate relative to the first portion 5410 and the pinion 5020. By selecting the material and the dimensions of the elastically deformable portion 5430, it is possible to determine the maximum relative rotation with regard to the maximum torque to be applied. It the exemplifying embodiment shown, the entire fixation device 5400 is made of steel alloy. Other materials such as aluminium, composite and polymers for low torque applications are however also possible.

The fixation device shown in FIGS. 16*a-c* may be varied by choosing the material and dimensions of the end portion 5090*a* of the pinion shaft 5090 such that also the end portion 5090*a* is elastically deformed when a certain torque is applied between the pinion 5020 and the primary gear 5030.

For all elastically deformable fixation devices, the elasticity and geometry of the elastic material is chosen with regard to the maximum torque that is to be applied to the fixation device and the nominal total load to be transferred by the gear arrangement.

It has been proven suitable that the elasticity is chosen such that the pinion of the gear arrangement which is exposed to the highest load may experience a maximum load which is about 20% higher than the average load for all pinions of the gear arrangement, i.e. than the total maximum load of the gear arrangement divided by the number of pinions. At some applications it may by preferable that this number is reduced to 10%. The relative nominal play between the pinions of the gear arrangement, which depends on the number of pinions and gears, manufacturing tolerances and inaccuracies in the gear arrangement, also influences the desirable elasticity of the fixation devices.

E.g. at the gear arrangement illustrated in FIGS. 3*a-e*, the elasticity of the elastically deformable fixation devices is chosen such that, in an unloaded condition, the first pinion being brought into flank contact with the rack, may be rotated by approx. 0.5° relative to its primary gear before the last pinion is brought into flank contact with the rack. Additionally, the elasticity is chosen such that the pinion being exposed to the highest load is rotated approx. 3.0° relative to its primary gear when the gear arrangement is exposed to its nominal maximum load.

The suitable elasticity of the fixation devices may be achieved by choosing an elastic material having a suitable elasticity and by giving this material a suitable geometrical form. Especially when utilizing elastomers as the elastically deformable material, the elasticity of the fixation device may also be influenced by restricting and allowing deformation of the material in certain directions, such that by enclosing some portions of the material.

For all elastically deformable fixation devices it may further be of great importance to be able to accurately and precisely adjust the nominal relative rotational position between the first and second parts. The nominal relative rotational position means the rotational position of the first part in relation to the second part when the elastically deformable material is relieved, i.e. when no torque is applied between the first and second parts of the device. By allowing such adjustment, all pinions and primary gears being mechanically connected to a common out- or input shaft may be synchronized such that all flank engagements occur simultaneously and under equal load for all pinions and primary gears. Such simultaneous and equal flank engagement greatly contributes to an even distribution of the total load and to a reduction of flank wear.

Figure 22:
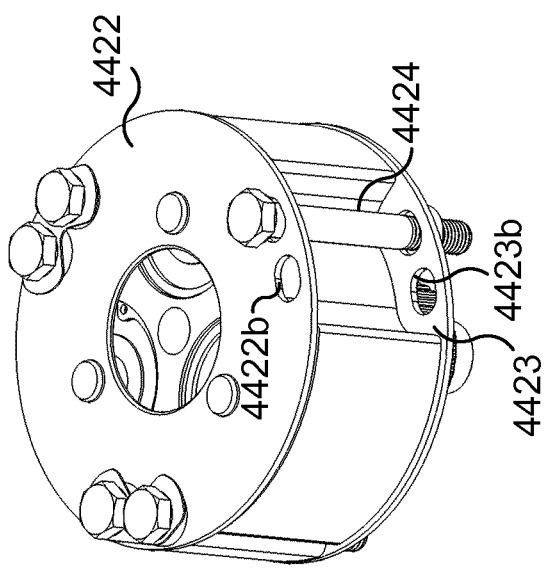
FIG. 22 is a perspective view illustrating a detail of an elastically deformable fixation device.

For this reason it may be advantageous that the elastically deformable fixations devices are provide with means that allow adjustment of the nominal relative rotational positions between the first and second parts. Such means may be achieved in various different ways. FIG. 22 illustrates such an adjusting means which may be incorporated in the elastically deformable fixation device shown in FIGS. 15*a-f* and FIG. 23 illustrates a corresponding means to be used at the device shown in FIGS. 16*a-c*.

At the example shown in FIG. 22, the adjusting means comprises through holes 4422*b* arranged in the first annular disc of the second part 4420, corresponding through holes 4423*b* arranged in the second annular disc 4423 and the fixation bolts 4424. As seen in FIG. 22 the through holes 4422*b*, 4423*b* have an extension in the circumferential or tangential direction of the annular discs 442, 4423 that exceeds the diameter of the bolts 4424. By this means the primary gear 30 may be rotated relative to the annular discs 4422, 4423 even though the fixation bolts extend through the annular discs 4422, 4423 and are threadedly engaged with the axially extending holes in the primary gear 30. The angular degree to which such relative rotation may be accomplished corresponds to the difference between the diameter of the bolts 4424 and the circumferential or tangential extension of the through holes 4422*b*, 4423*b*.

By this means it is possible to very precisely rotationally position the primary gear 30 in relation to the pinion and to thereafter fix the so achieved nominal relative rotational position by fastening the fixations bolts 4424 into the primary gear 30.

Figure 23:
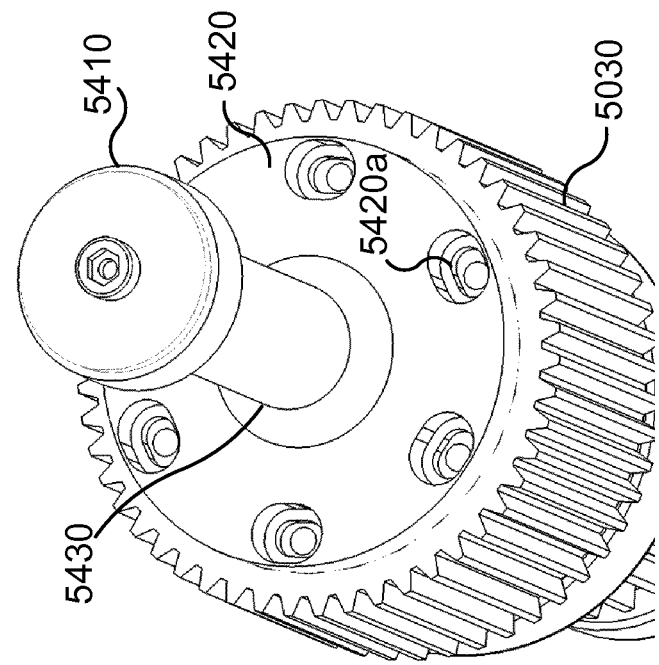
FIG. 23 is a perspective view illustrating a detail of another elastically deformable fixation device.

At the example shown in FIG. 23, which is used at the fixation device shown in FIGS. 16*a-c*, corresponding circumferentially or tangentially extending through holes 54220*a* are arranged in the annular flange forming the second part 5420 of the fixation device. The circumferential or tangential dimension of the through holes 5420*a* exceeds the diameters of the fixation bolts (not shown), by means of which the second part 5420 is fixed to the primary gear 5030. By this means a corresponding angular adjustment of the primary gear 5030 in relation to the second part 5420 and thereby the pinion 5020 may be achieved before the fixation bolts are fastened to the primary gear 5030.

The inventors have also realized that a certain method for adjusting the elastically deformable fixation devices of a gear arrangement is particularly advantageous. This method comprises the following steps.

Providing a gear arrangement comprising a toothed rack and at least two pinions meshing with said rack, each pinion being fixed to a respective primary gear, wherein the primary gears are connected to a common out- or input shaft and wherein the pinions are fixed to the respective primary gears by means of an elastically deformable fixation device, each fixation device comprising an adjusting means which may be set to a first mode wherein the primary gear may rotate freely relative to the pinion and to a second mode wherein the primary gears is restricted to only a limited elastic rotation relative to the pinion Setting all adjustment devices to the first mode.

Immobilizing one of the rack and the out- or input shaft.

Applying a force to the other of the rack and the out- or input shaft.

Observing when the flanks of the pinions make contact with the flanks of the toothed rack.

Setting all adjustment devices to the second mode, when or immediately after a flank of each pinion contacts a corresponding flank of the toothed rack.

The method thus provides a very simple and reliable way of adjusting al elastically deformable fixation devices, such than an even load distribution during normal use of the gear arrangement is achieved.

Figure 24:
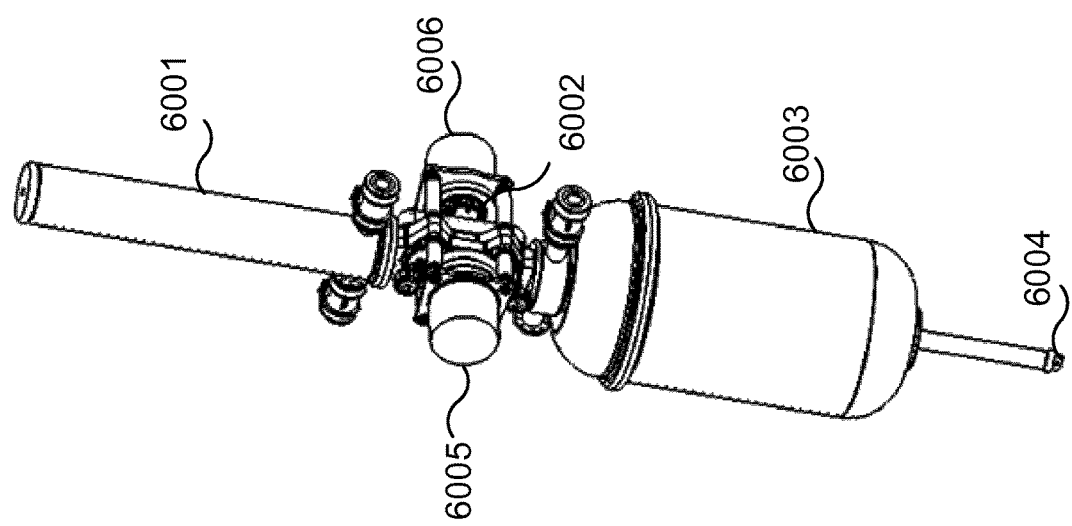
FIG. 24 is a schematic perspective view illustrating a part of a wave energy converter comprising a gear arrangement according to the invention.

FIG. 24 illustrates a wave energy converter comprising a gear arrangement according to the invention. The general functional principles of the wave energy converter are described in WO 2012/008895 A1. The wave energy converter 6000 comprises a cylinder 6001 which receives an upper end of the rack (not shown) of the gear arrangement. The cylinder 6001 is fixed to an upper end of a gear housing 6002 of the gear arrangement. A gas spring 6003 is fixed to the lower end of the gear housing 6002. The rack (not shown) is received in and linearly reciprocally movable relative to the cylinder 6001, the gear housing 6002 and the gas spring 6003. A lower end of the rack is connected to an anchoring member 6004 which is axially displaceable relative to the gas spring 6003 together with the rack. The gear housing further comprises a gear arrangement (not shown) according to the invention and as described above. The gear arrangement comprises two output shafts (not shown). Each shaft is connected to a respective electrical generator 6005, 6006 via a respective free wheel and flywheel.

Figure 25:
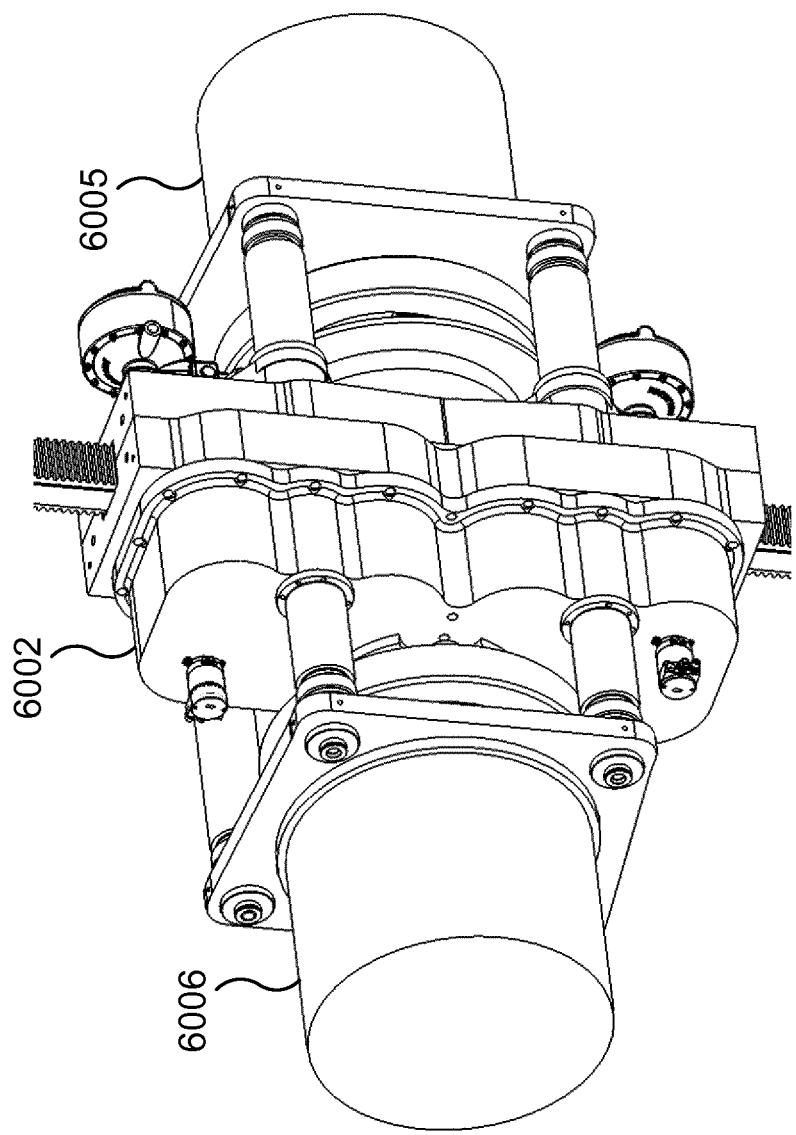
FIG. 25 is a perspective view illustrating a detail in enlarged scale of the wave energy converter shown in FIG. 24.

FIG. 25 is an enlarged view of the wave energy converter shown in FIG. 24 and shows more in detail how the generators 6005, 6006 are connected to the gear arrangement. FIGS. 26a-b illustrates in even more detail an exemplifying connection arrangement between an output shaft (not shown) of the gear arrangement and the generator 6006. As seen in FIGS. 26a-b, this connection arrangement comprises a central hub 7001 with a central bore for receiving the output shaft (not shown) of the gear arrangement. A sleeve member 7002 is arranged concentrically about the hub 7001. The sleeve member 7002 is rotational relative to the hub 7001 by means of roller bearings 7003, 7004 arranged there between. A freewheel device 7005 is also arranged between the hub 7002 and the sleeve member 7003. The freewheel device 7005 is arranged such that rotation of the hub 7001 in one rotational direction is transferred to the sleeve member 7002, where as rotation of the hub 7001 in the other rotational direction is not transferred to the sleeve member 7002. In the shown example, the freewheel device 7005 is of the cage type and comprises a number of springs arranged between an inner and an outer ring. It is however also possible to utilize other types of freewheel devices, as readily understood by the skilled person.

The sleeve member 7002 is further fixed to a transmission disc 7006. The transmission disc 7006 is connected to a flywheel 7007 by means of a damper arrangement 7008a, 7008b. The flywheel 7007, in turn, is fixed to the an input shaft 6006a of the generator 6006. The damper arrangement 7008a, 7008b is arranged to compensate for any radial and angular misalignment between the output shaft of the gear arrangement and the input shaft 6006b of the generator 6006. The damper arrangement comprises two torsionally rigid and somewhat bendable discs 7008a, 7008b that are interconnected by means of bolts (not shown). As readily understood, the damper arrangement may be constructed in many other ways. It is also possible that the damper arrangement is omitted in some applications.

The output shaft of the gear arrangement is thus connected to the generators 6005, 6006 such that rotation of the output shaft is transferred to one 6005 of the generators only in a first rotational direction and to the other generator 6006 only in a second rotational direction being opposite to the first rotational direction.

The wave energy converter shown in FIG. 24 is fixed to and at least partly received in a buoy (not shown) which floats at or below the surface of the sea. A lower end of the anchoring member 6004 is anchored to the bottom of the sea. The gas spring 6003 is arranged to bias the rack relative to the gear housing 6002 in the direction being opposite to the direction by which the water exerts a floating lifting force to the buoy and the gear housing 6002. By this means the lifting force acting on the gear housing is essentially counter balanced, such that the load to be transferred by the gear arrangement is greatly reduced.

During wave motions of the sea, the buoy, the cylinder 6001 the gear housing 6002, and the gas spring are caused to move reciprocally relative to the anchoring member and thereby relative to the gear rack. The gear arrangement transforms the relative reciprocal motion of the gear rack into a rotational movement of each output shaft. The rotational movement of each output shaft drives a rotor of the respective generator to rotate. Since the generators are connected to the output shafts via a respective free wheel, the rotor of the first generator 6005 is driven to rotate during relative axial movement of the rack in a first direction. The rotor of the second generator 6006 is driven to rotate during relative axial movement of the rack in the second direction. Each rotor spins freely during relative axial movement of the rack in the direction which is opposite to the direction driving the respective rotor. Thereby each generator is allowed to continue rotating in one and the same rotational direction during the entire reciprocal cycle of the rack. This reduces the inertia of the system whereby the efficiency of the entire wave energy converter is enhanced. The flywheels further reduce the fluctuation of the rotational speed of the rotors, whereby the fluctuations in electrical power generated by the generators is reduced correspondingly. During the transformation of reciprocal linear movement of the buoy into rotational movement of the rotors, the gear arrangement according to the invention contributes to evenly distribute the load to all flanks of the gear rack and pinions simultaneously in engagement. Thereby, the wear of the gear components is reduced and the service life is increased and made better predictable.

At wave energy applications, the electrical generator may be replaced by other loads connected to the rotating output shafts. For example, the rotating output shafts may be connected to rotational high pressure pumps for fresh water production.

The inventive gear arrangement may also be used at many other applications. For example, an input shaft of the gear arrangement may be connected to a rotational driving means such that an electrical or other motor. The gear arrangement then transforms rotation input motion into a linear motion of the rack. This may be utilize e.g. in linear actuators and linearly moving lifting devices, especially for heavy loads. The very high load to weight and volume ratio as well as the long and predictable service life provided by the inventive gear arrangement makes the arrangement suitable for many such applications where hydraulic or pneumatic position-cylinder arrangements previously has been the dominating or only practically available solution. By utilizing the efficient and cost effective electro-mechanical arrangement provided by the inventive gear arrangement many problems associated with the previous hydraulic and pneumatic arrangements may be eliminated or greatly reduced. In such linear actuator applications, a first end of the rack may be connected to the load to be lifted or otherwise moved. In applications where the load is great, the other end of the gear rack may be connected to a spring means, such as a gas spring. The spring means is then arranged to bias the rack in the direction opposite to the direction by which the load exerts a force to the rack. E.g. in lifting applications, the spring means is arranged to bias the rack in the lifting direction of the rack, i.e. in the direction of the rack being opposite to the direction in which the gravity of the load exerts a force to the rack. By this means it is possible to balance the rack such that the total load to be transferred by the gear arrangement is greatly reduced. This in turn reduces the power requirements of the driving means as well as the wear of the rack, the pinions, the gears and the other components of the gear arrangement.

The invention has been described by way of examples. The invention is however not limited to the described embodiments. To the contrary, it may be varied freely within the scope of the appended claims. E.g. the rack, pinions and/or the gears may be provided with straight or angled cog flanks. For the case of angled cog flanks single or dual angled direction flanks may be used. As described above, the rack may be provided with cog flanks at one or two mutually opposite toothed sides and the gear arrangement then comprises pinions meshing with each toothed side of the rack. It is however also possible that the rack is provided with four toothed sides. Preferably the rack then exhibits a rectangular, such as a square, cross section, wherein the toothed sides are arranged in pairs, each pair comprising two toothed sides being arranged mutually opposite to each other. The gear arrangement then further comprises four sets of pinions, each set comprising at least one pinion meshing with a respective toothed side and being connected to at least one primary gear, by means of an elastically deformable fixation device. At such a gear arrangement, each set of pinions may preferably comprise two or four pinions. Such arrangements with multiple toothed sides of a square or rectangular profile gear rack allows the total load of the gear rack to be distributed onto multiple sides of the rack, thus allowing for a larger load capacity for a given rack dimension. It is also possible to arrange two or several gear arrangements as defined by the appended claims, described above and illustrated in the drawings in an aggregate gear device. In such a case, two or more such gear arrangements may be arranged linearly one after the other and configured such that the pinions of each gear arrangement meshes with one and the same rack. Alternatively, the pinions of each such gear arrangement could be arranged to mesh with a respective rack. The different racks of such a gear device may further be connected to each other in series or in parallel.

As understood by the description above, the gear arrangement may be configured in many different ways. Examples of such configurations are a gear arrangement comprising:

A rack with two toothed sides, 2 pinions meshing with a first toothed side, two pinions meshing with a second toothed side, each pinion being fixed to a respective first primary gear. One secondary gear, meshing with two primary gears and being fixed to a common out- or input shaft, wherein at least three first primary gears are arranged to elastically and limitedly rotate relative to the respective pinion.

A rack with two toothed sides, four pinions meshing with a first toothed side and four pinions meshing with a second toothed side. Each pinion being fixed to a respective first primary gear. Two first secondary gears, each secondary gear meshing with two primary gears and being fixed to a first tertiary gear. Both tertiary gears meshing with a first quandary gear which is fixed to an out- or input shaft. At least seven of the primary gears are arranged to elastically and limitedly rotate relative to the respective pinion.

A rack with two toothed sides, eight pinions meshing with a first toothed side and eight pinions meshing with a second toothed side. Each pinion being fixed to a respective first primary gear. Four first secondary gears, each meshing with two primary gears and being fixed to a respective first tertiary gear. Two first quaternary gears, each meshing with two tertiary gears and being fixed to a first quinary gear. One first senary gear meshing with the two quinary gears and being fixed to a out- or input shaft. At least fifteen of the primary gears are arranged to elastically and limitedly rotate relative to the respective pinion.

Each above listed embodiments may further be varied by adding a corresponding number of second primary gears, second tertiary gears, second quaternary gears, second quinary gears and second senary gears, whereby a corresponding symmetrical gear arrangement is achieved. In these cases the first and second last gear (i.e. the first and second secondary, quaternary or senary gears, as the case may be) may then either be fixed to a common out- or input shaft or to a respective out- or input shaft.

Additionally, besides the elastically deformable fixations devices that are arranged between the pinions and the primary gears, the gear arrangement may also comprise further such elastically deformable fixation devices. Such additional devices may e.g. be arranged between at least one pair of secondary and tertiary gears and or at least one pair of quaternary and quinary gears. By such addition of elastically deformable fixation devices, the load distribution in the gear arrangement may be enhanced even further. Such arrangement also entails for that the requirements of relative rotation and torsional flexibility of each fixation device arranged between the pinions and primary gear may be reduced.

Further, when the gear arrangement is equipped with motors or generators on at least one in/output shafts, and a relative high rotational velocity is desired on said motors or generators an additional conventional gear unit, such as a planetary gear unit, may be connected between said motors or generators to increase the gear ratio of the total gear arrangement. Typically each gear step of a the inventive gear arrangement can provide up to 5× gear ratio per step, and for a gear arrangement where higher gear ratio than this is desired, the use of an additional gear unit may be advantageous.

The invention claimed is:

1. A gear arrangement for transforming a linear force and/or motion into a rotational torque and/or motion and vice versa, the arrangement comprising:
   a rack exhibiting a longitudinal axis (A), a first toothed side, and a second toothed side, said first and second toothed sides being mutually opposed and extending parallel to the longitudinal axis of the rack, the rack being reciprocally movable along its longitudinal axis; and
   at least one pair of pinions, each pair of pinions comprising:
      a first pinion rotationally meshing with the first toothed side of the rack and being fixed to a first primary gear arranged at a first axial side of the first pinion via a first elastically deformable fixation device that is arranged to allow limited relative rotation between the first primary gear and the first pinion, and a second pinion rotationally meshing with the second toothed side of the rack and being fixed to a second primary gear arranged at a first axial side of the second pinion via a second elastically deformable fixation device that is arranged to allow limited relative rotation between the second primary gear and the second pinion, wherein the first primary gear fixed to the first pinion directly meshes with the second primary gear fixed to the second pinion, wherein:

said first and second primary gears are mechanically connected to a common out- or input shaft, such that the first and second primary gears transmit torque to or from the out- or input shaft.

2. The gear arrangement according to claim 1, comprising linear guiding means arranged to guide the longitudinal movement of the rack in the directions being normal to the first and second toothed sides of the rack.

3. The gear arrangement according to claim 1, wherein the first elastically deformable fixation device comprises a first part which is rotationally fixed to the first pinion and a second part which is rotationally fixed to the first primary gear, and wherein the first and second parts are mechanically connected by means of a elastically deformable material.

4. The gear arrangement according to claim 3, wherein the the first elastically deformable fixation device comprises means for adjusting the nominal relative rotational position between the first part and the second part.

5. The gear arrangement according to claim 4, wherein at least a portion of the elastically deformable material forms radially extending spokes.

6. The gear arrangement according to claim 4, wherein the elastically deformable material comprises a polymer material which is arranged to be compressed when the first part is rotated relative to the second part.

7. The gear arrangement according to claim 3, wherein the first part is connected to the second part by means of a shaft portion which protrudes axially from an axial end of the first primary gear to a free end of the shaft portion and an elastically deformable sleeve which extends concentrically about the shaft portion from the free end towards said axial end of the first primary gear.

8. The gear arrangement according to claim 7, wherein said shaft portion is elastically deformable in the circumferential direction.

9. The gear arrangement according to claim 1, wherein the rack comprises two longitudinal rack halves that are mutually connected, with or without an intermediate space.

10. A wave energy transforming device comprising The gear arrangement according to claim 1 arranged to transform a linear reciprocal movement applied to the rack to an outgoing rotational movement of at least one output shaft.

11. A linear actuator comprising The gear arrangement according to claim 1, arranged to transform a rotational movement applied to at least one input shaft into an outgoing linear movement of the rack.

12. The gear arrangement according to claim 1, comprising at least one set of gear parts, each set comprising two pairs of pinions, wherein the first primary gear fixed to the first pinion of one pair and the first primary gear fixed to the first pinion of the other pair both mesh with a common first secondary gear which is connected to the common first out- or input shaft.

13. The gear arrangement according to claim 12, comprising two sets of gear parts, wherein the first secondary gear of each set is connected to a respective tertiary gear by means of a respective secondary gear shaft and wherein both tertiary gears mesh with a common quaternary gear which is fixed to the common first out- or input shaft.

14. The gear arrangement according to claim 13, wherein:
the first pinion in each pair of pinions is fixed to a respective third primary gear arranged at a second axial side of the respective first pinion and wherein said third primary gear is fixed to the respective first pinion by means of a respective third elastically deformable fixation device which is arranged to allow a limited relative rotation between the respective third primary gear and the first pinion, and wherein the second pinion in each pair of pinions is fixed to a respective fourth primary gear arranged at a second axial side of the respective second pinion and wherein said fourth primary gear is fixed to the respective second pinion by means of a respective fourth elastically deformable fixation device which is arranged to allow a limited relative rotation between the respective fourth primary gear and the second pinion.

15. The gear arrangement according to claim 14, wherein the third and fourth primary gears are connected to a common second out- or input shaft.

16. The arrangement according to claim 14, wherein, at each pair of pinions, the third primary gear fixed to the first pinion meshes with the fourth primary gear fixed to the second pinion.

17. The gear arrangement according to claim 12, wherein:
the first pinion in each pair of pinions is fixed to a respective third primary gear arranged at a second axial side of the respective first pinion and wherein said third primary gear is fixed to the respective first pinion by means of a respective third elastically deformable fixation device which is arranged to allow a limited relative rotation between the respective third primary gear and the first pinion, and wherein the second pinion in each pair of pinions is fixed to a respective fourth primary gear arranged at a second axial side of the respective second pinion and wherein said fourth primary gear is fixed to the respective second pinion by means of a respective fourth elastically deformable fixation device which is arranged to allow a limited relative rotation between the respective fourth primary gear and the second pinion.

18. The gear arrangement according to claim 17, wherein the third and fourth primary gears are connected to a common second out- or input shaft.

19. The arrangement according to claim 17, wherein, at each pair of pinions, the third primary gear fixed to the first pinion meshes with the fourth primary gear fixed to the second pinion.

20. The gear arrangement according to claim 1, wherein:
the first pinion in each pair of pinions is fixed to a respective third primary gear arranged at a second axial side of the respective first pinion and wherein said third primary gear is fixed to the respective first pinion by means of a respective third elastically deformable fixation device which is arranged to allow a limited relative rotation between the respective third primary gear and the first pinion, and wherein the second pinion in each pair of pinions is fixed to a respective fourth primary gear arranged at a second axial side of the respective second pinion and wherein said fourth primary gear is fixed to the respective second pinion by means of a respective fourth elastically deformable fixation device which is arranged to allow a limited relative rotation between the respective fourth primary gear and the second pinion.

21. The gear arrangement according to claim 20, wherein the third and fourth primary gears are connected to a common second out- or input shaft.

22. The arrangement according to claim 20, wherein, at each pair of pinions, the third primary gear fixed to the first pinion meshes with the fourth primary gear fixed to the second pinion.

\* \* \* \* \*